(12) United States Patent
De Bellis et al.

(10) Patent No.: US 7,188,100 B2
(45) Date of Patent: Mar. 6, 2007

(54) SEARCH-ON-THE-FLY REPORT GENERATOR

(75) Inventors: Joseph De Bellis, 80 Sanford Pl., Southampton, NY (US) 11968; Adriano A. Freire, Southampton, NY (US)

(73) Assignee: Joseph De Bellis, Southampton, NY (US)

( * ) Notice: Subject to any disclaimer, the term of this patent is extended or adjusted under 35 U.S.C. 154(b) by 760 days.

(21) Appl. No.: 10/062,459

(22) Filed: Feb. 5, 2002

(65) Prior Publication Data

US 2002/0133488 A1 Sep. 19, 2002

Related U.S. Application Data

(63) Continuation-in-part of application No. 09/935,565, filed on Aug. 24, 2001, which is a continuation-in-part of application No. 09/513,340, filed on Feb. 25, 2000.

(51) Int. Cl.
*G06F 17/30* (2006.01)

(52) U.S. Cl. .......................................... 707/3; 707/100

(58) Field of Classification Search .............. 707/1–10, 707/100–154.5, 200–206
See application file for complete search history.

(56) References Cited

U.S. PATENT DOCUMENTS 5,991,756 A * 11/1999 Wu ............................... 707/3
6,535,908 B1 * 3/2003 Johnson et al. .......... 707/104.1

* cited by examiner

*Primary Examiner*—Mohammad Ali
(74) *Attorney, Agent, or Firm*—Andrews Kurth LLP

(57) ABSTRACT

Sort-on-the-Fly/Search-on-the-Fly data retrieval or analysis provides an intuitive method and apparatus for accessing databases, allowing a user to access or obtain information about data in the database without having to know anything about the database structure. In embodiments, the thus obtained information is formatted according to a report template and is presented as a search report. In embodiments, the report template is saved so that subsequent search reports having a consistent format can be generated. The subsequent search reports represent the charging, dynamic content of the database. In embodiments, the search report is customized using fitters and plug-ins.

38 Claims, 44 Drawing Sheets

ViloX™ OTF™ Technology Report
DVD
Genre = (Comedy) MPAA Ratings = (G)

| TITLE | DIRECTOR | STUDIO | PRICE |
|---|---|---|---|
| BAREFOOT IN THE PARK | SAKS, GENE | PARAMOUNT PICTURES | $25.49 |
| BUG'S LIFE, A | | DISNEY | $49.99 |
| EXTREMELY GOOFY MOVIE, AN | | DISNEY | $29.99 |
| EXTREMELY GOOFY MOVIE, AN | | DISNEY | $29.99 |
| HAPPIEST MILLIONAIRE, THE | TOKAR, NORMAN | ANCHOR BAY ENTERTAINMENT | $21.23 |
| HAPPIEST MILLIONAIRE, THE (ROADSHOW EDITION) | TOKAR, NORMAN | ANCHOR BAY ENTERTAINMENT | $19.99 |
| HILLBILLYS IN A HAUNTED HOUSE | | | $16.99 |
| LADY AND THE TRAMP - LIMITED EDITION | GERONIMI, CLYDE | DISNEY | $29.99 |
| LION KING II: SIMBA'S PRIDE - LIMITED ISSUE | ROONEY, DARRELL | DISNEY | $29.99 |
| NORTH AVENUE IRREGULARS, THE | BILSON, BRUCE | ANCHOR BAY ENTERTAINMENT | $21.23 |
| RETURN OF THE PINK PANTHER, THE | EDWARDS, BLAKE | ARTISAN | $19.99 |
| RUGRATS MOVIE, THE | VIRGIEN, NORTON | PARAMOUNT PICTURES | $24.99 |
| THE JUNGLE BOOK - LIMITED ISSUE | REITHERMAN, WOLFGANG | DISNEY | $29.99 |
| TWELVE CHAIRS | | | $21.24 |
| UNIDENTIFIED FLYING ODDBALL | MAYBERRY, RUSS | ANCHOR BAY ENTERTAINMENT | $22.99 |
| | | ☐TOTALS | |

☐ PROCESS TOTALIZATION CHANGES

NUMBER OF RECORD(S): 15
REPORT CREATION DATE: 8/27/2001 2:59:04 PM
DATABASE SCAN DATE: 8/27/2001 2:59:04 PM

*FIG. 28*

| Author: | NULL |
|---|---|
| Date: | 2001.08.29 10:23:29.420 |
| Id: | 59 |
| Query: | SELECT [Stock].[local] as [Category], [Stock].[tipo] as [Sub Category], [Stock].[Model] as [Model], [Stock].[item] as [SKU], [Stock].[quantidade] as [In Stock], [Stock].[VendaUs] as [Retail], [Stock].[custo] as [Wholesale], [sales].[data] as [Sale Date], [Clients].[Last Name] as [Customer Last Name], [Clients].[First Name] as [Customer First Name], [Clients].[Zip] as [Zip] FROM [sales] JOIN [Stock] ON ([Stock].[item] = [sales].[item]) JOIN [Clients] ON ([Clients].[id] = [sales].[Client]) WHERE ( SUBSTRING([Stock].[Brand], 1, 4) = 'SONY') AND ( SUBSTRING([sales].vendedor], 1, 7) = 'Deborah') |
| Filters: | Brand = (SONY) Sales Representative = (Deborah) |
| Fields Metadata: | Category^I^Sub Category^I^Model^I^SKU^I^g^In Stock^I^@^Retail^I^@^Wholesale^I^d^Sale Date^I^Customer Last Name^I^Customer First Name^I^$^Zip |
| Title: | Electronics |

*FIG. 36*

ViloX™ OTF™ Technology Report
Electronics
Representative = (Sony) Sales Representative = (Deborah)

| CATEGORY | SUB CATEGORY | MODEL | SKU | IN STOCK | RETAIL | WHOLESALE | SALE DATE | CUSTOMER LAST NAME | CUSTOMER FIRST NAME |
|---|---|---|---|---|---|---|---|---|---|
| PHOTOGRAPHY | DIGITAL CAMERA | MVCFD7 MAVICA | 027242527232 | 0 | | $599.00 | 2/16/1998 | | |
| AUDIO | CD PLAYER | CDX3160 FM/AM COMPACT DISC PLAYER | 027242515949 | 0 | | $152.00 | 2/16/1998 | | |
| AUDIO | MD | MD BUNDLE 4 | SONMDBUNDLE4 | 4 | | $305.00 | 2/18/1998 | | |
| VIDEO | PROJECTOR | VPH 100IQ | SONY VPH1001Q | 0 | | $3,600.00 | 2/26/1998 | | |
| AUDIO | PORTABLE | DE301 DISCMAN | 027242517448 | 4 | | $75.00 | 3/11/1998 | | |
| AUDIO | PORTABLE | DT405 DISCMAN | 027242518452 | 0 | | $140.00 | 3/12/1998 | | |
| COMPUTERS | GAMES | ALLADIN AND HIS WONDERFUL LAMP | 713378023013 | 0 | | $4.00 | 12/31/1997 | | |
| AUDIO | PORTABLE | DT401 DISCMAN AM/FM | 027242518438 | 12 | | $132.00 | 12/31/1997 | | |
| AUDIO | PORTABLE | DT401 DISCMAN AM/FM | 027242518438 | 12 | | $132.00 | 12/31/1997 | | |
| COMPUTERS | ACCESSORIES | KW200 INTERNET KEYBOARD | SONYKLW200 | 0 | | $40.00 | 3/2/1998 | | |
| AUDIO | CD PLAYER | CDX4160 FM/AM COMPACT DISC PALYER | 027242515963 | 0 | | $163.00 | 4/2/1998 | | |
| AUDIO | MD | MD BUNDLE 4 | SONMDBUNDLE4 | 4 | | $305.00 | 4/20/1998 | | |
| AUDIO | CAR CASSETE PLAYER | XPRESS CAR TAPE/SPEAKERS | SONXRE555 | 0 | | $90.00 | 4/20/1998 | | |
| AUDIO | CD PLAYER | CDXC460 CAR CDPLAYER | 027242515871 | 1 | | $228.00 | 4/20/1998 | | |
| AUDIO | PORTABLE | DE401 DISCMAN | 027242530997 | 0 | | $95.00 | 4/20/1998 | | |
| COMPUTERS | GAMES | ALLADIN AND HIS WONDERFUL LAMP | 713378023013 | 0 | | $4.00 | 4/30/1998 | | |
| VIDEO | PROJECTOR TV | CPJ300 PROJECTOR | SONYCPJ300 | 0 | | $1,150.00 | 6/18/1998 | | |
| AUDIO | PORTABLE | B172K CAR KIT DISCMAN | 027242531338 | 0 | | $75.00 | 7/18/1998 | | |
| VIDEO | TV | KV20S21 COLOR TV | SONKV20S21 | 0 | | $290.00 | 8/10/1998 | | |
| AUDIO | MD | MZR50 PORTABLE | 4901780472529 | | | $280.00 | 8/14/1998 | | |

FIG. 37

SEARCH-ON-THE-FLY REPORT GENERATOR

RELATED APPLICATIONS

This application is a continuation-in-part of application Ser. No. 09/935,565, filed Aug. 24, 2001, entitled Search-On-The-Fly With Merge Function, which is a continuation-in-part of application Ser. No. 09/513,340, filed Feb. 25, 2000, entitled Search-On-The-Fly/Sort-On-The-Fly Search Engine, both of which are hereby incorporated by reference.

TECHNICAL FIELD

The technical field is information management systems, interfaces, and mechanisms, and mechanisms and methods for searching one or more databases and reporting search results.

BACKGROUND

In the most general sense, a database is a collection of data. Various architectures have been devised to organize data in a computerized database. Typically, a computerized database includes data stored in mass storage devices, such as tape drives, magnetic hard disk drives and optical drives. Three main database architectures are termed hierarchical, network and relational. A hierarchical database assigns different data types to different levels of the hierarchy. Links between data items on one level and data items on a different level are simple and direct. However, a single data item can appear multiple times in a hierarchical database and this creates data redundancy. To eliminate data redundancy, a network database stores data in nodes having direct access to any other node in the database. There is no need to duplicate data since all nodes are universally accessible. In a relational database, the basic unit of data is a relation. A relation corresponds to a table having rows, with each row called a tuple, and columns, with each column called an attribute. From a practical standpoint, rows represent records of related data and columns identify individual data elements. The order in which the rows and columns appear in a table has no significance. In a relational database, one can add a new column to a table without having to modify older applications that access other columns in the table. Relational databases thus provide flexibility to accommodate changing needs.

All databases require a consistent structure, termed a schema, to organize and manage the information. In a relational database, the schema is a collection of tables. Similarly, for each table, there is generally one schema to which it belongs. Once the schema is designed, a tool, known as a database management system (DBMS), is used to build the database and to operate on data within the database. The DBMS stores, retrieves and modifies data associated with the database. Lastly, to the extent possible, the DBMS protects data from corruption and unauthorized access.

A human user controls the DBMS by providing a sequence of commands selected from a data sublanguage. The syntax of data sublanguages varies widely. The American National Standards Institute (ANSI) and the International Organization for Standardization (ISO) have adopted Structured English Query Language (SQL) as a standard data sublanguage for relational databases. SQL comprises a data definition language (DDL), a data manipulation language (DML), and a data control language (DCL). The DDL allows users to define a database, to modify its structure and to destroy it. The DML provides the tools to enter, modify and extract data from the database. The DCL provides tools to protect data from corruption and unauthorized access. Although SQL is standardized, most implementations of the ANSI standard have subtle differences. Nonetheless, the standardization of SQL has greatly increased the utility of relational databases for many applications.

Although access to relational databases is facilitated by standard data sublanguages, users still must have detailed knowledge of the schema to obtain needed information from a database since one can design many different schemas to represent the storage of a given collection of information. For example, in an electronic commerce system, product information, such as product SKU, product name, product description, price, and tax code, may be stored in a single table within a relational database. In another electronic commerce system, product SKU, product name, description, and tax code may be stored in one table while product SKU and product price are stored in a separate table. In this situation, a SQL query designed to retrieve a product price from a database of the first electronic commerce system is not useful for retrieving the price for the same product in the other electronic system's database because the differences in schemas require the use of different SQL queries to retrieve product price. As a consequence, developers of retail applications accessing product information from relational databases may have to adapt their SQL queries to each individual schema. This, in turn, prevents their applications from being used in environments where there are a wide variety of databases having different schemas, such as the World Wide Web.

A further problem with conventional searches, search engines, data access and data retrieval is a tendency to return very large amounts of data, or to require the search parameters to be narrowed. When large amounts of data are presented, the display may take many "pages" before all data is seen by the user. The time and expense involved in such a data review may be significant, inconvenient, not user friendly or efficient.

SUMMARY

Sort-on-the-Fly/Search-on-the-Fly data retrieval methods and apparatus (hereafter, search-on-the-fly) provide an intuitive means for accessing or searching databases, allowing a user to access or obtain information about data in the database without having to know anything about the database structure. Sort-on-the-fly/search-on-the-fly is an information gathering process or analysis process about data stored in one or more databases. The on-the-fly methods and apparatus often use or include sorting and searching. While sort-on-the-fly/search-on-the-fly may be a search engine or part of a search engine, it may also stand alone or make calls to a search engine. For example, database search engines may be used in conjunction with on-the-fly methods and apparatus.

Using sort-on-the-fly/search-on-the-fly, a user selects a desired term, and the user is delivered all instances of the desired term, even if a specific file or table does not contain the instance. For example, if a user wants to enter a database using the name of a specific individual as a database entry point, a database manager or other software will access the database using the desired name, and will organize the results so that all entries associated with that name are displayed. The database need not have a specific file (in a flat database) or a table (in a relational database) of names. The user may perform further on-the-fly searches or information retrieval to narrow or focus the results, or for other reasons. For example, given results for all names that include the name "Smith," the user may then decide to obtain information for all "Smiths" that include an association to an address in New Jersey. Search-on-the-fly then conducts a further information gathering using this criteria and produces a second result. Further narrowing or broadening of the analysis is permitted, with search-on-the-fly returning results based on any new criteria.

In an embodiment, search-on-the-fly uses graphical user interfaces (GUIs) and one or more icons to make the information gathering process as efficient as possible. The GUIs may incorporate one or more pull down menus of available sorting terms. As a user selects an item from a first pulldown menu, a subsequent pulldown menu displays choices that are available for sorting or searching. The process may be continued or repeated until sort-on-the-fly/search-on-the-fly has retrieved or displayed a discrete data entry from the database. The pulldown menus are not pre-formatted. Instead, the pulldown menus are created "on-the-fly" as the user steps through the sort and/or search process. Thus, search-on-the-fly is inherently intuitive, and allows a user with little or no knowledge of the database contents, its organization, or a search engine search routine to execute comprehensive analysis, sorting and/or searches that return generally accurate results.

Search-on-the-fly also searches on key words specified by the user. Search-on-the-fly can be used to exclude certain items. Search-on-the-fly incorporates other advanced features such as saving results by attaching a cookie to a user's computer, and associating icons with the results.

Search-on-the-fly may be used with both internal and external databases. For example, Search-on-the-fly may be used with a company internal database and one or more databases accessible through the Internet.

Search-on-the-fly is user-friendly. With one interface, many different types of databases or database schemas may be searched or sorted.

The search-on-the-fly technique, and other techniques discussed above may be used in conjunction with a method of doing business, particularly a business method that uses the Internet as a communications backbone.

The search-on-the-fly mechanism provides for a mechanism and method for dynamic report generation based on a search template created during a search-on-the-fly search of one or more databases. The mechanism and method include client-side and server-side components. The server-side components may include the search-on-the-fly search engine and a report generator. The report generator takes the results of a search conducted using the search-on-the-fly search engine (or other search engine) and creates a template that includes a link, or path to one or more fields in one or more databases. A user interface-based menu, or similar means, may be used to specify which data fields are to be included in the template. Alternatively, default setting may be used for the template. The user may also specify other conditions related to any data in the databases, the client side components may include one or more front ends that couple to the one or more databases. Each template may be assigned a unique identification number (ID) to ensure a user may access the template to create a dynamic search-on-the-fly report. The front ends may access the template, and may use the template to access corresponding data in one or more of the one or more databases.

The search-on-the-fly mechanism may generate search reports by accessing one or more databases using a search-on-the-fly search engine, and generating a search vault based on the data base access, wherein the search result includes one or more descriptor indicating corresponding data categories. The method may also include creating a report template of the search result, with the template including links to the data categories describing the descriptor.

DESCRIPTION OF THE DRAWINGS

The detailed description will refer to the following figures, in which like numerals refer to like objects, and in which:

FIGS. 11–15*b* are additional examples of a search-on-the-fly using the search engine of FIG. 3;

FIG. 28 illustrates a user interface displaying a dynamic search report;

FIG. 36 illustrates a report template saved in a reports generator database;

FIG. 37 illustrates a dynamic report generated using the report template of FIG. 36;

DETAILED DESCRIPTION

Figure 1:
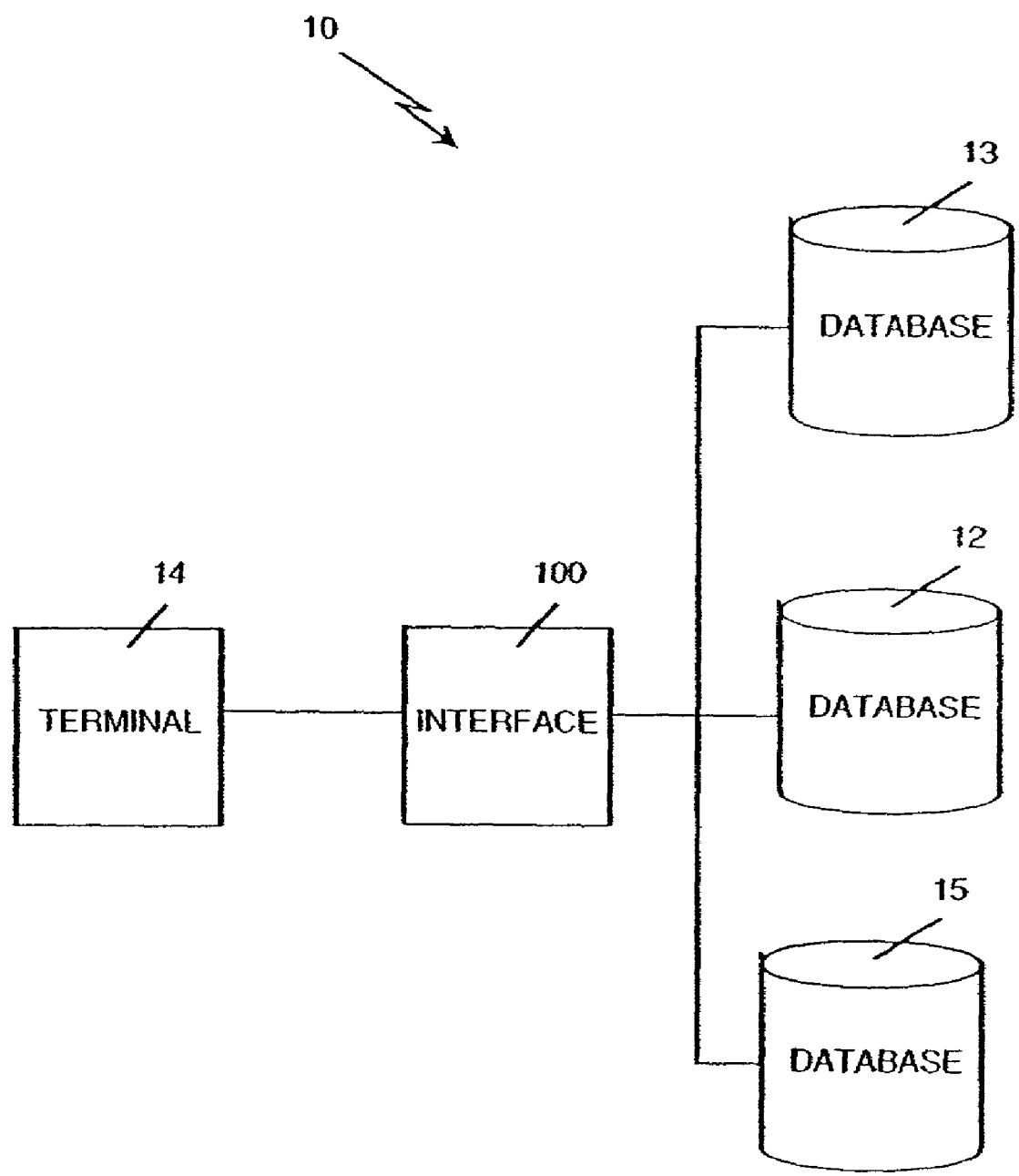
FIG. 1 is a block diagram of a system that uses a search-on-the-fly/sort-on-the-fly process.

Ordinary search engines place constraints on any search. In particular, a partial ordering of available search criteria limits application of the search engine only to certain search sequences. The user is given a choice of search sequences, and the order in which individual search steps in the search sequence become available limits the direction of the search. A user who desires to take a vacation cruise may use an Internet search engine to find a desired vacation package. The search begins with presentation of a list of general categories, and the user clicks on "travel," which produces a list of subcategories. The user then clicks on "cruises" from the resulting list of subcategories, and so on in a cumulative narrowing of possibilities until the user finds the desired destination, date, cruise line, and price. The order in which choices become available amounts to a predefined "search tree," and the unspoken assumption of the search engine designer is that the needs and thought processes of any user will naturally conform to this predefined search tree.

To an extent, predefined constraints are helpful in that predefined constraints allow a search engine to logically and impersonally order the user's thoughts in such a way that if the user has a clear idea of what object the user wants, and if the object is there to be found, then the user is assured of finding the object. Indeed, the user may want to know that choosing any available category in a search sequence will produce an exhaustive and disjunctive list of subcategories from which another choice can be made. Unfortunately, an unnecessarily high cost is too often paid for this knowledge: The user is unnecessarily locked into a limited set of choice sequences, and without sufficient prior knowledge of the object being sought, this limitation can become a hindrance. Specifically, where prescribed search constraints are incompatible with the associative relationships in the user's mind, a conflict can arise between the thought processes of the user and the function of the search engine.

At one time, such conflicts were written off to the unavoidable differences between computers and the human mind. However, some "differences" are neither unavoidable nor problematic. In the case of search engine design, the solution is elegant: upon selecting a category or entering a keyword, the user can be given not only a list of subcategories, but the option to apply previously available categories as well. In slightly more technical terms, the open topology of the search tree can be arbitrarily closed by permitting search sequences to loop and converge. Previous lists can be accessed and used as points of divergence from which new sub-sequences branch off, and the attributes corresponding to distinct sub-sequences can later be merged.

Sort-on-the-fly/search-on-the-fly data analysis, sorting access and retrieval methods and apparatus (hereafter, search-on-the-fly search engine) provide an intuitive means for analyzing various types of databases, allowing a user to obtain information about and/or access data in the database without having to know anything about the database structure. A user selects a desired term, and a database manager reviews the database for all instances of the desired term, even if a specific file or table does not contain the instance. For example, if a user wants to analyze the database using the name of a specific individual as a database entry point, the database manager will search (drill down) the database or index using the desired name, and will organize the results so that all entries associated with that name are displayed. The database need not have a specific file (in a flat database) or a table (in a relational database) of names. The user may perform further on-the-fly searches to narrow the search results, or for other reasons. The search engine then conducts a further search using this criteria and produces a second search result. Further narrowing or broadening of the search are permitted, with the search engine returning results based on any new criteria.

This on-the-fly method or process can be used to simply analyze data or gather information about data stored in a database. The actual data itself does not need to be fetched, displayed, printed or even sorted. The user may simply wish to use this tool to "clean-up" data or understand how data could be sorted or for other reasons.

FIG. 1 is a block diagram of a system 10 that uses search-on-the-fly. In FIG. 1, a database 12 is accessed using a hardware/software interface device 100 to provide data to a user terminal 14. Additional databases 13 and 15 may also be accessed by the terminal 14 using the device 100. The databases 12, 13 and 15 may use different schemas, or may use a same schema. As will be described later, the device 100 may include the search-on-the-fly search apparatus. In an alternative embodiment, the search-on-the-fly search engine may be co-located with the terminal 14. In yet another embodiment, the search-on-the-fly search engine may be incorporated into the structure of one or more of the databases 12, 13 and 15. The device 100 may interface with any one or more of the databases 12, 13 and 15 using a network connection such as through the Internet, for example. Other communications mediums may also be used between the terminal 14, the device 100 and any one or more of the databases 12, 13 and 15. These mediums may include the public switched telephone network (PSTN), cable television delivery networks, Integrated Services Digital Networks (ISDN), digital subscriber lines (DSL), wireless means, including microwave and radio communications networks, satellite distribution networks, and any other medium capable of carrying digital data.

Figure 2:
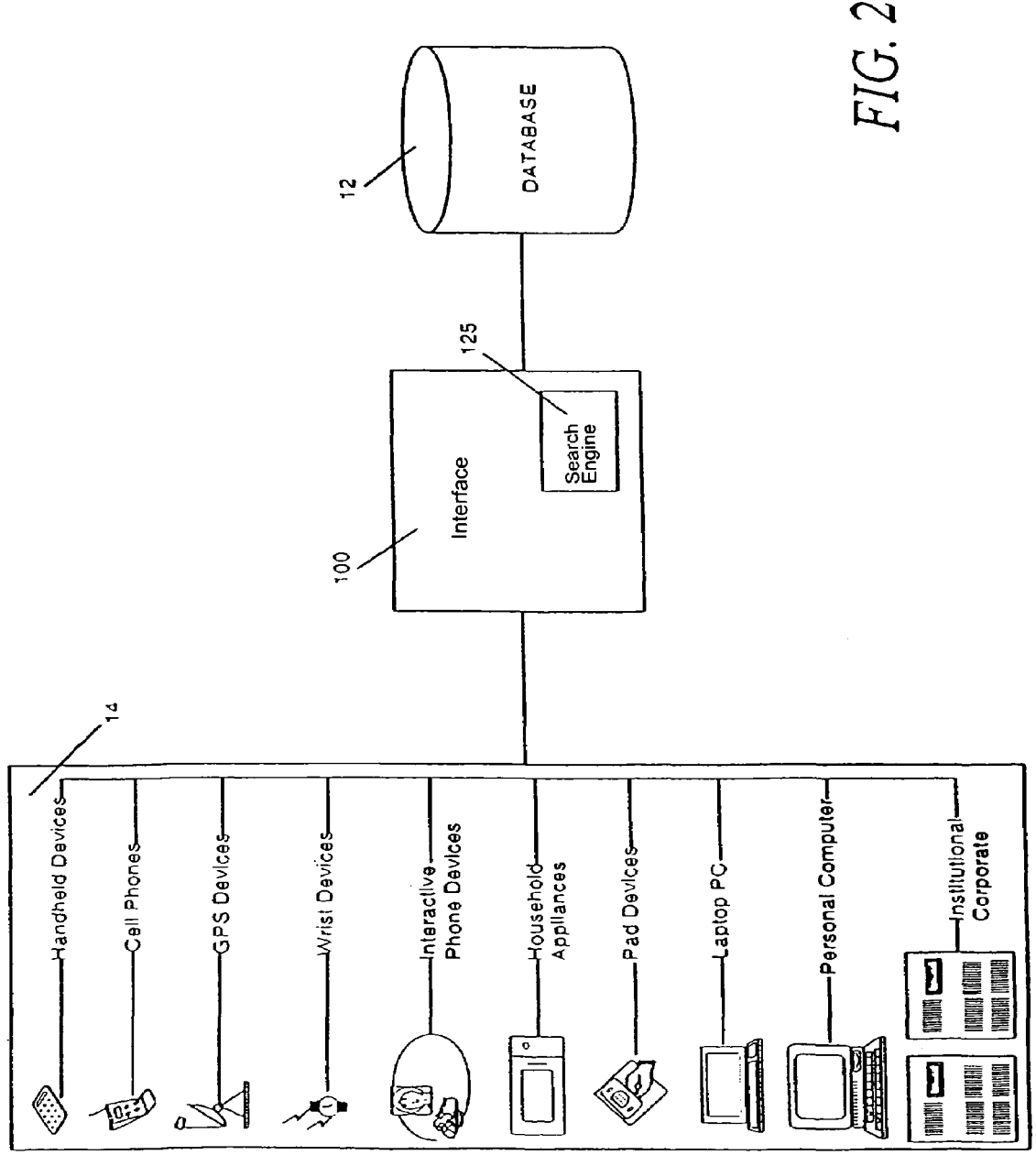
FIG. 2 is another overall block diagram of the system of FIG. 1.

The system shown in FIG. 1 is but one of many possible variations. The search-on-the-fly search engine could also be incorporated within a single computer, such as a personal computer, a computer network with a host server and one or more user stations, an intranet, and an Internet-based system, as shown in FIG. 2. Referring again to FIG. 2, the terminal 14 may be any device capable of displaying digital data including handheld devices, cellular phones, geosynchronous positioning satellite (GPS) devices, wrist-worn devices, interactive phone devices, household appliances, televisions, television set top boxes, handheld computers, and other computers.

Figure 3:
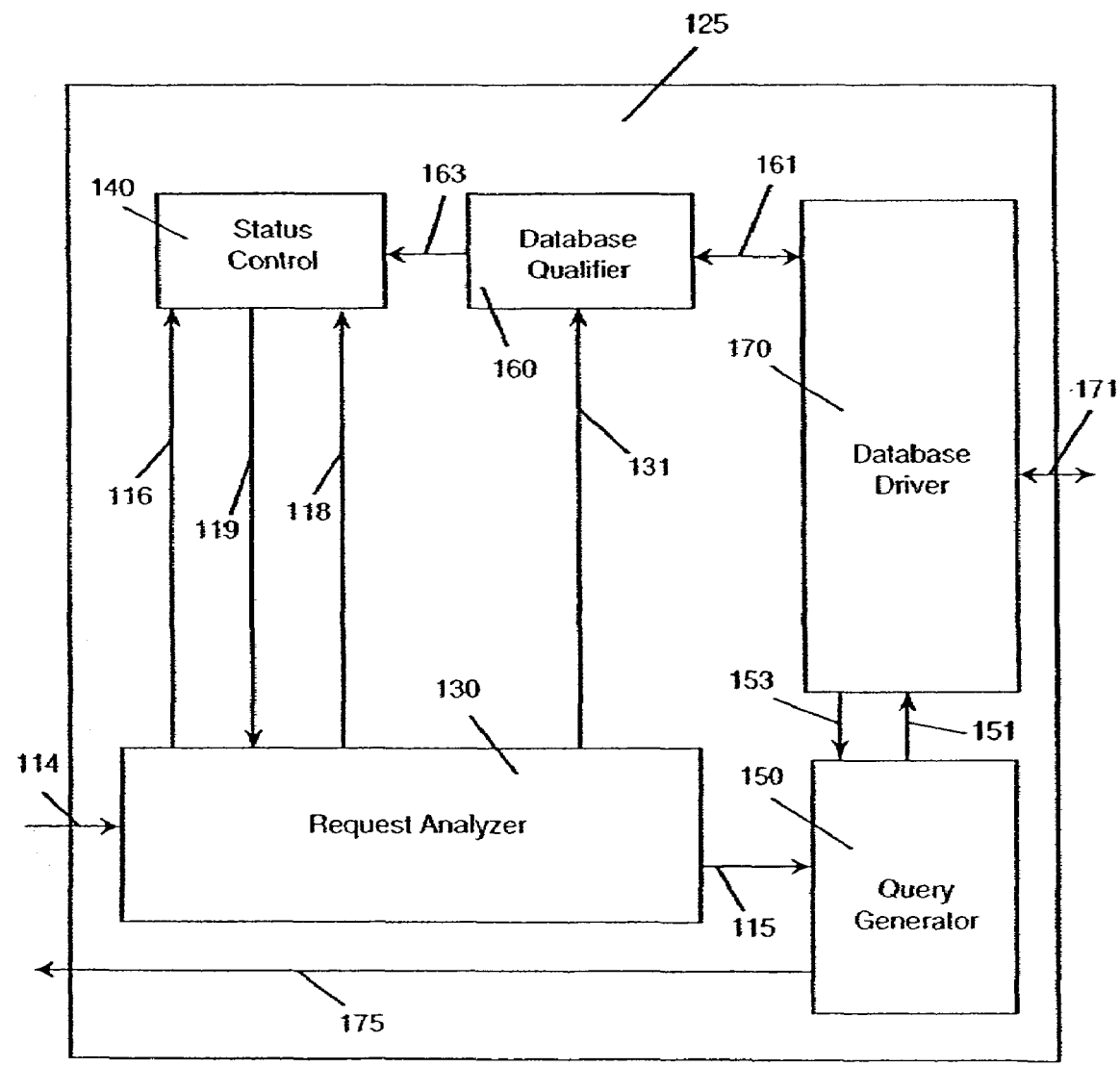
FIG. 3 is a detailed block diagram of the search engine used with the system of FIG. 2.

FIG. 3 is a detailed block diagram of an exemplary search-on-the-fly search engine 125. The search engine 125 includes a request analyzer 130 that receives search requests 114 from the terminal 14 (not shown in FIG. 3) and sends out updated requests 115 to a query generator 150. A status control 140 receives a status update signal 116 and a request status control signal 118 and sends out a request status response 119 to the request analyzer 130. The status control 140 also keeps track of search cycles, that is, the number of search iterations performed. The query generator 150 receives the updated requests 115 from the request analyzer 130 and sends a database access signal 151 to a database driver 170. The query generator 150 receives results 153 of a search of the database 12 (not shown in FIG. 3) from the database driver 170. The query generator 150 provides a display signal 175 to the terminal 14. The database driver 170 sends a database access signal 171 to the database 12. Finally, a database qualifier 160 receives information 161 from the database driver 170 and provides a list 163 of available data fields from the database 12. As will be described later, the list of available data fields 163 may be displayed to a user at the terminal 14, and may be sorted and processed using the request analyzer 130 in conjunction with the database qualifier 160. The database qualifier 160 also receives search information and other commands 131 from the request analyzer 130.

The search engine 125 may identify a database schema by simply using a trial and error process. Alternatively, the search engine 125 may use other techniques know in the art. Such techniques are described, for example, in U.S. Pat. No. 5,522,066, "Interface for Accessing Multiple Records Stored in Different File System Formats," and U.S. Pat. No. 5,974,407, "Method and Apparatus for Implementing a Hierarchical Database Management System (HDBMS) Using a Relational Database Management System (RDBMS) as the Implementing Apparatus," the disclosures of which are hereby incorporated by reference.

The search engine 125 provides search-on-the-fly search capabilities and more conventional search capabilities. In either case, the search engine 125 may perform a preliminary database access function to determine if the user has access to the database 12. The search engine 125 also determines the database schema to decide if the schema is compatible with the user's data processing system. If the database schema is not compatible with the user's processing system, the search engine 125 may attempt to perform necessary translations so that the user at the terminal 14 may access and view data in the database 12. Alternatively, the search engine 125 may provide a prompt for the user indicating incompatibility between the terminal 14 and a selected database.

The search engine 125 may conduct a search using one or more search cycles. A search cycle includes receipt of a request 114, any necessary formatting of the request 114, and any necessary truncation steps. The search cycle ends when a result list 175 is provided to the terminal 14. The search engine 125 may retain a status of each past and current search cycle so that the user can modify the search at a later time. The user may also use this feature of retaining a status of past and current search cycles to combine results of multiple searches, using, for example, a Boolean AND function, a Boolean OR function, or other logic function. The above listed functions will be described in more detail later.

Figure 4:
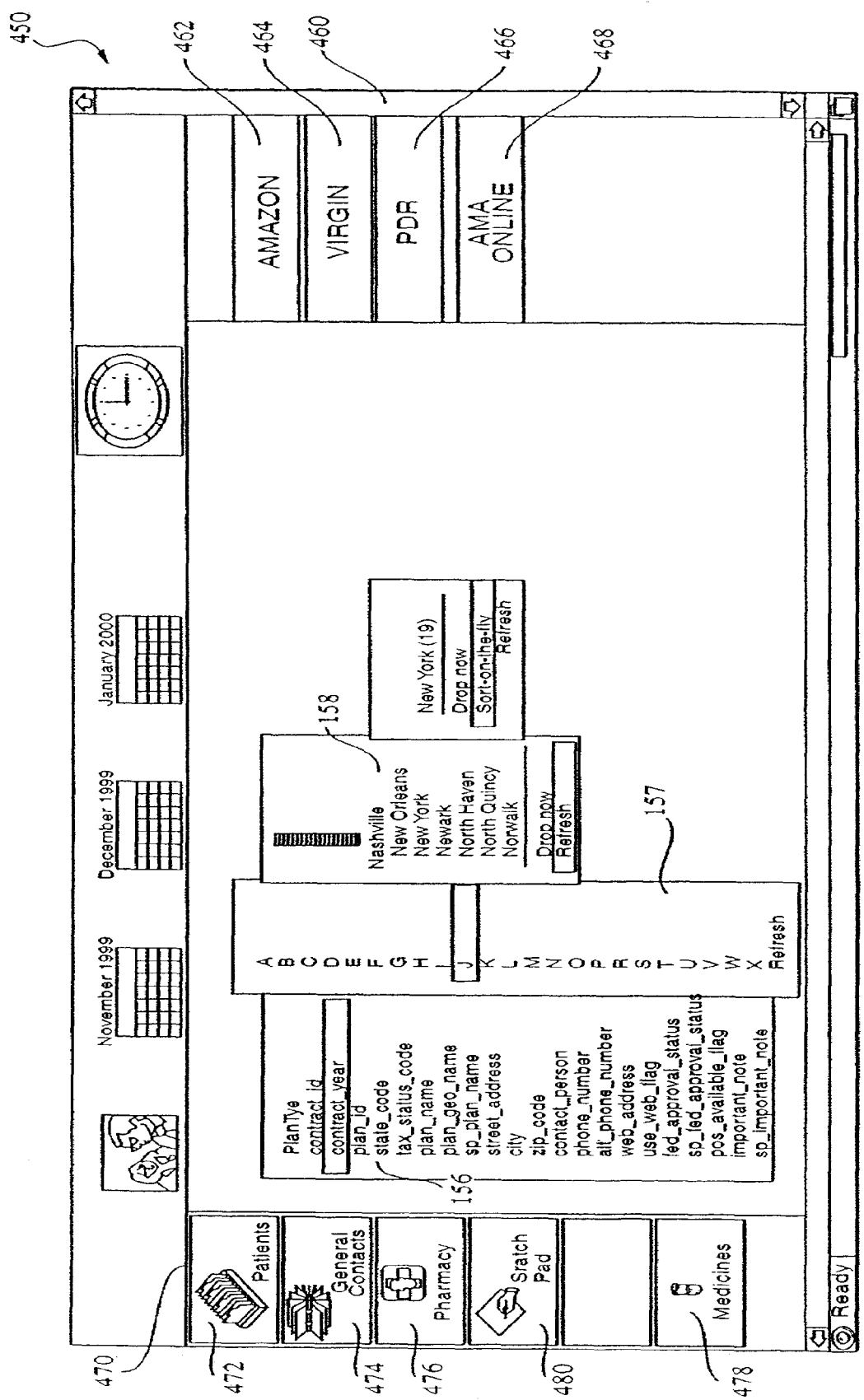
FIG. 4 is an example of a search-on-the-fly using the search engine of FIG. 3.

The search-on-the-fly function of the search engine 125 begins by determining available data fields of the database 12. The database 12 may have its data organized in one or more data fields, tables, or other structures, and each such data field may be identified by a data field descriptor. In many cases, the data field descriptor includes enough text for the user at the terminal 14 to determine the general contents of the data field. The list of data fields may then be presented at the terminal 14, for example, in a pull down list. An example of such a data field result list is shown in FIG. 4, which is from a federal database showing data related to managed health care organizations. This database is available at http://tobaccopapers.org/dnld.htm. In FIG. 4, the first data field listed is "PlanType," which is shown in result list 156. Other data field descriptors show the general categories of data in the database.

Using the terminal 14, the user may select one of the data field descriptors to be searched. For example, the user could select "city." If a number of entries, or records, in the city data field is short, a further result list of complete city names may be displayed. If the entries are too numerous to be displayed within a standard screen size, for example, the search engine 125 may, in an iterative fashion, attempt to reduce, or truncate, the result list until the result list may be displayed. In the example shown in FIG. 4, entries in the city data field are so numerous (the database includes all U.S. cities that have a managed health care organization) that the search engine 125 has produced a result list 157 that shows only a first letter of the city. Based on the available database data fields, the user may then perform a further search-on-the-fly. In this case, the user may choose cities whose first initial is "N." The search engine 125 then returns a result list 158 of cities whose names start with the letter "N." Because in this instance the result list 158 is short, no further truncation is necessary to produce a manageable list.

Figure 5:
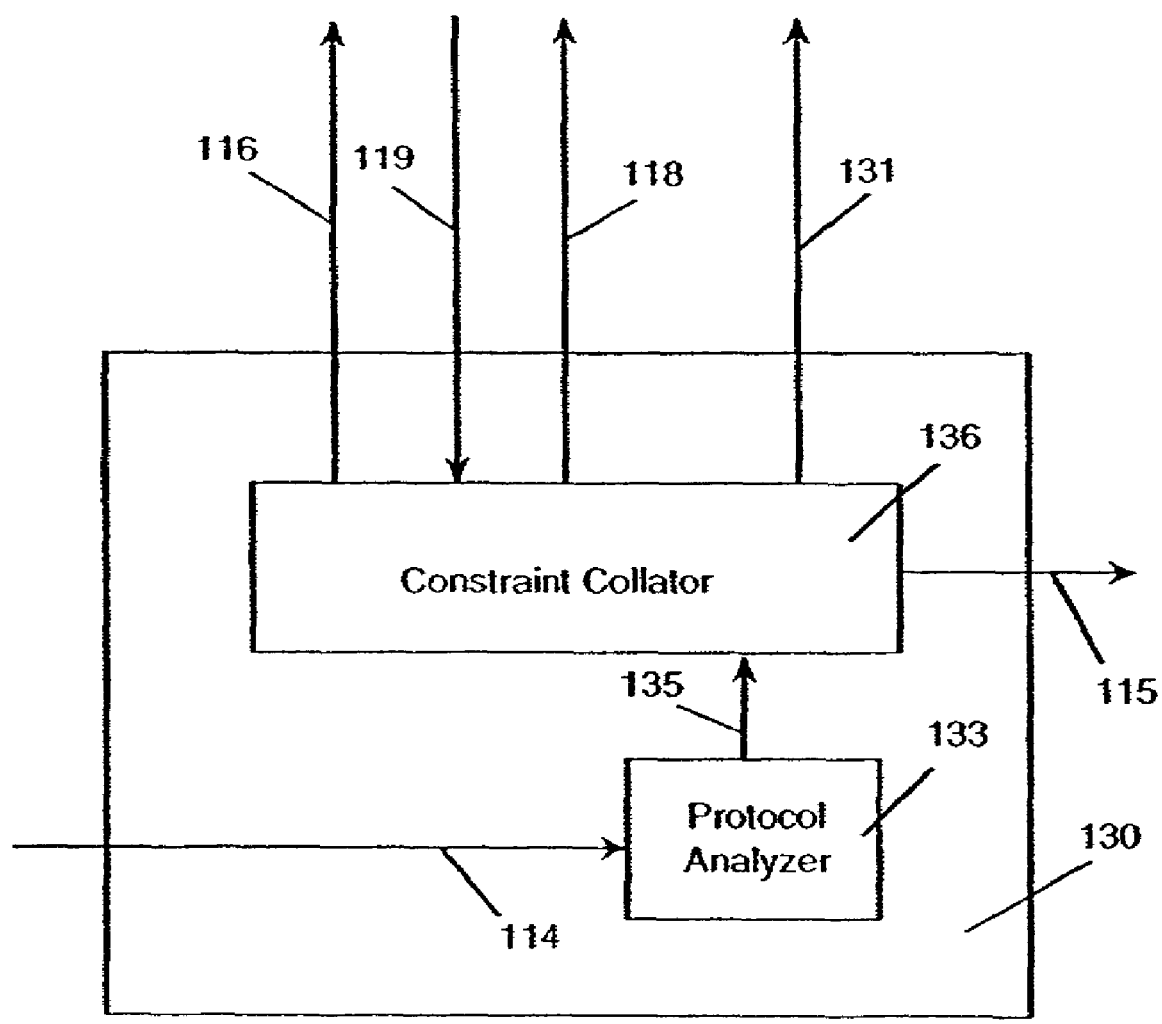
FIGS. 5–9 are detailed block diagrams of components of the search engine of FIG. 3.

FIG. 5 is a more detailed block diagram of the request analyzer 130. A protocol analyzer 133 receives the request 114 and provides an output 135 to a constraint collator 136. The protocol analyzer 133 examines the received request 114, determines a format of the request 114, and performs any necessary translations to make the request format compatible with the database to be accessed. If the database to be accessed by the terminal 14 is part of a same computer system as the terminal 14, then the protocol analyzer 133 may not be required to perform any translations or to reformat the request 114. If the database to be accessed is not part of the same computer system as the terminal 14, then the protocol analyzer 133 may be required to reformat the request 114. The reformatting may be needed, for example, when a request 114 is transmitted over a network, such as the Internet, to a database coupled to the network.

The constraint collator 136 provides the updated request 115 (which may be an initial request, or a subsequent request) to the query generator 150. The constraint collator 136 is responsible for interpreting the request 114. The constraint collator 136 performs this function by comparing the request 114 against information stored in the status control 140. In particular, the constraint collator 136 sends the request status control signal 118 to the status control 140 and receives the request status response 119. The constraint collator 136 then compares the request status response 119 to constraint information provided with the request 114 to determine if the constraint status should be updated (e.g., because the request 114 includes a new constraint). In an embodiment, the constraint collator 136 compares constraint information in a current request 114 to constraint information residing in the status control 140, and if the current request 114 includes a new constraint, such as a new narrowing request (for example, when the user clicks, touches or points over a field shown in a last search cycle), then the constraint collator 136 adds the updated information and sends the updated request 115 to the query generator 150. If the constraint status should be updated, the constraint collator 136 sends the status update 118 to the status control 140. If the request 114 is a refresh request, the constraint collator 136 sends a reset command 131 to the database qualifier 160. The updated request 115 (possibly with a new constraint) is then sent to the query analyzer 150 for further processing.

Figure 6:
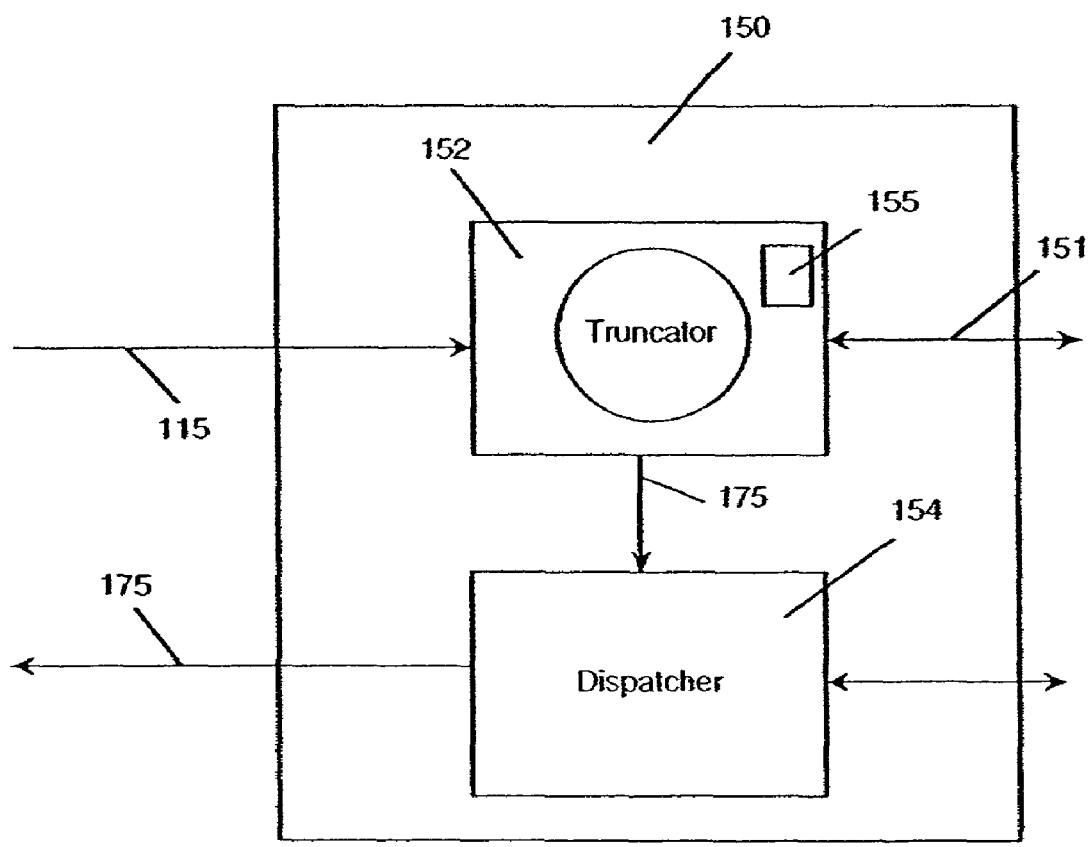

FIG. 6 is a block diagram of the query generator 150. The overall functions of the query generator 150 are to scan a database, such as the database 12, using the database driver 170, and to collect search results based on constraints supplied by the request analyzer 130. The query generator 150 then returns the search results 175 to the terminal 14.

The query generator 150 includes a truncator 152 and a dispatcher 154. The truncator 152 receives the updated request 115, including a new constraint, if applicable. The truncator 152 creates new queries, based on new constraints, and applies the new requests 151 to the database 12 using the database driver 170. Many different methods of truncating for display or viewing may be used by truncator 152. The truncator 152 may include a variable limit 155 that is set, for example, according to a capacity of the terminal 14 to display the search results 175. If data retrieved from the database 12 exceed the limit value, the truncator 152 adjusts a size (e.g., a number of entries or records) of the data until a displayable result list is achieved. One method of adjusting the size is by cycling (looping). Other methods may also be used to adjust the size of the result list. For example, the terminal 14 may be limited to displaying twenty lines of data (entries, records) from the database 12. The truncator 152 will cycle until the displayed result list is at most twenty lines. In an embodiment, the truncation process used by the truncator 152 assumes that if the user requests all values in a particular data field from the database 12, and there are no other constraints provided with the request 114, and if the size of the resulting result list is larger than some numeric parameter related to a display size of the terminal 14, then the constraints may be modified by the truncator 152 so that the result list can be accommodated (e.g., displayed on one page) by the terminal 14. For example, instead of a full name of a city, some part of the name—the first n letters—is checked against the database 12 again, and n is reduced until the result list is small enough for the capacity of the terminal 14. If the maximum number of displayable results is three (3), and the database 12 contains the names of six cities "Armandia, Armonk, New Orleans, New York, Riverhead, Riverdale," then the first attempt to "resolve" the result list will stop after a result list display is created with the full name of the cities:

Armandia, Armonk, New Orleans . . . (the limit was reached)
Try again with 7 characters:
Armandia, Armonk, New Orl, New Yor, (limit reached again)
Again with 5 characters:
Armandia, Armonk, New O, New Y, (limit reached again)
Again with 3 characters:
Arm ( . . . ), New ( . . . ), Riv ( . . . ) These results may now be displayed on the terminal 14.

The display of Arm, New, Riv can then be used to conduct a further search-on-the-fly. For example, a user could then select Riv for a further search-on-the-fly. The result list returned would then list two cities, namely Riverhead and Riverdale.

In another embodiment, a fixed format is imposed such that all queries generated against a database will have preset limits corresponding to the capacity of the terminal 14.

In yet another embodiment, the truncator 152 may adjust the field size by division or other means. For example, if the display limit has been reached, the truncator 125 may reduce the field size, X by a specified amount. In an embodiment, X may be divided by two. Alternatively, X may be multiplied by a number less than 1, such as ¾, for example. Adjusting the field size allows the search engine 125 to perform more focused searches and provides more accurate search results.

In another embodiment, the truncator first attempts to display information without truncation. If that is not appropriate, the truncator may attempt truncation by beginning with one character (26 letters and perhaps 10 digits) and incrementing to two characters and then three, four, until a failure to display is reached.

In still another embodiment, the user may select a limit that will cause the truncator 152 to adjust the field size. For example, the user could specify that a maximum of ten entries should be displayed.

For certain data fields, a terminal of a hand-held device, may have a very limited display capacity. For example, a personal data assistant (PDA—see FIG. 2) or a cellular phone (see FIG. 2) may be used to search a database, with the results displayed on a small screen. Alternatively a user may specify a limit on the number of entries for display. In the illustrated cases, the search engine 125 may return a result list 175 of the request 114 on multiple display pages, and the user may toggle between these multiple display pages. As an example, if the terminal 14 is limited to displaying a maximum of ten entries, and if the request 114 results in a return of a data field comprising the four hundred largest cities in the United States, the truncator 152 will produce a list of twenty three entries comprising twenty three alphabetical characters (no cities that begin with Q, Y or Z—see FIG. 4). The search engine 125 may then display the results on three pages. Alternatively, the truncator 152 could produce a list of letter groups into which the cities would fall, such as A-D, E-G, H-M, N-R, and R-X, for example. In another alternative, the search engine 125 may send a notice to the terminal that the request 114 cannot be accommodated on the terminal 14 and may prompt the user to add an additional constraint to the request 114, so that a search result may be displayed at the terminal 14.

Figure 14:
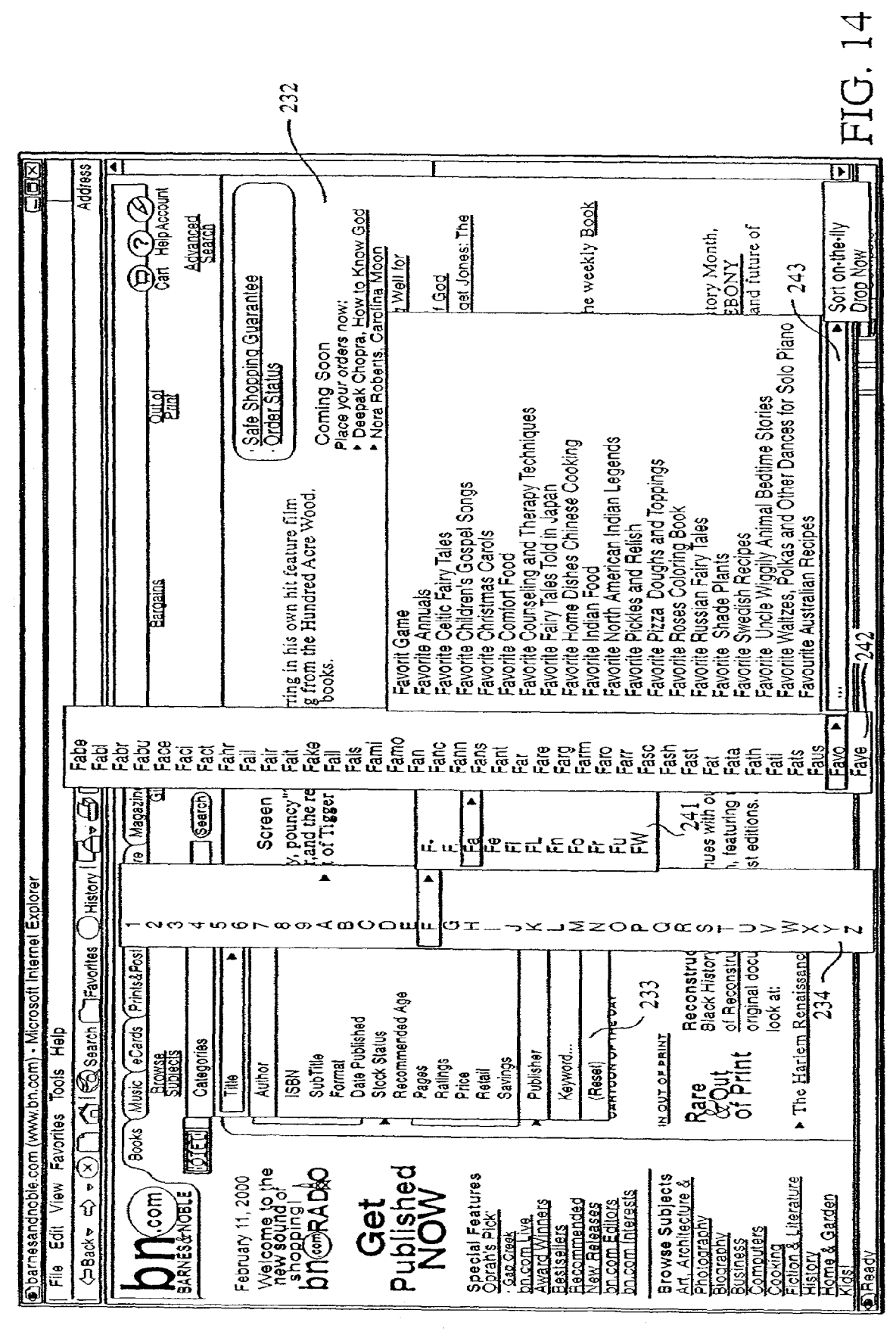

Adjusting the data field size also provides more convenient search results for the user. For example, if a user were to access an Internet-based database of books for sale, and were to request a list of all book titles beginning with the letter "F," a common search engine might return several hundred titles or more, displaying perhaps twenty titles (entries) at a time. The user would then have to look through each of many pages to find a desired title. This process could be very time-consuming and expensive. Furthermore, if the search results were too large, the common search engine might return a notice saying the results were too large for display and might prompt the user to select an alternative search request. However, performing the same search using the search engine 125 allows the truncator 152 to reduce the size of the information displayed to a manageable level. In this example, if the request 114 includes the constraint "F," the truncator 152 will loop through the data in a data field that includes book titles starting with the letter "F" until a list is available that can fit within the display limits of the terminal 14, or that fits within a limit set by the user, for example. The first list returned to the terminal 14 as a result of this request 114 may be a two letter combination with "F" as the first letter and a second letter of a book title as the second letter. For example, the first list may include the entries "Fa," "Fe," "Fi," "Fo," and "Fu," all of which represent titles of books. The user could then select one of the entries "Fa," "Fe," "Fi," "Fo," and "Fu" to perform a further search, continuing the process until one or more desired titles are displayed. An example of a similar truncation result is shown in FIG. 14.

When a parameter related to the search results is adequately truncated, the parameter is directed to the dispatcher 154, which retrieves the data from database 12 using the database driver 170. The dispatcher 154 then directs the final, truncated search results 175 back to the terminal 14 as a response to the request 114.

Figure 7:
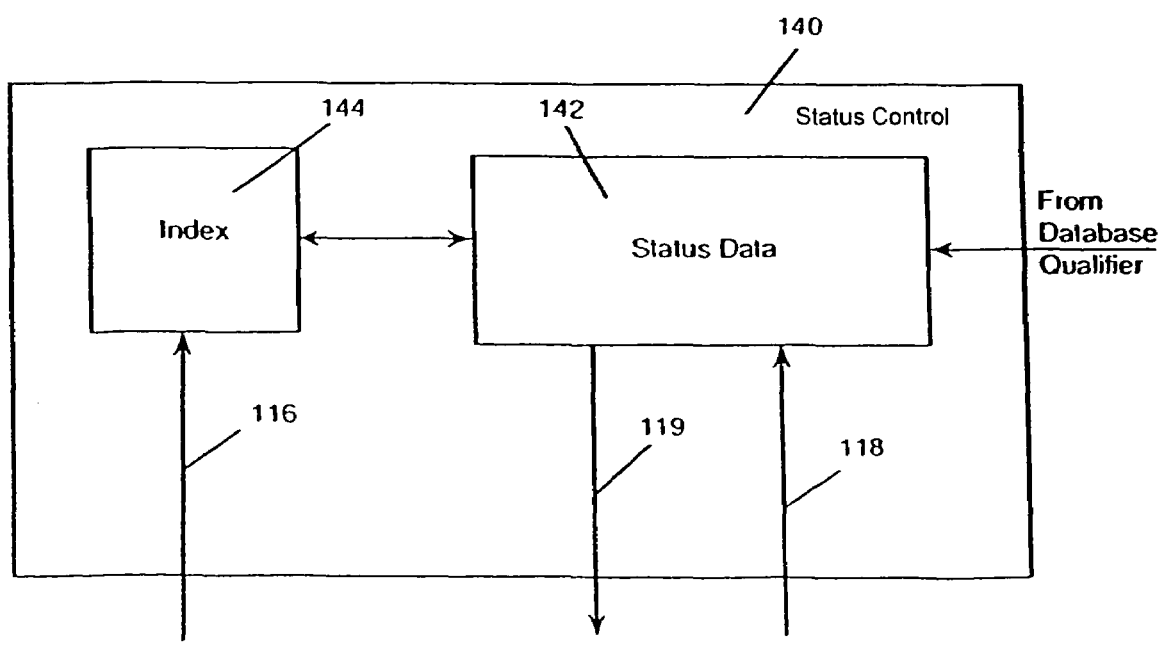

FIG. 7 is a block diagram showing the status control 140, which is responsible for monitoring the status of a current search. Due to the nature of the search engine 125, the user can choose any combination of constraints, fields or keywords, including those from past and current search cycles. The status control 140 may keep track of all past cycles of the search, as well as all information necessary to return to any of those past search cycles. The status control 140 includes a status data module 142, and an index module 144. The status data module 142 contains data related to each such search cycle, including the constraint(s) entered during the search cycle, any truncation steps taken, and the results of such truncation, for example. The index module 144 provides access to these data. When the request 114 is being analyzed by the request analyzer 130, the constraint collator 136 sends a request status query 116 to the index module 144. The status data module 142 contains information related to all past and current search cycles, which are referenced by the index module 144, and delivers a status response 119 for the most recent search cycle to the constraint collator 136. When a new constraint is sent to the query generator 150, the status data module 142 is updated 118 by the constraint collator 136. Specific structures of the request 114, the request status query 116, the status response 119 and the request status control 118 will be provided later.

The status data module 142 may be reset by the database qualifier 160 with all available fields when a refresh function is used. In an embodiment, the refresh function may be used to clear all past search cycles and the current search cycle from the status control 140. In such an event, the search results, such as the search results shown in FIG. 4, will no longer be displayed at the terminal 14, and data related to the past and the current search cycles may not be used for future search cycles. In effect, the refresh function may cause the entire search to be discarded. The refresh function may be activated when a user selects a refresh button (see FIG. 4) on a displayed result list, or on another portion of a GUI. Alternatively, the refresh function may discard selected search cycles. In this alternative embodiment, the user may, for example, move a cursor to a desired result list from a past search cycle and activate a refresh, reset, back, or drop button. All data associated with search cycles subsequent to the selected search cycle, including all displayed result lists may then be discarded.

Figure 8:
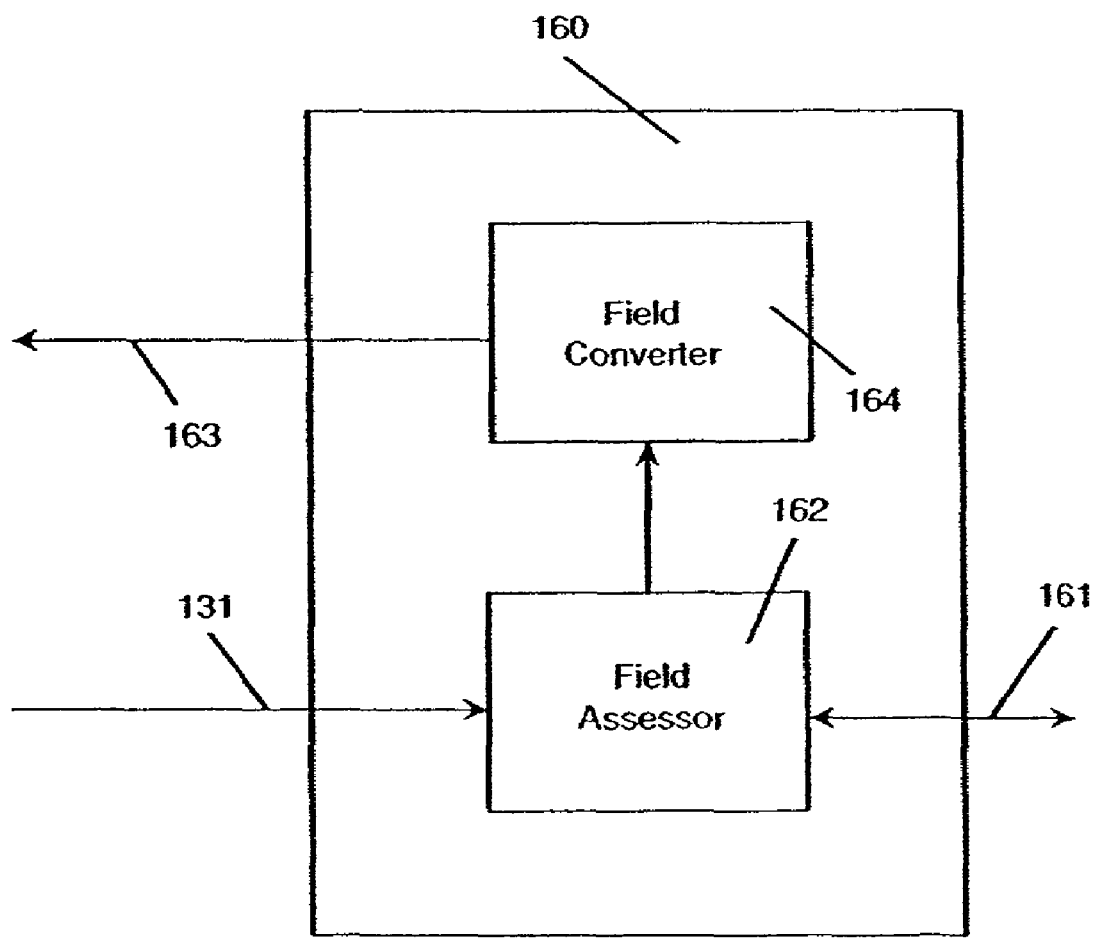

FIG. 8 is a block diagram showing the database qualifier 160. The database qualifier 160 provides data field information at the start of a search or when the search engine 125 is refreshed. A field assessor 162 access the database 12 using the database driver 170, and identifies and accesses discrete data fields and other information in the database 12. A field converter 164 structures the data field information into a usable (searchable/sortable) structure and sends 163 the formatted data field information to the status control 140. Techniques for identifying and accessing the data fields, and for formatting the data field information are well known in the art. Such techniques are described, for example, in U.S. Pat. No. 5,222,066, Interface for Accessing Multiple Records Stored in Different File System Formats, the disclosure of which is hereby incorporated by reference.

Figure 9:
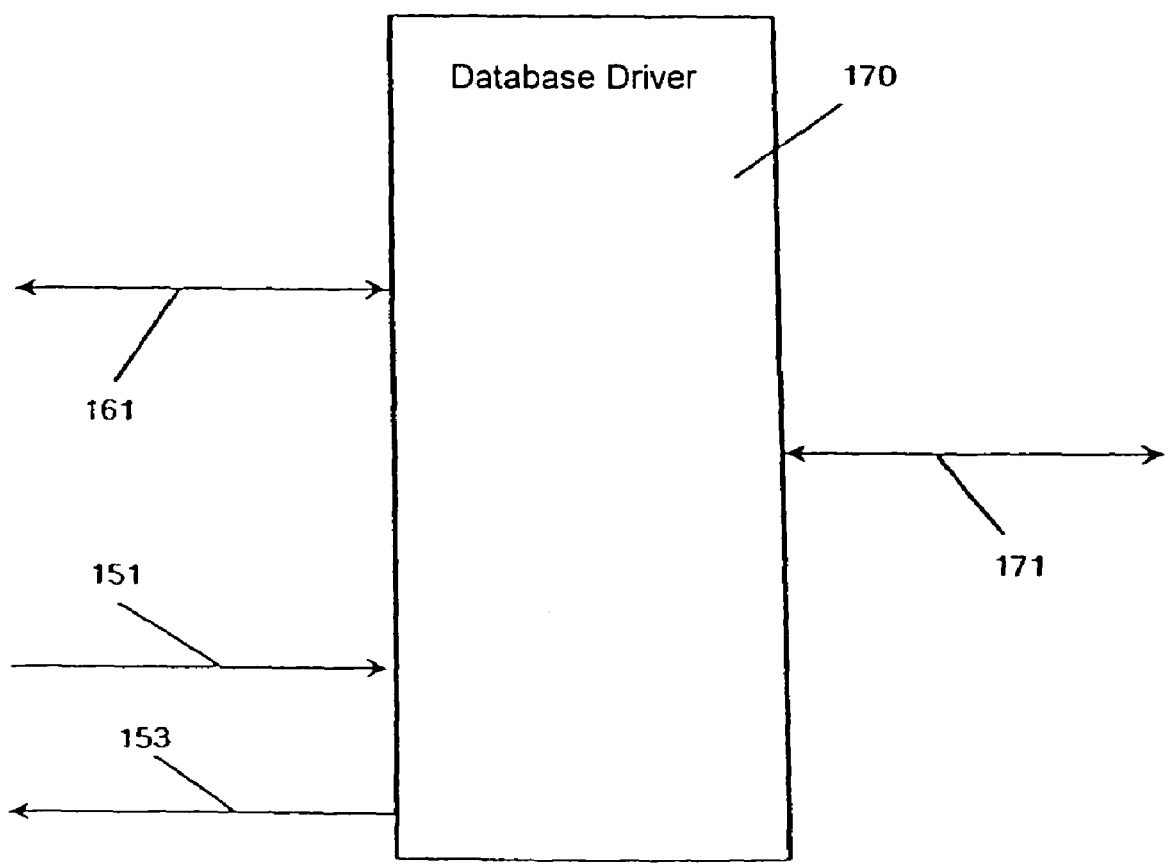

FIG. 9 is a block diagram of the database driver 170. The database driver 170 is the universal interface with the database 12, which can be a local or a remote database.

Figure 10:
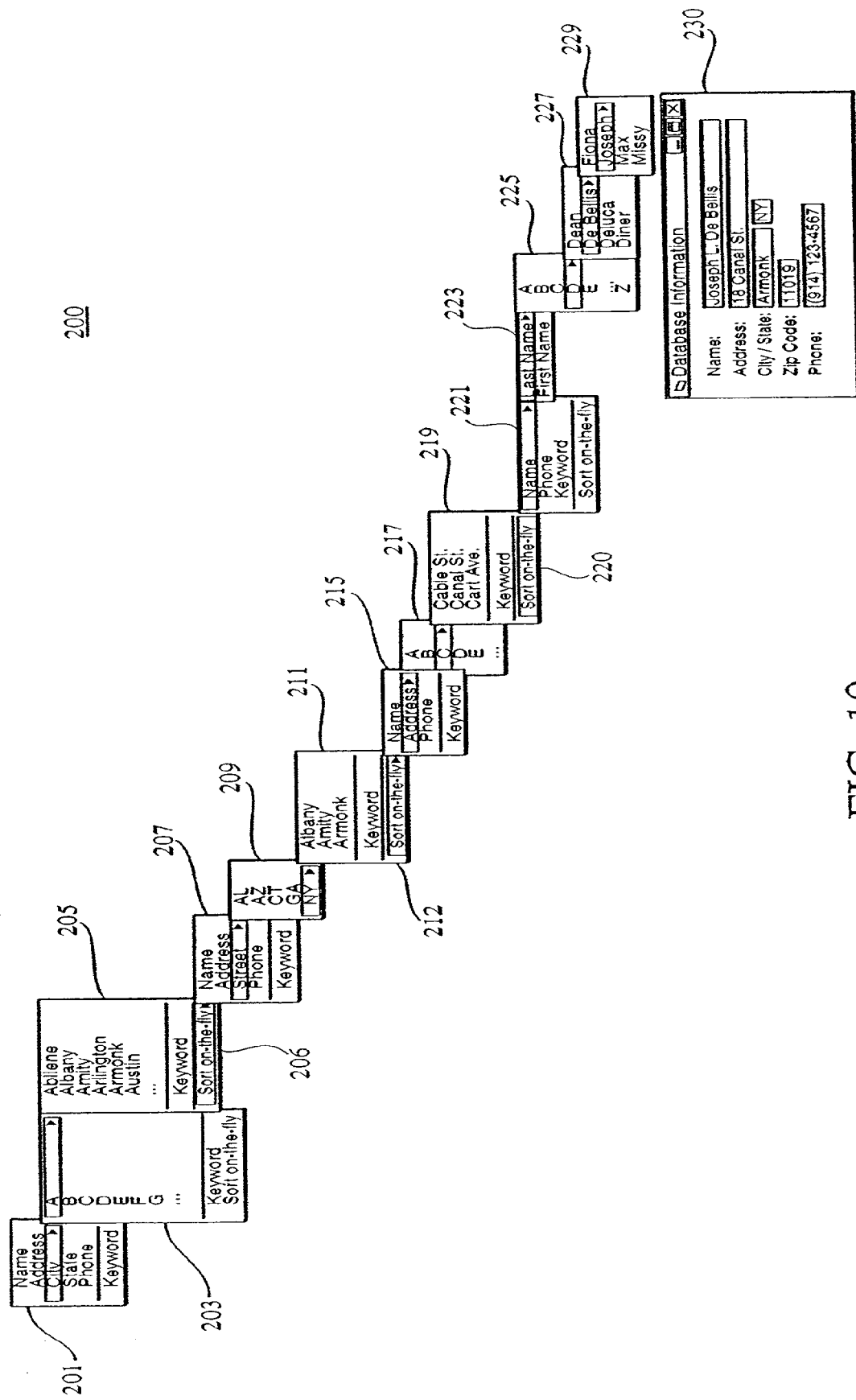
FIG. 10 is another example of a search-on-the-fly using the search engine of FIG. 3.
Figure 12:
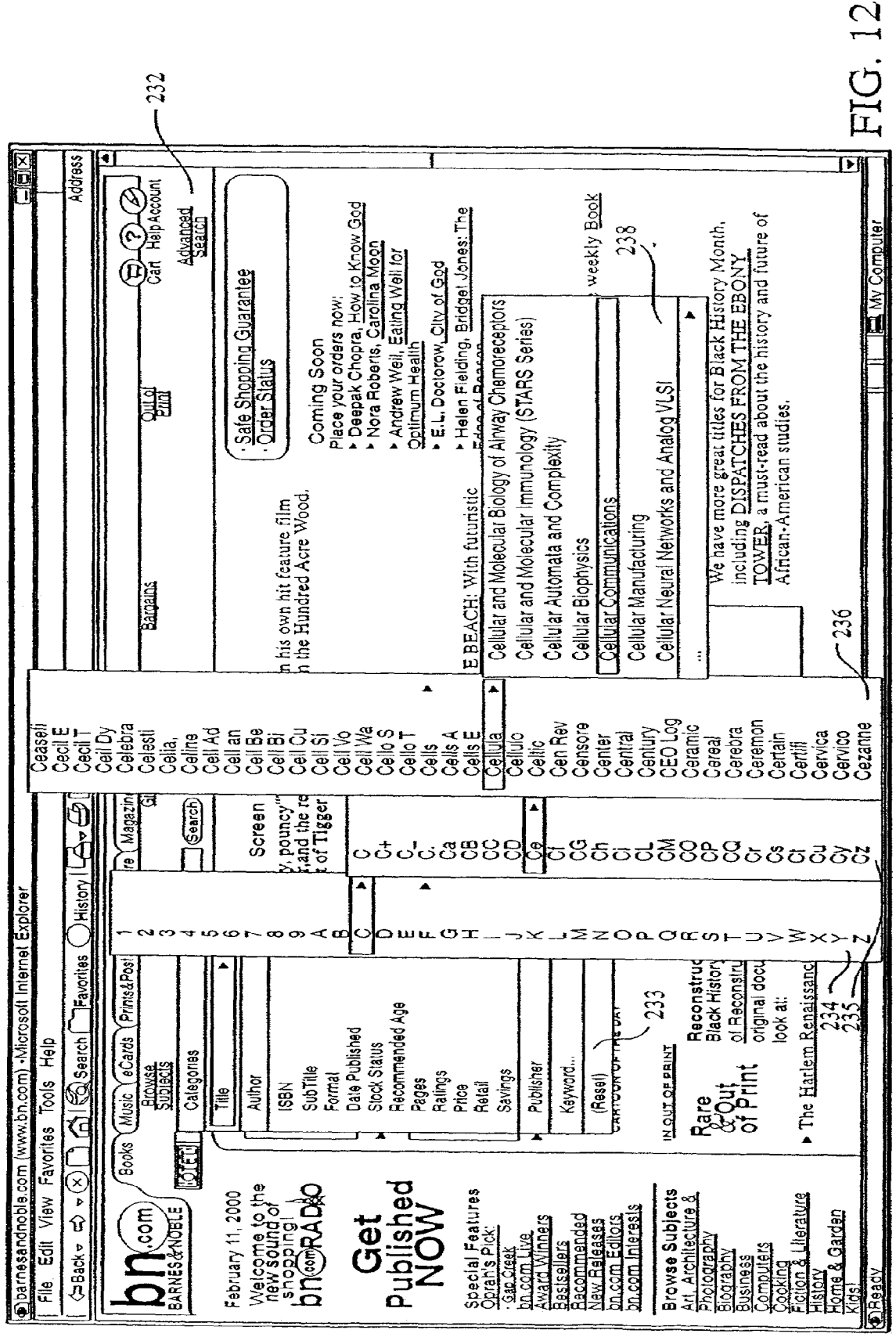
Figure 13:
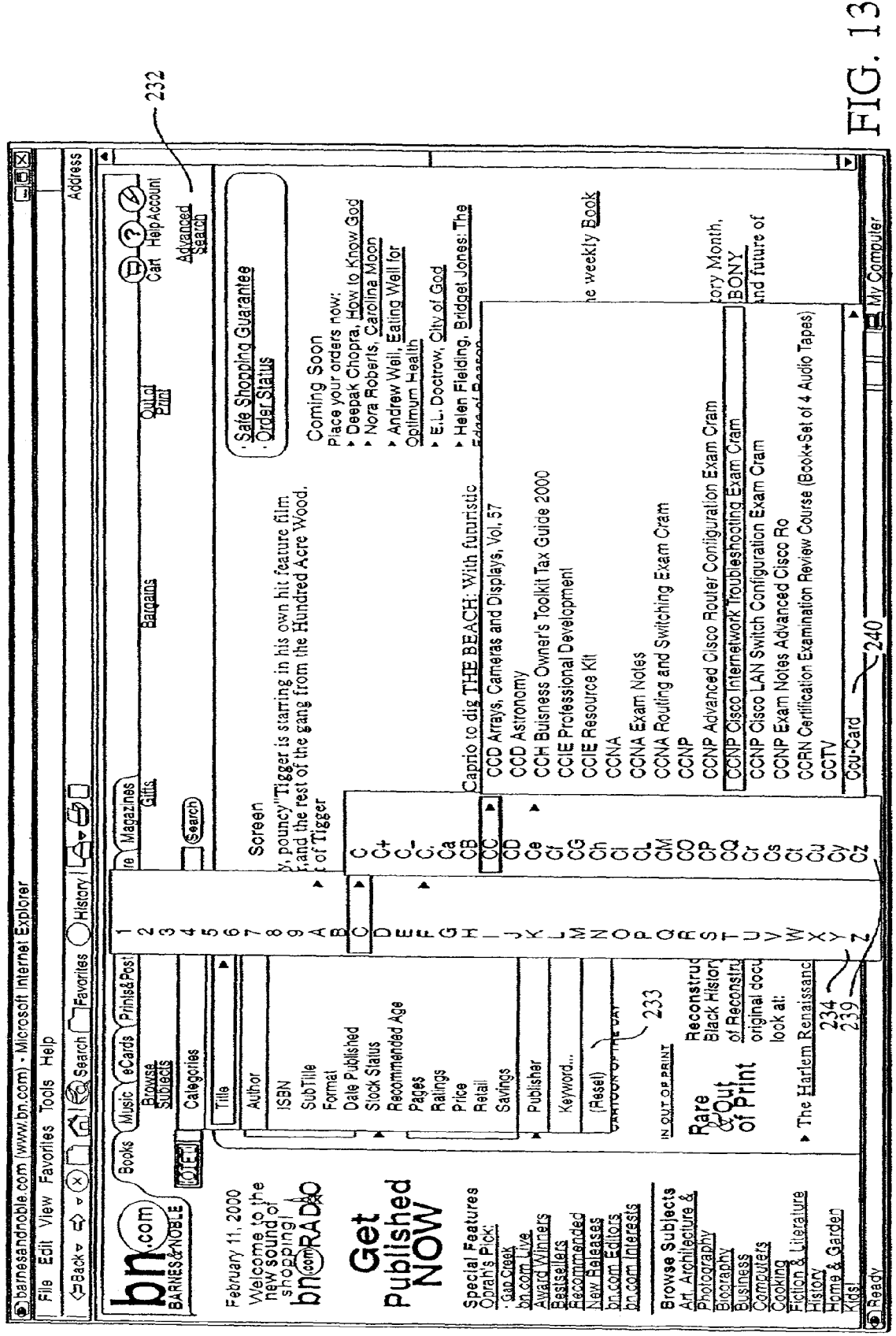

FIG. 10 is an example of a search-on-the-fly using the search engine 125. In FIG. 10, a database 200 includes information related to a number of individuals. The information in the database 200 may be presented at the terminal 14 using a series of screens or menus 201–230. The user first accesses the database 200 and is presented with a list 201 of the information or data fields contained in the database 200. The result list 201 is generated by the field assessor 162, and is provided for display at the terminal 14 by the query generator 150. As shown in FIG. 10, a user has selected the data field "City" for display of information. However, the number of "cities" listed in the database 200 is too large to conveniently display at one time (i.e., on one page) at the terminal 14. Accordingly, the truncator 152 will loop a required number of times until an adequate display is available. In FIG. 10, the menu 203 shows the results of the truncation with only the first letter of a city name displayed.

Using the menu 203, the user has selected cities beginning with the letter "A." The results are shown in menu 205. Now, the user elects to conduct another search-on-the-fly, by selecting the "sort-on-the-fly" option 206. The query generator 150 displays all the information fields available from the database 200, except for the information field already displayed, namely "City." The results are displayed in menu 207. The user then elects to further search on the data field "State." The query generator 150 returns the requested information as displayed in menu 209, listing five states by their common two-letter abbreviation. The user then chooses New York from the menu 209, and the query generator 150 returns a list of cities in New York, menu 211.

Next, the user elects to conduct another search-on-the-fly, option 212, and the query generator 150 returns only the remaining data fields for display in menu 215. From the menu 215, the user selects "Address" for the next data field to search, and the query generator 150 returns a menu 217 showing only first letters of the address. This signifies that the data field "Address" was too large to be easily displayed on the terminal 14. The user then elects to search on all addresses that begin with "C." The query generator 150 returns a list of addresses by displaying only street names, menu 219.

The user then elects to conduct a further search-on-the-fly, option 220, and the remaining two data fields, "Name" and "Phone" are displayed as options in menu 221. The user selects name, and the query generator returns a further breakdown of the data by last name and by first name, menu 223. This process continues, with further menus being used to select a last name and a first name from the database 200. When the final selection is made, information from the database 200 related to the individual is displayed in window 230.

In the example shown in FIG. 10, the user could have refreshed the search engine 125 at any time, and the search would have recommenced at the beginning. Alternatively, the user, by simply selecting a prior menu such as the menu 215, could have changed the course of the search. In this alternative, if the user had gone back to the menu 215 and instead of selecting "Address," selected "Phone," then the menus 217–229 would be removed from display at the terminal 14, and the search would begin over from the point of the menu 215.

Figure 11:
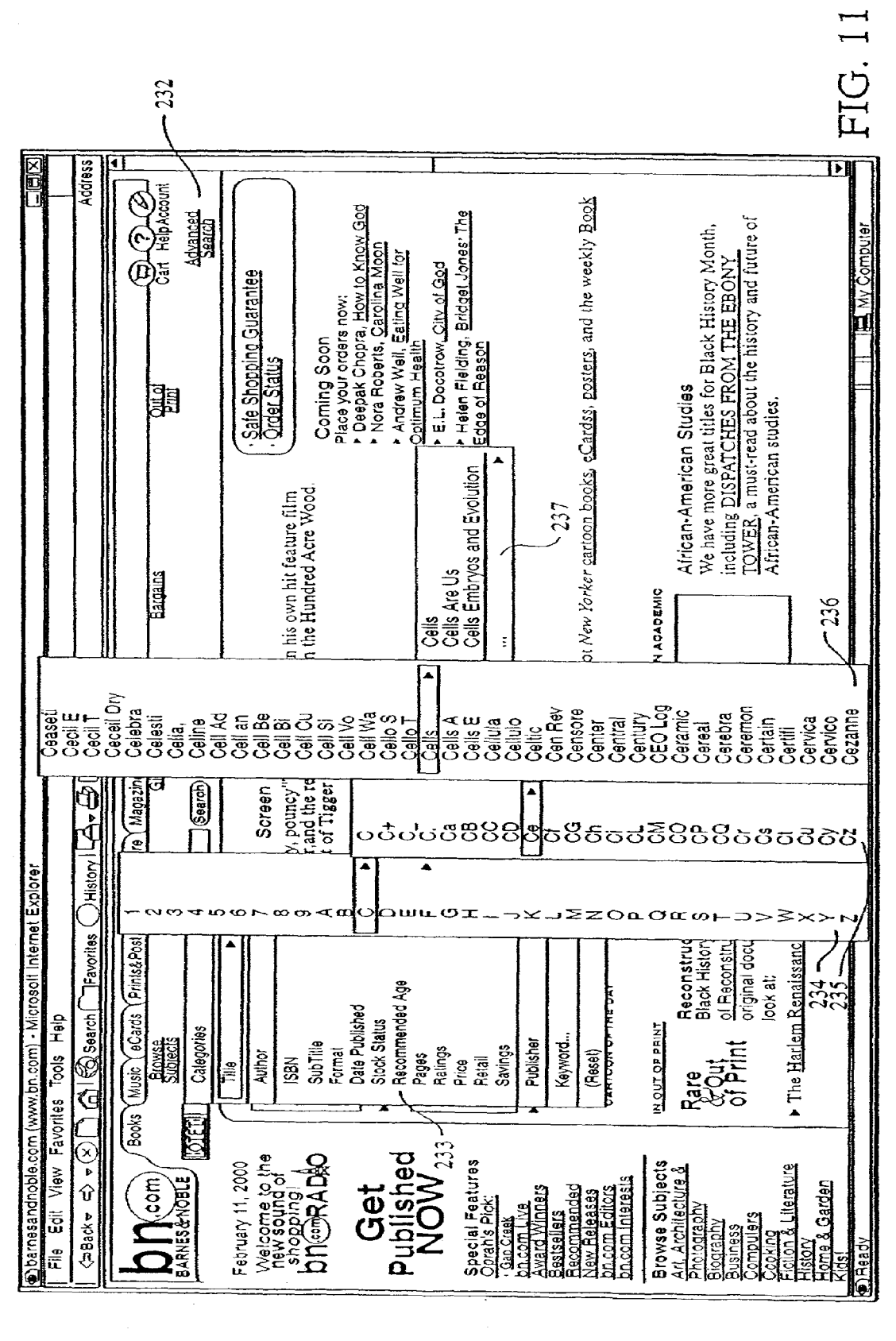

FIGS. 11–15b illustrate exemplary searches of a remote database, such as the database 13 shown in FIG. 1. The database in the illustrated example is for an Internet website 232 that sells books. The examples illustrated are based on a Barnes & Noble™ website. In FIG. 11, the user has applied the search engine 125 to the website 232 database, and the query generator 150 has returned a list 233 of data fields from which the user may select to access data from the website 232 database. The list 233, and other lists described below, may be displayed as overlays on the website 232. In the example illustrated, the user selects "Title" for the first search cycle. Because the list of titles is too large to easily display at the terminal 14, the truncator 152 loops until an alphanumeric list 234 is created. The list 234 is then returned to the terminal 14. For the next search cycle, the user selects titles that begin with the letter "C." Again, the data field contains too many entries to conveniently display at the terminal 14, and the truncator 152 loops as appropriate until list 235 is created. The process continues with subsequent lists 236 and 237 being returned to the terminal 14.

FIGS. 12–15*b* illustrate alternate searches that may be completed using the website 232 database.

For the search results shown in FIGS. 11–15*b*, the status control 140 may iterate as follows:

Status Control Started . . .
Key: Title1 Option: Title Level: 1 Filter: Field: Title
Key: A2 Option: A Level: 2 Filter: SUBSTRING([Title],1,1)='A' Field: Title
Key: AA3 Option: AA Level: 3 Filter: SUBSTRING([Title],1,2)='AA'AND SUBSTRING([Title],1,1)='A' Field: Title
Key: F4 Option: F Level: 4 Filter: SUBSTRING([Title],1,1)='F' Field: Title
Key: Fa5 Option: Fa Level: 5 Filter: SUBSTRING([Title],1,2)='Fa' AND SUBSTRING([Title],1,1)='F'Field: Title
Key: Favo6 Option: Favo Level: 6 Filter: SUBSTRING([Title],1,4)='Favo' AND SUBSTRING([Title],1,2)='Fa'AND SUBSTRING([Title],1,1)='F' Field: Title
Key: C7 Option: C Level: 7 Filter: SUBSTRING([Title],1,1)='C' Field: Title
Key: Ce8 Option: Ce Level: 8 Filter: SUBSTRING([Title],1,2)='Ce'AND SUBSTRING([Title],1,1)='C' Field: Title
Key: Cells9 Option: Cells Level: 9 Filter: SUBSTRING([Title],1,5)='Cells' AND SUBSTRING([Title],1,2)='Ce' AND SUBSTRING([Title],1,1)='C' Field: Title
Key: Cellula10 Option: Cellula Level: 10 Filter: SUBSTRING([Title],1,7) ='Cellula' AND SUBSTRING([Title],1,2)='Ce' AND SUBSTRING([Title],1,1) ='C' Field: Title
Key: CC11 Option: CC Level: 11 Filter: SUBSTRING([Title],1,2)='CC' AND SUBSTRING([Title],1,1)='C' Field: Title
Status Control Terminated.

Figure 15A:
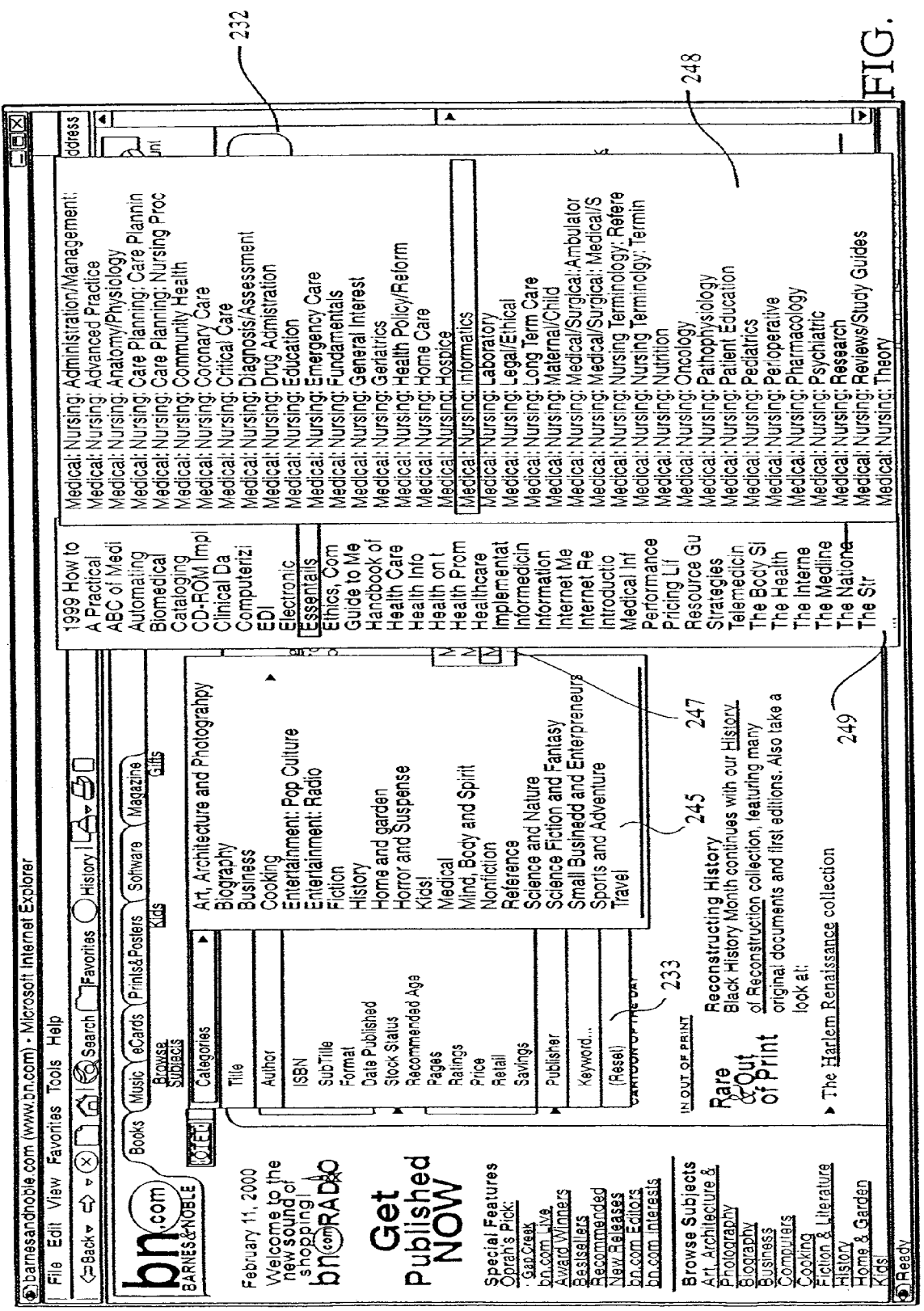
Figure 15B:
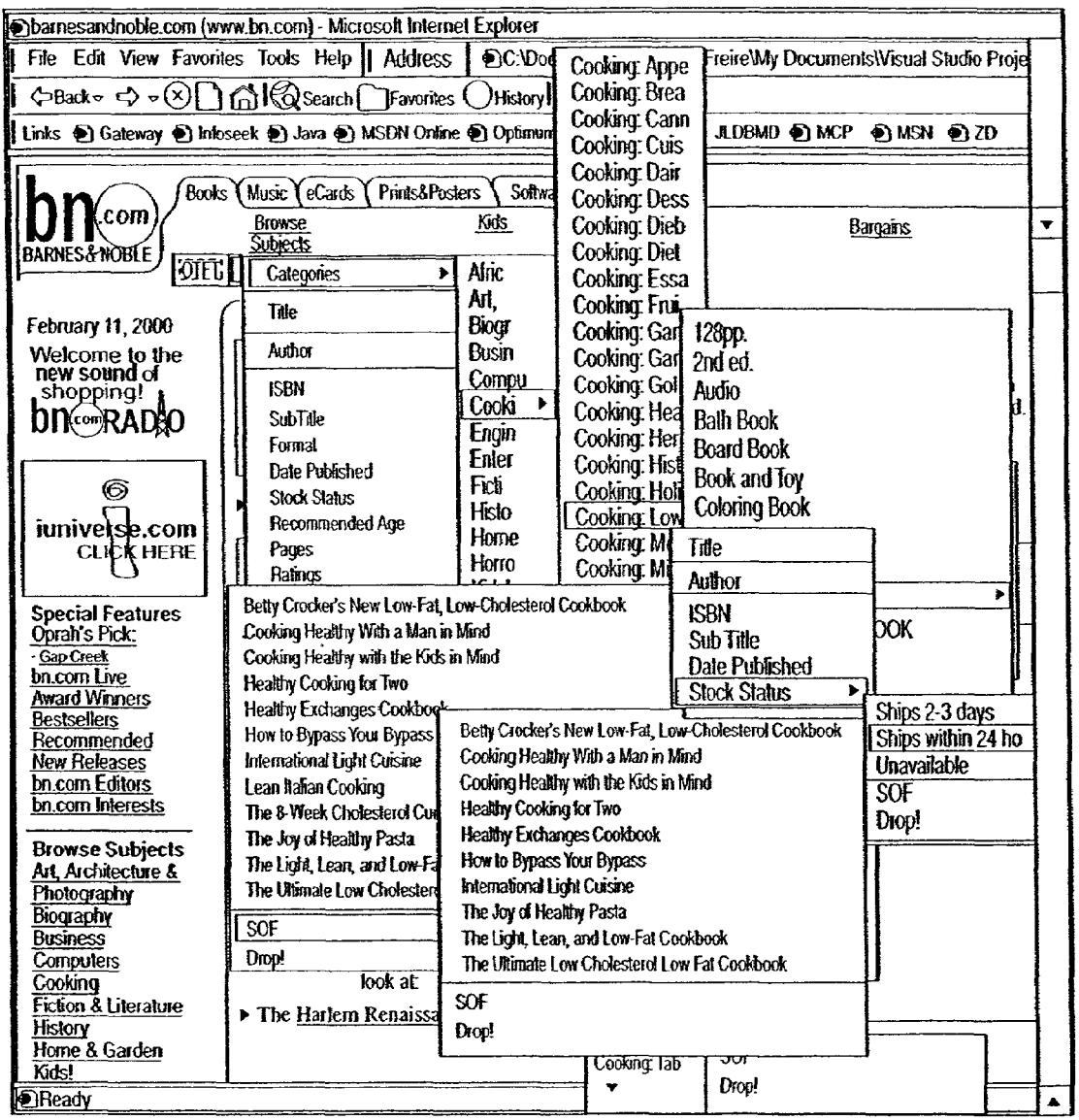

FIG. 15*b* shows the results for a search for a low-fat cookbook using the search engine 125 as applied to a remote database. In this example, the remote database is 14 coupled to a Barnes & Noble web page. The first query, and resulting message strings, are illustrated by the following:

Query Analyzer
Message Received: ACK
Status Control: Refresh
Dispatcher
Message Sent: Categories~-~Title~-~Author~-~ISBN~SubTitle~Format~Date
Published~Stock Status~Recommended
Age~Pages~Ratings~Price~Retail~Savings~-~Publisher
Query Analyzer
Message Received: CLK#0#1#Categories
Status Control received an update:
Key: Categories1 Option: Categories Level: 1 Filter: Field: Categories
Query Generator
Request is not cached, processing
Generated Query: SELECT DISTINCT [Categories] FROM Books ORDER BY [Categories]
Number of Matching Records: 2032
Generated Query: SELECT DISTINCT SUBSTRING([Categories],1,82) FROM Books ORDER BY SUBSTRING([Categories],1,82)
Number of Matching Records: 2022
Generated Query: SELECT DISTINCT SUBSTRING([Categories],1,61) FROM Books ORDER BY SUBSTRING([Categories],1,61)
Number of Matching Records: 1995
Generated Query: SELECT DISTINCT SUBSTRING([Categories],1,45) FROM Books ORDER BY SUBSTRING([Categories],1,45)
Number of Matching Records: 1751
Generated Query: SELECT DISTINCT SUBSTRING([Categories],1,33) FROM Books ORDER BY SUBSTRING([Categories],1,33)
Number of Matching Records: 1251
Generated Query: SELECT DISTINCT SUBSTRING([Categories],1,24) FROM Books ORDER BY SUBSTRING([Categories],1,24)
Number of Matching Records: 799
Generated Query: SELECT DISTINCT SUBSTRING([Categories],1,18) FROM Books ORDER BY SUBSTRING([Categories],1,18)
Number of Matching Records: 425
Generated Query: SELECT DISTINCT SUBSTRING([Categories],1,13) FROM Books ORDER BY SUBSTRING([Categories],1,13)
Number of Matching Records: 319
Generated Query: SELECT DISTINCT SUBSTRING([Categories],1,9) FROM Books ORDER BY SUBSTRING([Categories],1,9)
Number of Matching Records: 147
Generated Query: SELECT DISTINCT SUBSTRING([Categories],1,8) FROM Books ORDER BY SUBSTRING([Categories],1,8)
Number of Matching Records: 111
Generated Query: SELECT DISTINCT SUBSTRING([Categories],1,7) FROM Books ORDER BY SUBSTRING([Categories],1,7)
Number of Matching Records: 78
Generated Query: SELECT DISTINCT SUBSTRING([Categories],1,6) FROM Books ORDER BY SUBSTRING([Categories],1,6)
Number of Matching Records: 44
Generated Query: SELECT DISTINCT SUBSTRING([Categories],1,5) FROM Books ORDER BY SUBSTRING([Categories],1,5)
Number of Matching Records: 26
Truncator finished, took 15 seconds to make 13 iterations
Caching this request . . .
Dispatcher
Message Sent: Afric~Art,
~Biogr~Busin~Compu~Cooki~Engin~Enter~Ficti~Histo~
Home~Horro~Kids!~Law:~Medic~Mind,~Nonfi~
Paren~Poetr~Refer~Relig~Scien~Small~Sport~
Trave~Write~Query Analyzer Message Received: CLKCategories In the example illustrated by FIG. 15*b* and the above-listed message strings, an initial request would have returned 2032 book titles for cook books. This number of entries may be too large. Accordingly, the truncator 152, through 13 iterations, reduces the entries in a result list to 26. The entries in the truncated result list can then be easily reviewed by the user, and further searches may be performed to identify a desired book. As can be seen in FIG. 15*b*, the user has selected "Categories" as a data field to search. As is also shown in FIG. 15b, the search engine 125 may display other information windows, such as book availability, ordering and shipping information windows. With a simple drag-and-drop cursor operation, for example, the user may then order and pay for the desired book.

Figure 16:
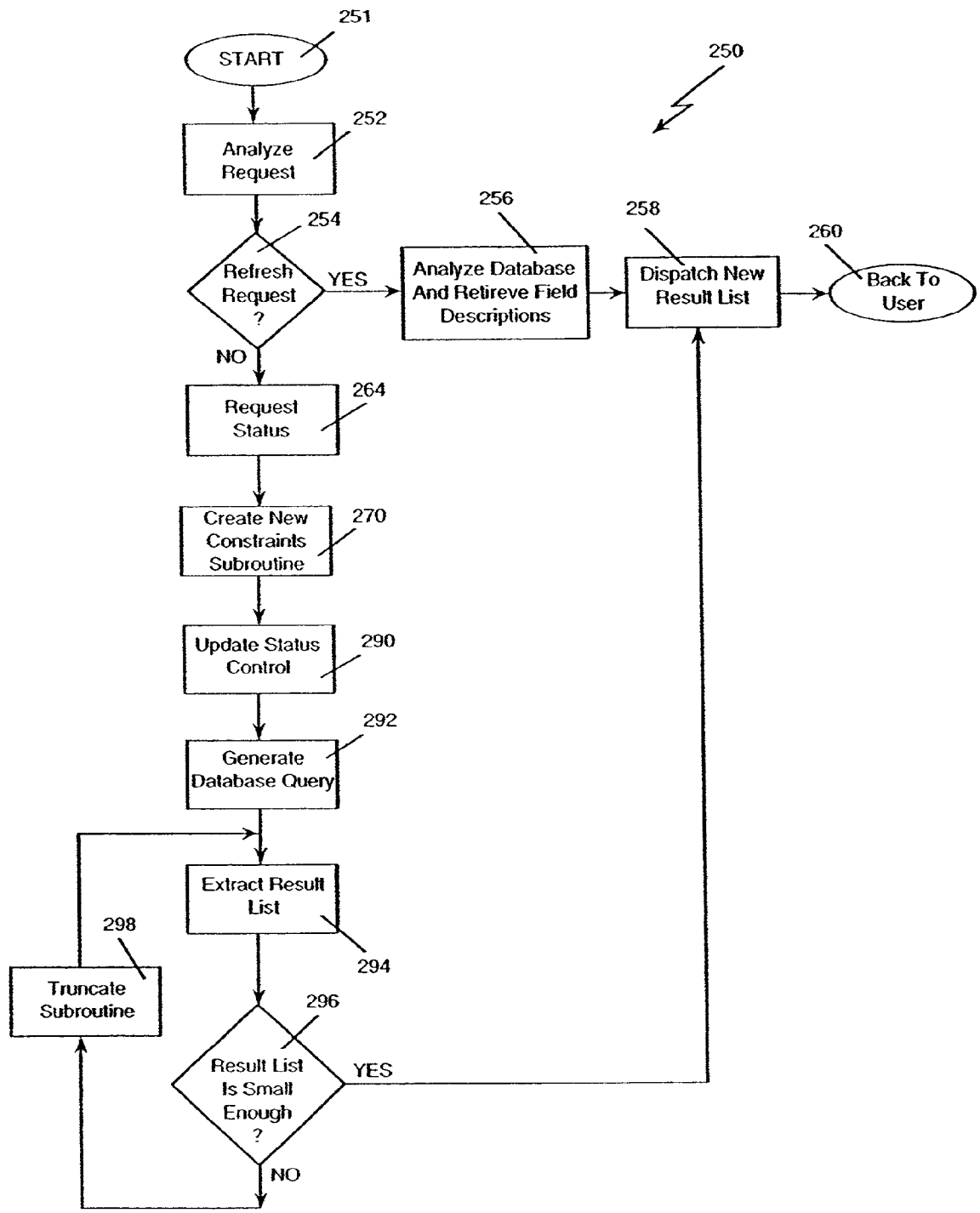
FIGS. 16 and 17 are flow charts illustrating operations of the search engine of FIG. 3.
Figure 17:
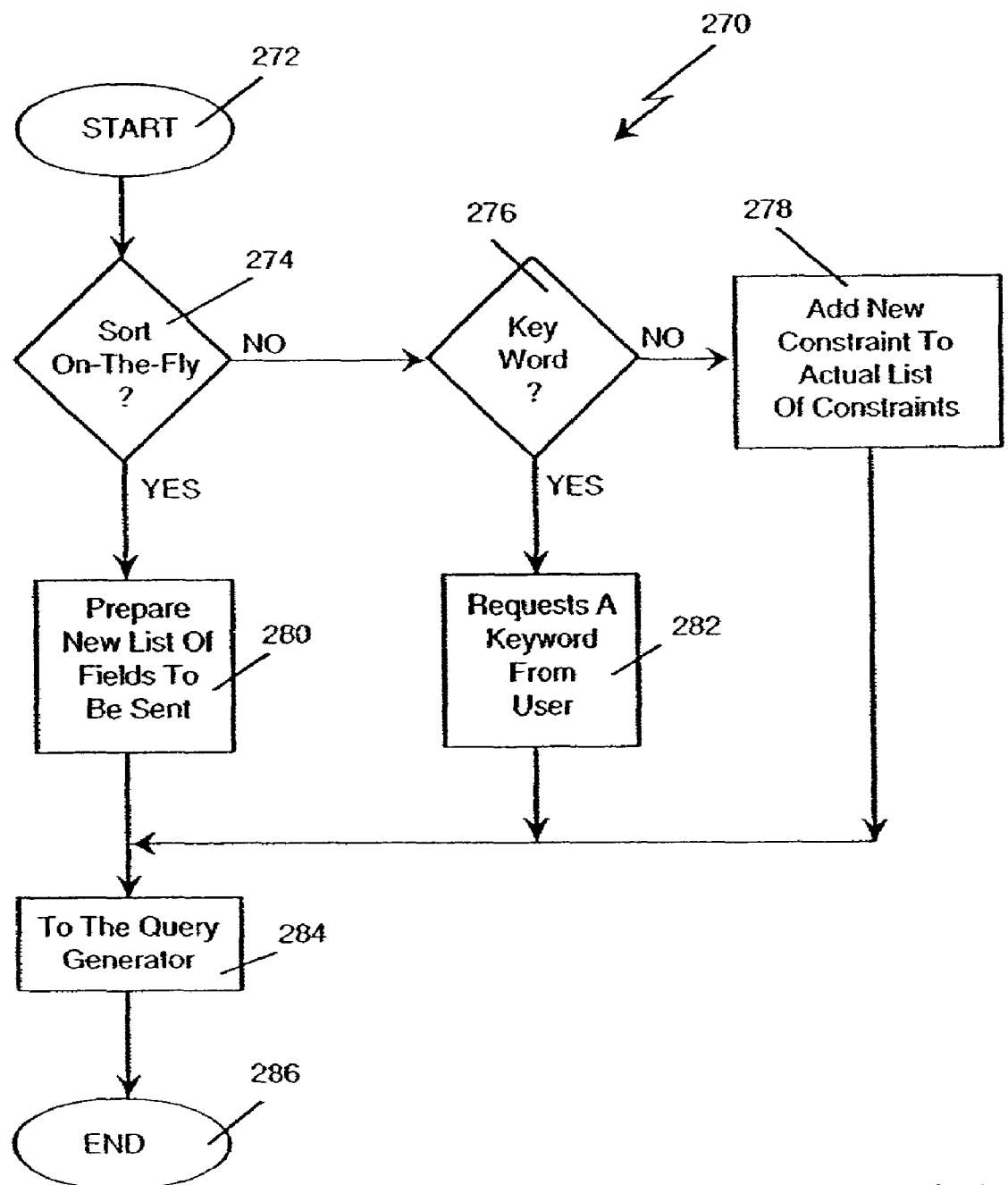

FIGS. 16–17 are flow charts illustrating operations of the search engine 125. FIG. 16 is a flowchart of an overall search routine 250. The process starts in block 251. The request analyzer 130 receives the request 114, block 252. The request 114 may be made using a hierarchical menu-based display or a graphical user interface, with one or more layers. Using either the menu or the GUI, the user may enter specific details by typing, selection of iconic symbols or pre-formatted text, and by using well-known data entry techniques, for example. The request 114 may also comprise a simple text or voice query. Use of voice recognition may be particularly useful in mobile environments, and to speed access to the database 12. Use of voice recognition may include simple commands, such as UP, DOWN, and SELECT, to select search terms from a pre-formatted list that is presented to the user at the terminal 14. More sophisticated use of voice recognition may include actually speaking letters or numbers, or full search terms, such as speaking a key word for a key word search, for example.

The protocol analyzer 133 provides an output 135 to the constraint collator 136, and the constraint collator 136 determines the nature of the request, block 254. If the request 114 is a refresh request (i.e., a command to initiate the refresh function), the constraint collator 136 sends a reset command 131 to the database qualifier 160. The updated request 115 (possibly with a new constraint) is then sent to the query analyzer 150 for further processing, including analyzing the database 12, retrieving field descriptors, and formatting, block 256. The result of the data field descriptor retrieval and formatting are shown as an available data fields result list, block 258, and is returned to the terminal 14, block 260.

In block 254, if the request 114 is not a refresh request, the constraint collator 136 provides the updated request 115 (which may be an initial request, or a subsequent request) to the query generator 150, block 264. The constraint collator 136 compares the request 114 against information stored in the status control 140. In particular, the constraint collator 136 sends the request status control signal 118 to the status control 140 and receives the request status response 119. The constraint collator 136 then compares the request status response 119 to constraint information provided with the request 114 to determine if the constraint status should be updated (e.g., because the request 114 includes a new constraint). If the constraint status should be updated, the constraint collator 136 calls create new constraint subroutine 270, and creates new constraints.

The create new constraints subroutine 270 is shown as a flowchart in FIG. 17. The subroutine starts at 272. In block 274, the constraint collator 136 determines if the request is for a sort-on-the-fly operation. If sort-on-the-fly has been selected, field assessor 162 prepares a new set of data fields, block 280. The new set of data fields are then sent to the query generator 150, block 284, and the subroutine 270 ends, block 286.

In block 274, if sort-on-the-fly was not selected, the request analyzer 130 may receive a key word constraint, block 276. The query generator 150 will then generate an input window in which the user may enter a desired key word, block 282. Alternatively, the query generator 150 may prompt the user to enter a key word using voice recognition techniques, or any other way of entering data. The process then moves to block 284. In block 276, if a key word search option was not selected, the constraint collator 136 enters the new constraint to the existing list of constraints, block 278. The process then moves to block 284.

Returning to FIG. 16, the constraint collator 136 next updates the status control 140, block 290. In block 292, using the updated constraints, the query generator 150 generates a next query of the database 12, block 292. The database driver 170 then extracts the result list from the database 12, according to the latest query, block 294. In block 296, the truncator 152 determines if the result list may be displayed at the terminal 14. If the result list cannot be displayed, the process moves to block 298, and a truncation routine is executed. The process then returns to block 294. If the result list in block 296 is small enough, the result list is provided by the dispatcher 154 to the terminal 14, block 258.

As noted above, the request analyzer 130 determines the nature of the request, including any special commands. A special command may include a command to conduct a search-on-the-fly. Alternatively, the search engine 125 may adopt a search-on-the-fly mechanism as a default value. The search engine 125 also may incorporate other special search commands, such as a Boolean search, for example.

Figure 18:
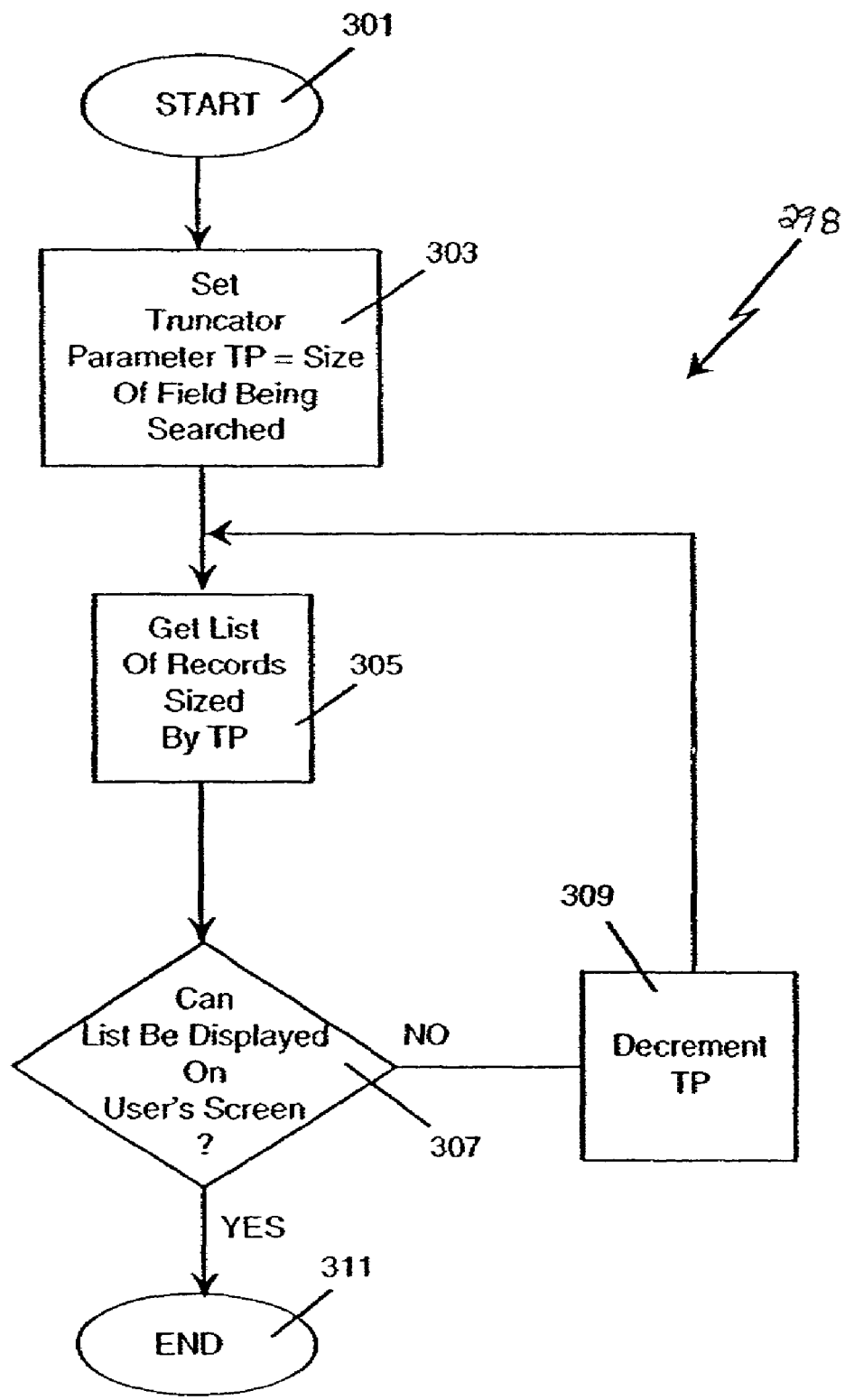
FIG. 18–22 are flow charts illustrating truncation operations of the search engine of FIG. 3.

FIGS. 18–22 are flowcharts illustrating alternate truncation subroutines. In FIG. 18, a truncation subroutine 298 adjusts a size of a data field by decrementing a parameter TP related to entries in a selected data field. For example, if the data field comprises a list of U.S. cities by name, the parameter TP may be the number of alphabetical characters in a name. The results of such a truncation is shown in the example of FIG. 4. The subroutine 298 starts at block 301. In block 303, the parameter TP is set to equal a size of the data field being searched. The truncator 152 then determines the list of records sized by the parameter TP, block 305. In block 307, the truncator 152 determines if the result list can be displayed at the terminal 14. If the result list cannot be displayed at the terminal 14, the truncator 152 decrements the parameter TP, block 309. Processing then returns to block 305, and the truncator 152 gets a reduced result list using the truncated parameter TP. If the result list can be displayed at the terminal 14, the process moves to block 311 and the subroutine 298 ends.

Figure 19:
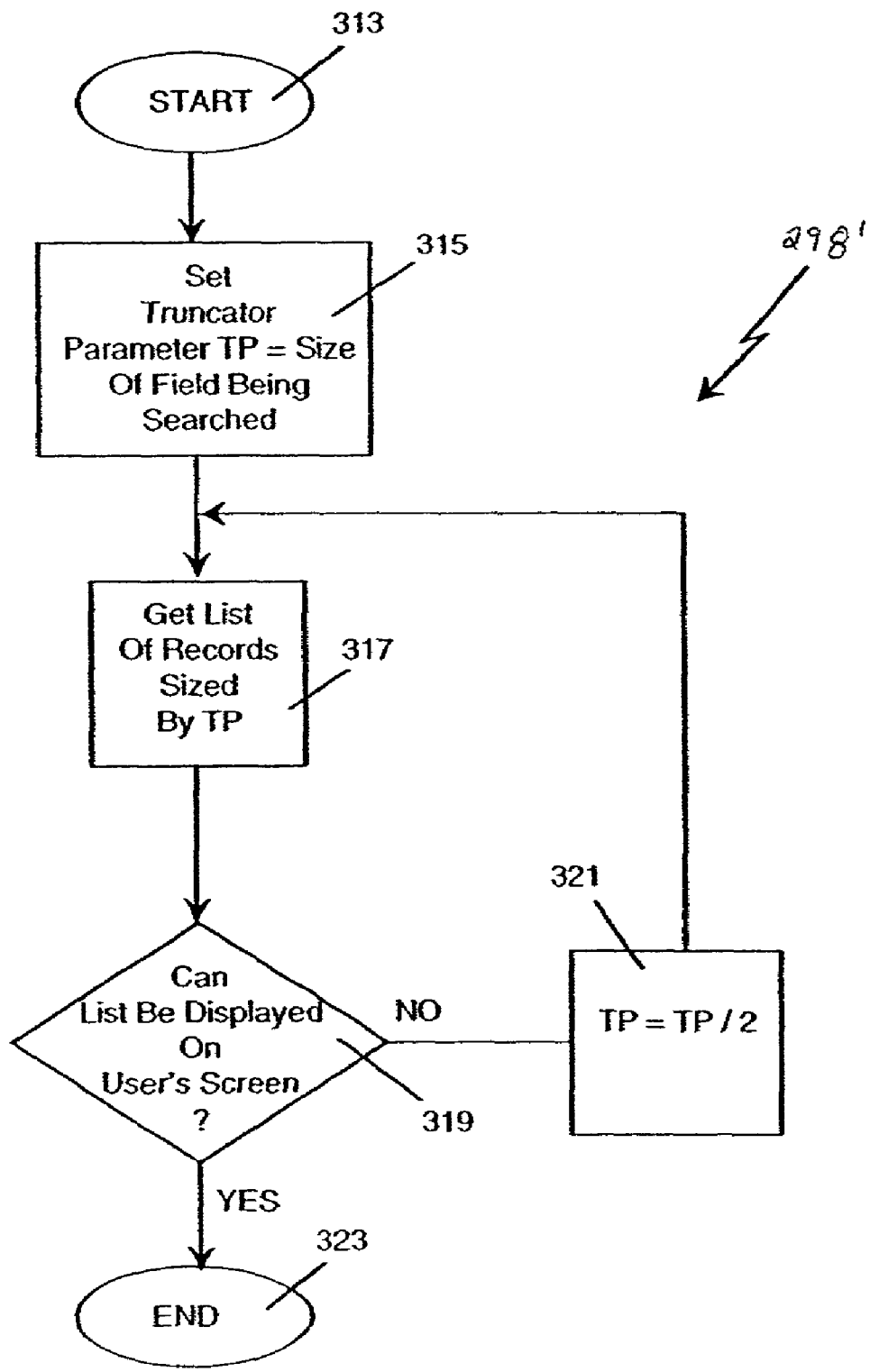

FIG. 19 is a flowchart illustrating an alternate truncation routine 298'. The process starts in block 313. In block 315, the truncator 152 sets the parameter TP to a size of the data field being searched. In block 317, the truncator 152 determines the list of records sized by the parameter TP. In block 319, the truncator 152 determines if the result list can be displayed at the terminal 14. If the result list cannot be displayed, the truncator 152 adjusts the size of the data field by dividing the parameter TP by a set amount, for example, by dividing the parameter TP by two, block 321. Processing then returns to block 317, and repeats. If the result list can be displayed at the terminal 14, the process moves to block 323 and the subroutine 298' ends.

Figure 20:
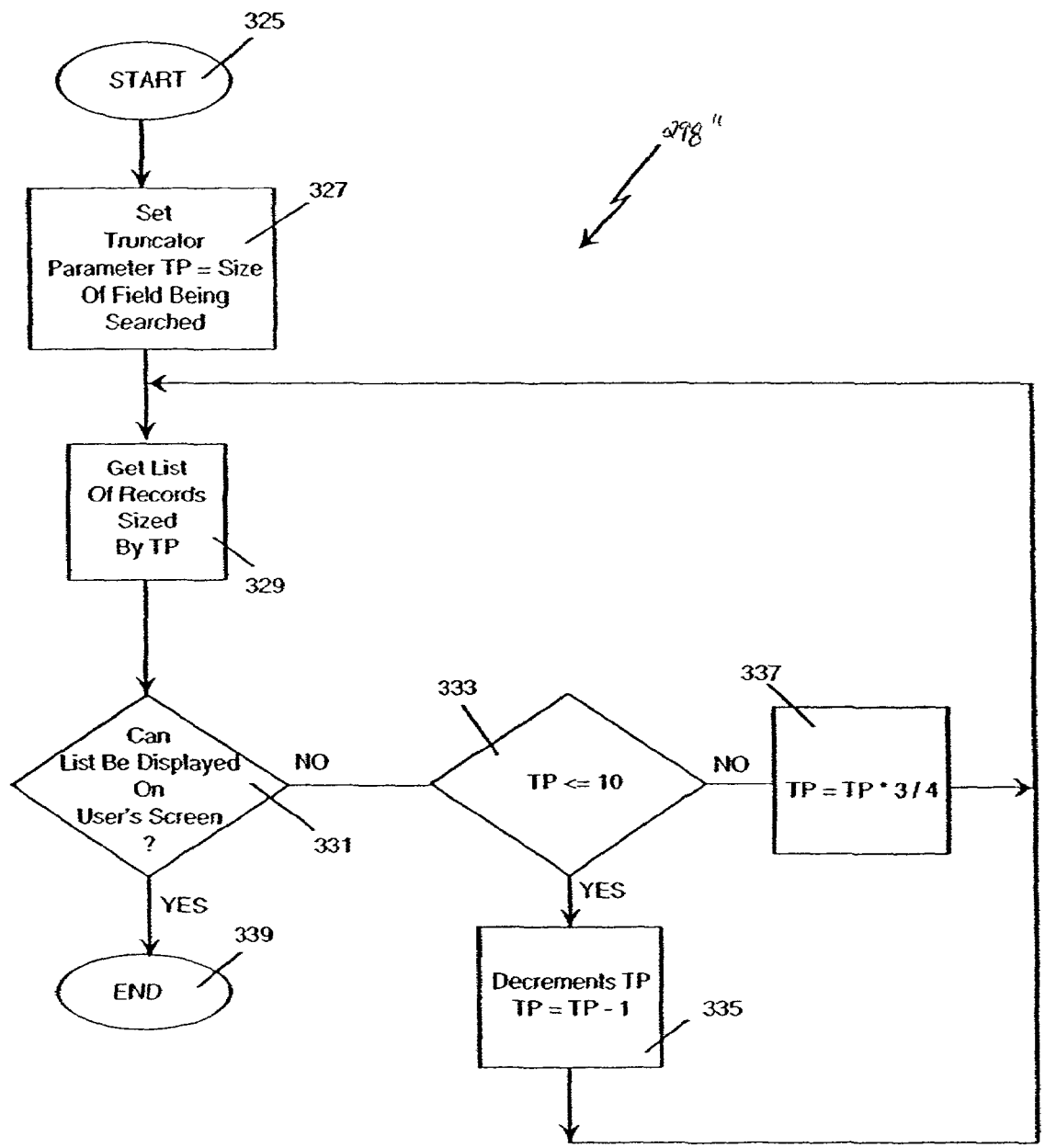

FIG. 20 shows another alternative truncation subroutine 298". The process starts in block 325. In block 327, the truncator 152 sets the parameter TP to equal the size of the data field being searched. In block 329, the truncator 152 determines the list of records sized by the parameter TP. The truncator 152 then determines if the result list can be displayed at the terminal 14, block 331. If the result list cannot be displayed at the terminal 14, the truncator 152 determines if the parameter TP is less then ten, block 333. If the parameter TP is not less than ten, the truncator 152 adjusts the parameter TP by multiplying the parameter TP by a number less than one, block 337. In an embodiment, the number may be ¾. The process then returns to block 329 and repeats. In block 333, if the value of the parameter TP is less than ten, the truncator 152 decrements the parameter TP by one, block 335. Processing then returns to block 329 and repeats. In block 331, if the list can be displayed at the terminal 14, the process moves to block 339 and the subroutine 298" ends.

Figure 21:
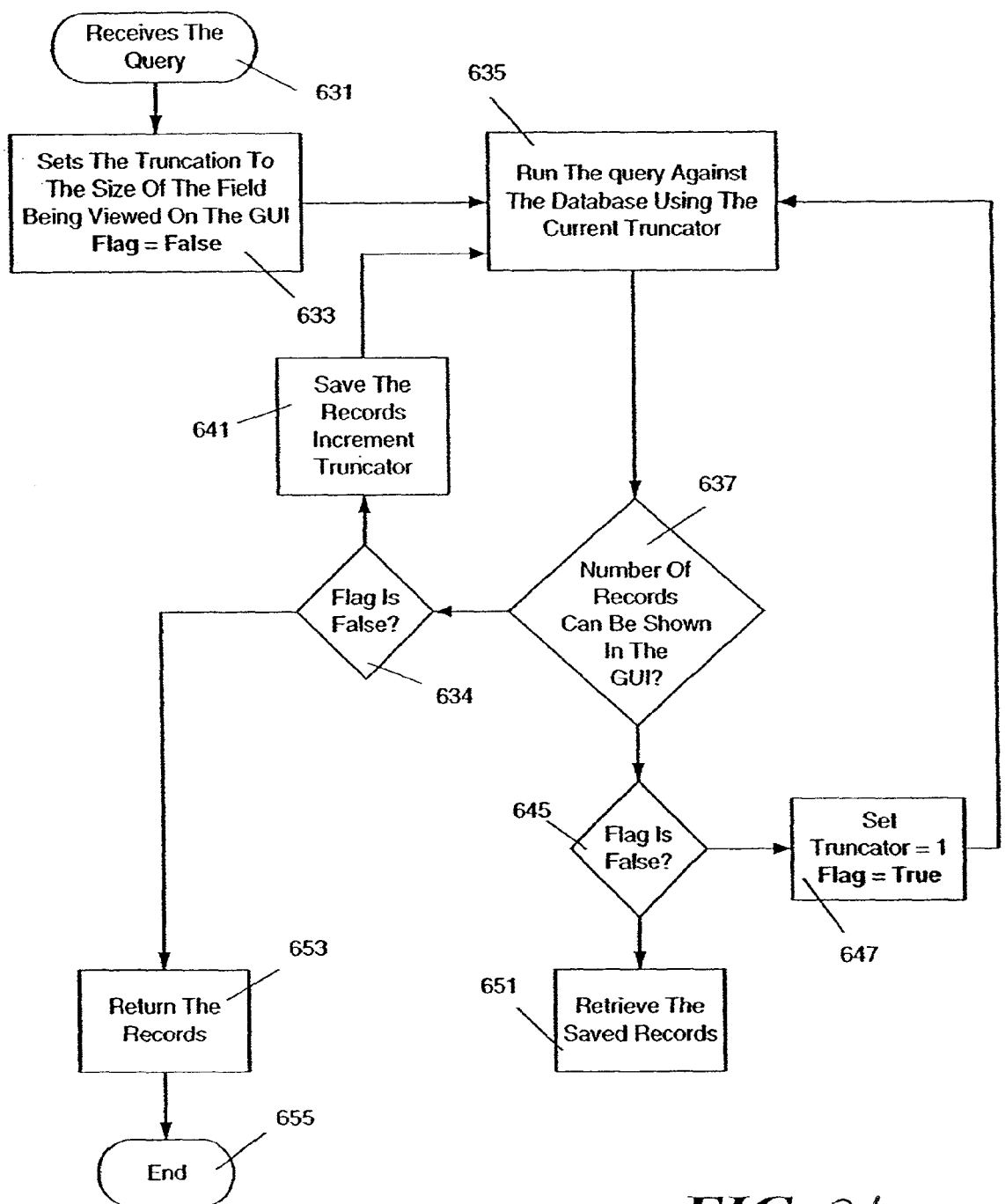

FIG. 21 illustrates yet another alternate truncation routine 630. The routine 630 begins in block 631 with the truncator 152 receiving the request 115. In block 633, the truncation is set to the size of the field being viewed on the GUI, and sets the False Flag. The query is then run against the database using the selected truncator, block 635. In block 635, the truncator 152 determines if the number of records that would be retrieved from the database can be displayed on the existing GUI. If the records can be displayed, the process moves to block 639, and the truncator 152 determines if the Flag is set False. If the Flag is set False, the process moves to block 653 and the records are returned (displayed on the GUI). The process then ends, block 655. In block 637, if the number of records exceeds the display size of the GUI, the status of the Flag is checked as False. If False, the truncator is set to 1, and the Flag is set to True, block 647, and the process returns to block 635. If in block 637. If the Flag is not set False, the process moves to block 651, and saved records are retrieved. The retrieved records are then displayed, block 653.

In block 639, if the Flag is not set to False, the retrieved records are saved, and the truncator 152 is incremented. The process then returns to block 635.

Figure 22:
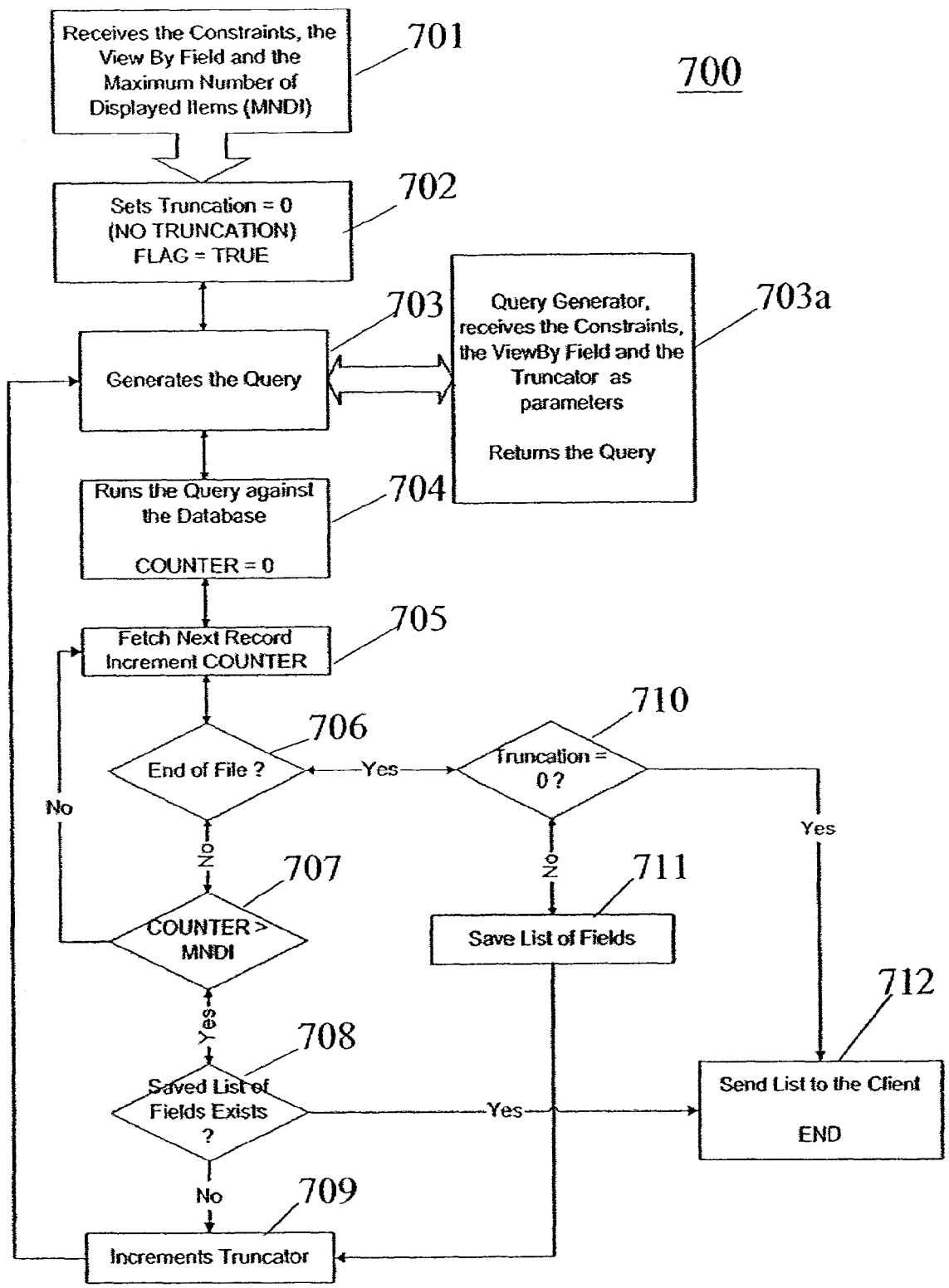

FIG. 22 illustrates still another alternative truncation routine 700. In block 701, the truncator 152 receives the constraints, the view by field and the maximum of number of display items (MNDI). In block 702, the truncation is set to zero (no truncation), and the Flag is set to True. Next, the query is generated in block 702. In block 703a, query generator receives the constraints, the view by field, and the truncator as parameters, and the query generator returns the query. The query is then run against the database, and the counter is set to zero, block 704. In block 705, the truncator 152 fetches the next record and increments the counter. If the end of file is reached, block 706, and the truncation equals zero, block 710, the truncator 152 sends the list of fields to the client, block 712. However, if the truncation is not zero, block 710, the truncator 152 is incremented, block 709, and the process returns to block 703. On the other hand, if the end of file is not reached, block 706, and the counter is smaller than MNDI, block 707, the process goes back to block 705, in which the truncator 152 fetches the next record and increments the counter. However, if the counter is larger than MNDI, block 707, and the saved list of fields exist, block 708, the truncator sends the list to the client, block 712. Conversely, if the saved list of fields do not exist, block 708, the truncator 152 is incremented, block 709, and the process goes back to block 703 again.

Table 1 illustrates an example of the alternate truncation routine 700. This routine 700 begins by attempting not to truncate the records.

TABLE 1

| Records | | 1st Round | | 2nd Round | | 3rd Round | |
|---|---|---|---|---|---|---|---|
| 1 | Armandia | 1 | Armandia | 1 | A | 1 | AR |
| 2 | Armonk | 2 | Armonk | 2 | N | 2 | NE |
| 3 | Armonk | 3 | New Orleans | 3 | R | 3 | RI |

TABLE 1-continued

| Records | | 1st Round | | 2nd Round | | 3rd Round | |
|---|---|---|---|---|---|---|---|
| 4 | New Orleans | 4 | New York | | | 4 | RO |
| 5 | New Orleans | | | | | | |
| 6 | New York | | | | | | |
| 7 | New York | | | | | | |
| 8 | New York | | | | | | |
| 9 | Riverdale | | | | | | |
| 10 | Riverdale | | | | | | |
| 11 | Riverdale | | | | | | |
| 12 | Rockfort | | | | | | |

In this example, the maximum number (n) of displayable results is three, and the database contains twelve instances of six different cities. First, the database is queried for the full city field with no truncation, and records are fetched. Records are fetched until four (n+1) records are fetched from the database. Since the number of different cities (4) is greater than n, fetching is halted and the process moves to truncation. Then the database is queried for only the first letter of the cities (truncation is incremented so that it equals one). For this query the database manager may simply review its index. The compiled list from the query is saved as "A", "N", and "R". Next, the database is queried for the first two letters of the city field (truncation is incremented so that it equals two). Again, the database manager may simply review its index to locate this information about the data field. This query for two letters or characters is continued until the number of two letter combinations exceeds n. When the number of different combinations (4) is again greater than n, the routine halts and nothing is saved. The system now returns to the previous saved list. Therefore, the saved list ("A", "N", and "R") is returned to the client for display or process.

The examples illustrated in FIGS. 18–22 are but a few examples of the truncations subroutine. One of ordinary skill in the art could conceive of other methods to adjust the field size. In addition to using a truncation subroutine, the user may specify a limit for the field size.

Figure 23:
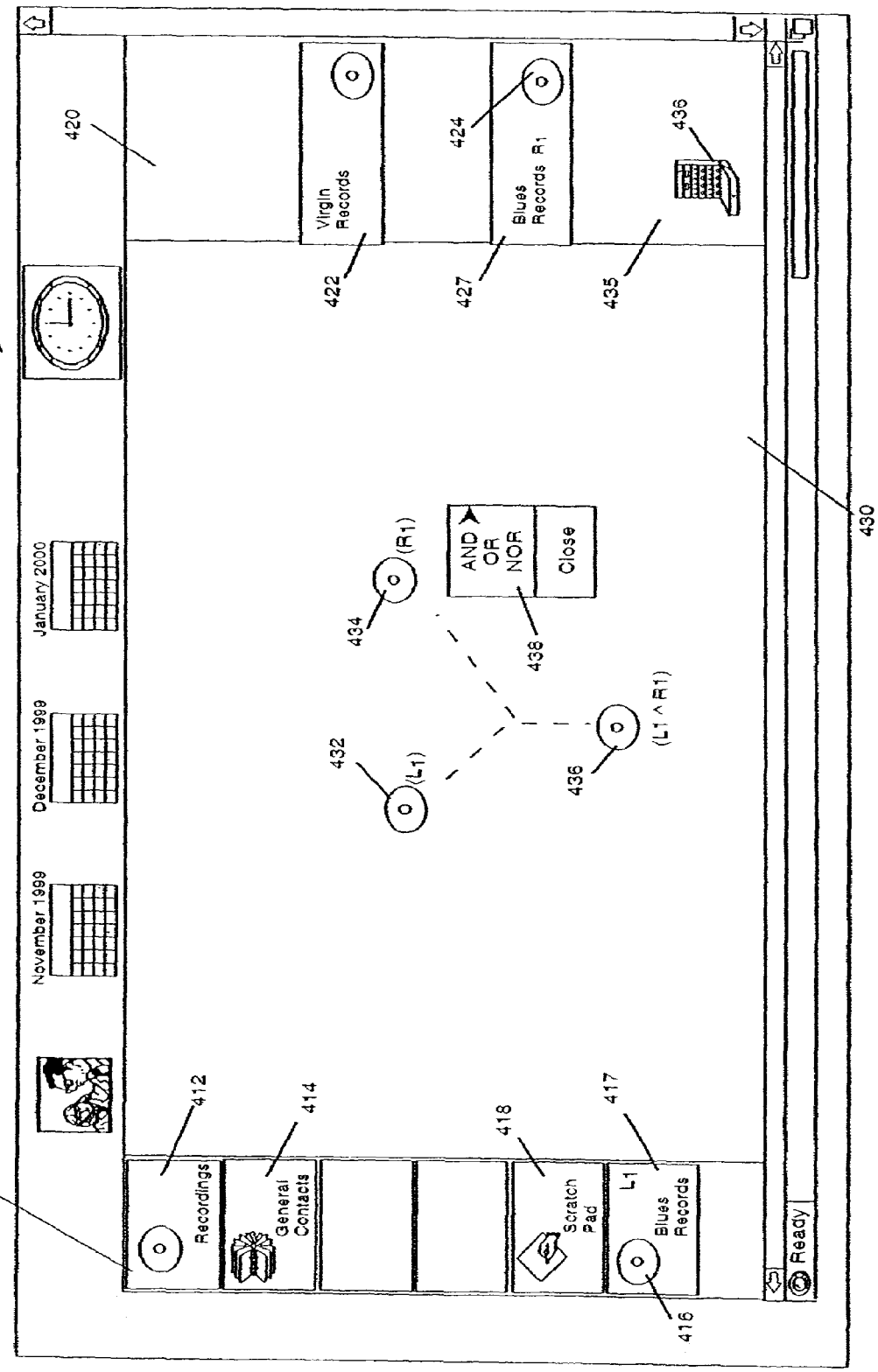
FIG. 23 illustrates a further function of the search engine of FIG. 3 in which results of more than one search are combined.

As noted above, the search engine 125 may be used for multiple searches and may be used to search multiple databases, including databases with different schemas. The results of individual searches, including the control data provided in the status control 140, are saved. The search engine 125 may then be used to further sort (search), or otherwise operate on, the results of these multiple searches. In an embodiment, the search engine 125 may perform a Boolean AND operation on two search results. The result of the Boolean AND operation would be a list of records, or entries, that are common to the two search results. FIG. 23 illustrates such a Boolean AND operation.

In FIG. 23, a GUI 400 displays local database selections 410, including a database of recordings (compact discs—CDs) 412 and a database of contacts 414. The databases 412 and 414 may be shown by text descriptions and an appropriate icon, for example. The database selections in this example are resident on a user's terminal, such as the terminal 14 shown in FIG. 1. Also displayed on the GUI 400 is a remote database selection 420 that represents databases, such as the databases 13 and 15 shown in FIG. 1, that are located remotely from the terminal 14. In the example shown in FIG. 21, the remote database selection 420 includes a database 422 for online record sales, which is represented by an icon (a CD) and a text title of the online retailer. The remote databases shown in the remote database selection 420 may include those databases for which the user has already established a link. In the example shown, the user may already have entered an Internet address for the online retailer. In addition to any returned web pages from the online retailer, the terminal 14 may then display a representation of the database 422.

Continuing with the example, the user may use the search engine 125 to conduct a search-on-the-fly of the recordings database 412 and the Virgin Record™ database 422. The user may search both databases 412 and 422 for titles of recordings that are classified as "blues." The search engine 125 may return search results 416 and 424 for searches of both databases 412 and 422, respectively. The search results 416 and 424 may be displayed in a window section 430 of the GUI 400. The results 416 and 424 may also be represented by CD icons, such as the icons 432 and 434. The search results 416 and 424 may be stored as lists in one or more temporary databases, as represented by the windows 417 and 427. The search results 416 and 424 may also be stored in a scratch pad database 418. At this point, the user may wish to determine which recordings from the list 424 are contained in the list 416. The search engine 125 may support this function by performing a Boolean AND operation of the lists 416 and 424. The results of the Boolean AND operation are represented by the icon 436 displayed in the window 430. To execute the Boolean AND operation, the user may simply drag the icon 432 over the icon 434, and then select AND from a pop-up menu 438 that appears when the icons 432 and 434 intersect. Other techniques to execute the Boolean AND (or another Boolean function) may include typing in a command in a window, using voice recognition techniques, and other methods. In addition, other Boolean functions may be used.

The result represented by the icon 436 of the Boolean AND operation may then be stored in a database at the terminal 14, such as in the scratch pad database 418 or may be stored at another location. The result may then be subjected to further search-on-the-fly operations.

Also shown in FIG. 23 is an online-purchase module 435 that may be used to consummate purchase of a product referenced in an online database such as the database 422. To initiate such a purchase, the user may drag an iconic or text representation of a desired product listed in the search result 424 over an icon 436 in the online-purchase module 435. This drag-and-drop overlaying these icon may initiate and complete the online purchase for the desired product.

The search engine 125 may accommodate merging of one or more sets of search results. The multiple search results may be derived from a common database, or from more than one database. A search using the search engine 125 may be controlled through a user interface by one or more icons that can represent (1) filters or (2) the images of filters. Thus, the icon may represent spatial or temporal attributes, or sets of objects or procedures. Merging the icons thus has two interpretations corresponding to (1) and (2): either filters are added ("apply every filter in every icon to every image to which it can be applied"), or image sets are added. In an alternative embodiment, the addition (union or join) operator may be any other relational operator, e.g. divide, difference.

Figure 24:
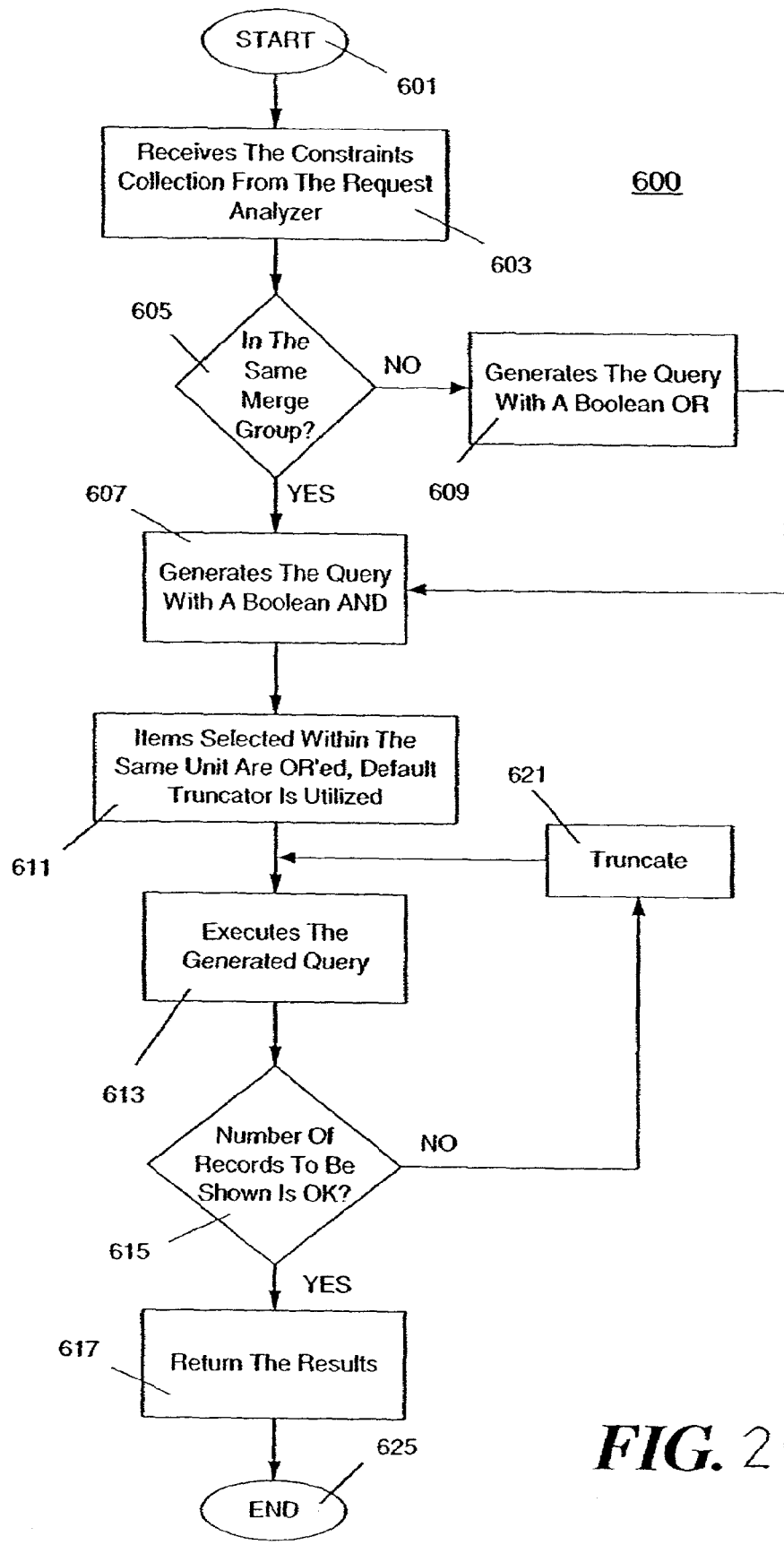
FIG. 24 is a flowchart illustrating an alternate operation of a query generator used with the search engine of FIG. 3.

FIG. 24 is a flow chart illustrating an alternative operation 600 of the query generator 150 of FIG. 6. In the illustrated operation, the query generator 150 is adapted to receive multiple selections of items within a same menu function and within a same merge function. To provide this functionality of the query generatory 150, the request analyzer 130 (see FIG. 5) may be adapted to receive a collection of user choices.

The operation 600 begins in block 601. In block 603, the request analyzer 130 receives constraints collected from the constraint collator 136, and the updated request 115, which may be an initial request or a subsequent request, is provided to the query generator 150. In block 605, the query generator 150 determines if the constraints (the request 115) are in the same merge group. If the query generator 150 determines that the request 115 is in the same merge group, the process moves to block 607 and the query generator 150 generates the query with a Boolean AND. If the request is not in the same merge group, the query generator 150 generates the query with a Boolean OR, block 609.

In block 611, the items selected within the same unit are OR'ed and the default truncator may be used depending on the size of the returned items. In block 613, the generated query is executed. In block 615, the number of records to be displayed is checked. If the number is within a specified limit, the process moves to block 617 and the search results are returned for display. The operation 600 then ends, block 625. In block 625, if the number of records to be displayed is too large, the process moves to block 621, and a truncation routine is executed.

Figure 25:
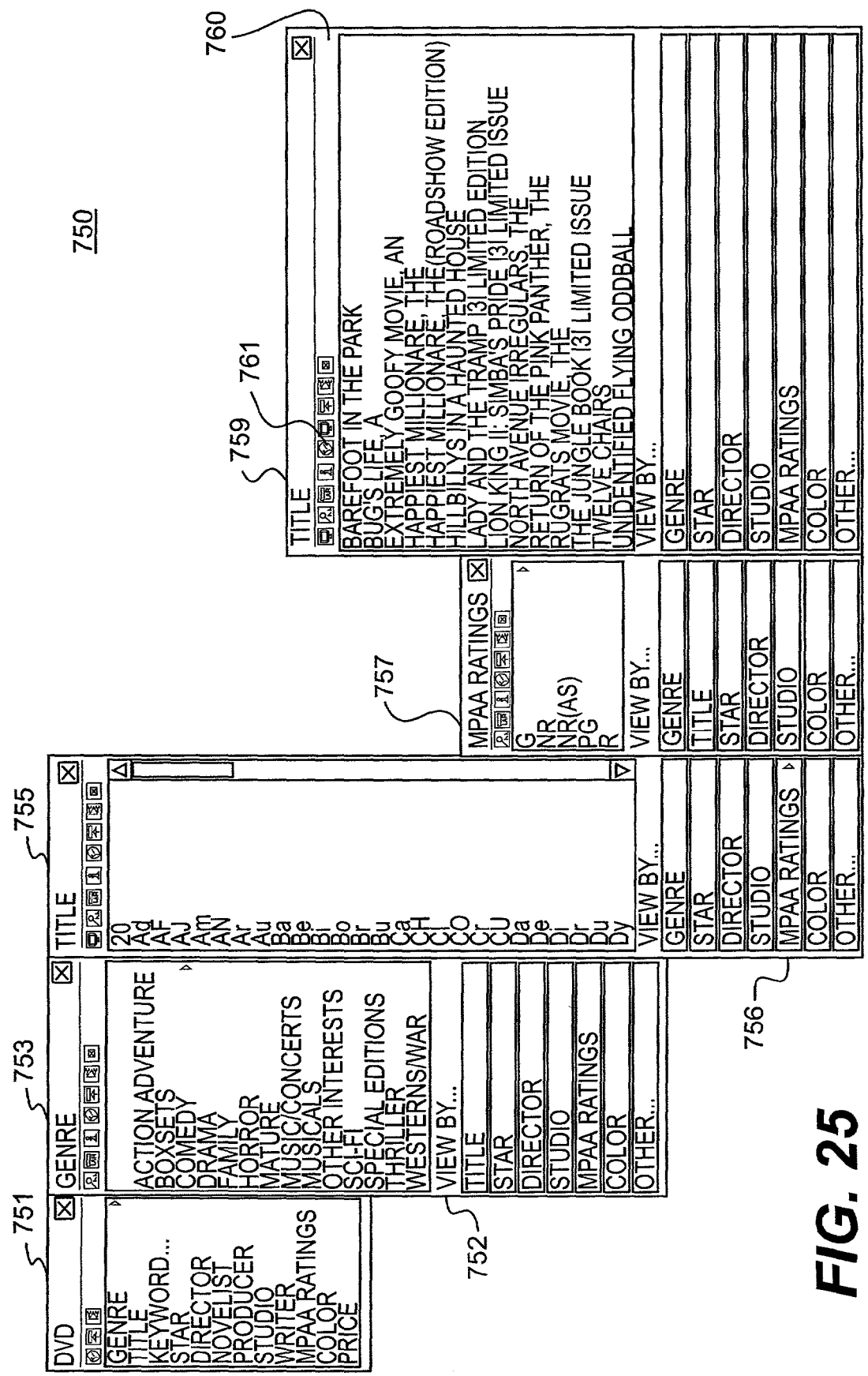
FIG. 25 is a user interface showing search results for a search-on-the-fly search of a DVD database.

FIG. 25 illustrates a graphical user interface display 750 showing the results of a search-on-the-fly search for DVDs in a DVD database. Menu screen 751 shows the various search/sort features available to access the DVD database. In menu screen 753, the selection of genre produces a further selection menu showing all available genres for searching the DVD database. The menu screen 753 also shows a View By section 752. The View By section 752 allows the user to perform a further sort on the DVD database by selection one of the listed database categories shown. In the illustrated example, the Title category is selected, and the results of this merged search-on-the-fly search are shown in menu screen 755. Because of the large number of database entries returned, a truncator function has reduced the DVD titles to a two-letter (or number) result. A further selection from the View By section 752 (in this case, MPAA Ratings 756) produces menu screen 757, which lists available MPAA ratings. The user selects MPAA rating G, resulting in search results list 759 showing available DVD titles, the View By section 752, and an icon bar 760.

The icon bar 760 provides one means for initiating generation of a report related to a search, such as the search shown in FIG. 25. In an embodiment, the report generation initiation means comprises an icon 761 that the user can select using a mouse or other pointing device, for example. The report may be generated by entering a report generation text command in a dialog box, for example. The report generation may also be made automatic or semi-automatic. For example, the report may be generated periodically, or upon occurrence of specified events, for example.

Figure 26:
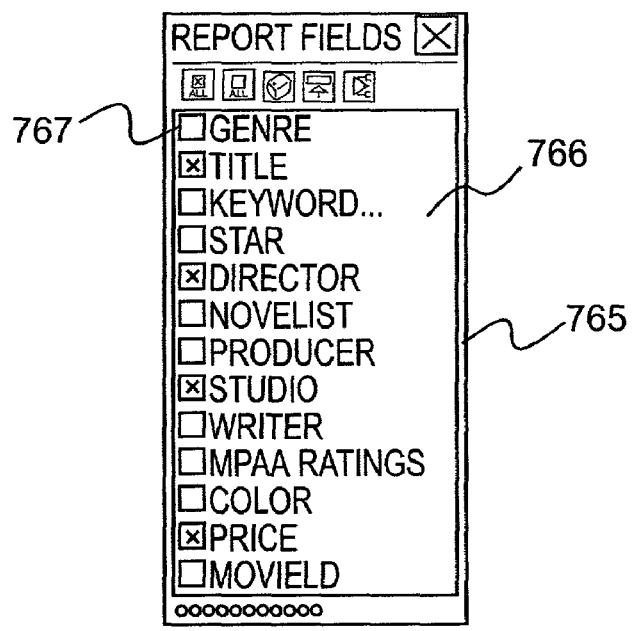
FIG. 26 illustrates a report configuration menu.
Figure 27:
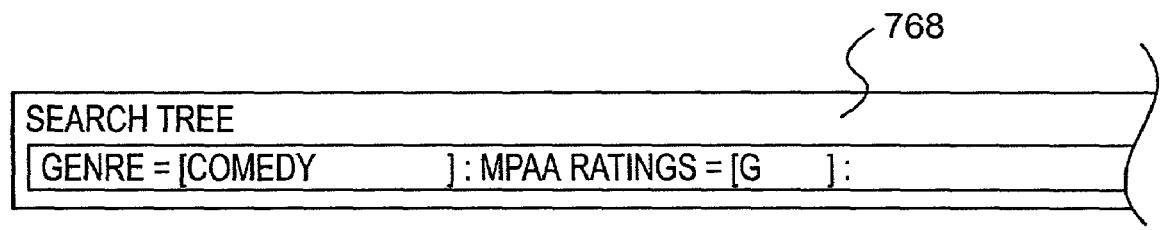
FIG. 27 illustrates a search tree associated with the search of FIG. 25.

Operation of the icon 761 returns configuration means for selection of report fields or context. FIG. 26 illustrates an embodiment of the means for configuring the report. In FIG. 26, a report fields menu 765 includes a data fields list 766 having a number of data fields. The displayed data fields conform to data fields from the data set created by the search-on-the-fly search. In the illustrated example, the created data set conforms to the search conditions shown in search tree 768, shown in FIG. 27. Specifically, in the illustrated example, the search tree 768 shows search by genre=comedy and MPAA ratings=G. Returning to FIG. 26, a check block section 767 allows the user to select one or more data fields by marking desired fields with an "X." In an aspect of this embodiment, the report fields menu 765 may include default fields to be displayed when generating the report.

Using the report fields menu 765, the user selects desired data fields of Title, Director, Studio, and Price. The search-on-the-fly search has returned search results for DVDs shown in the search results list 759 (see FIG. 25). The user can then receive a search report that provides the Title, Director, Studio, and Price information from the DVD databases for the DVDs shown in the search results list 759.

FIG. 28 illustrates a search report 770$_i$ corresponding to the search-on-the-fly search of FIG. 25, with the data fields of Title, Director, Studio and Price listed. The search report 770$_i$; may be displayed graphically, and may be printed, saved as a file, or sent to another user, for example.

The search report 770$_i$ presents a "snapshot," or dynamic view of data in the DVD database. However, the user may desire to replicate the search report representing the search shown in FIG. 25 at some later time. Such a subsequent search report would return results based on the DVD database contents as the contents exist at the time of the generating the subsequent search report. Thus, the results from the subsequent search report may differ from the results of the prior search report, and the subsequent search report may show results that differ from those shown in the search report 770$_i$; of FIG. 28. To provide means to generate dynamic search report results of the DVD database (or other databases), the data related to the search shown in FIG. 25 may be saved as a template in a reports database. Such a template may include links or clauses that provide a path to data subsets, tables, fields, or elements within the DVD database (or other databases).

Figure 29A:
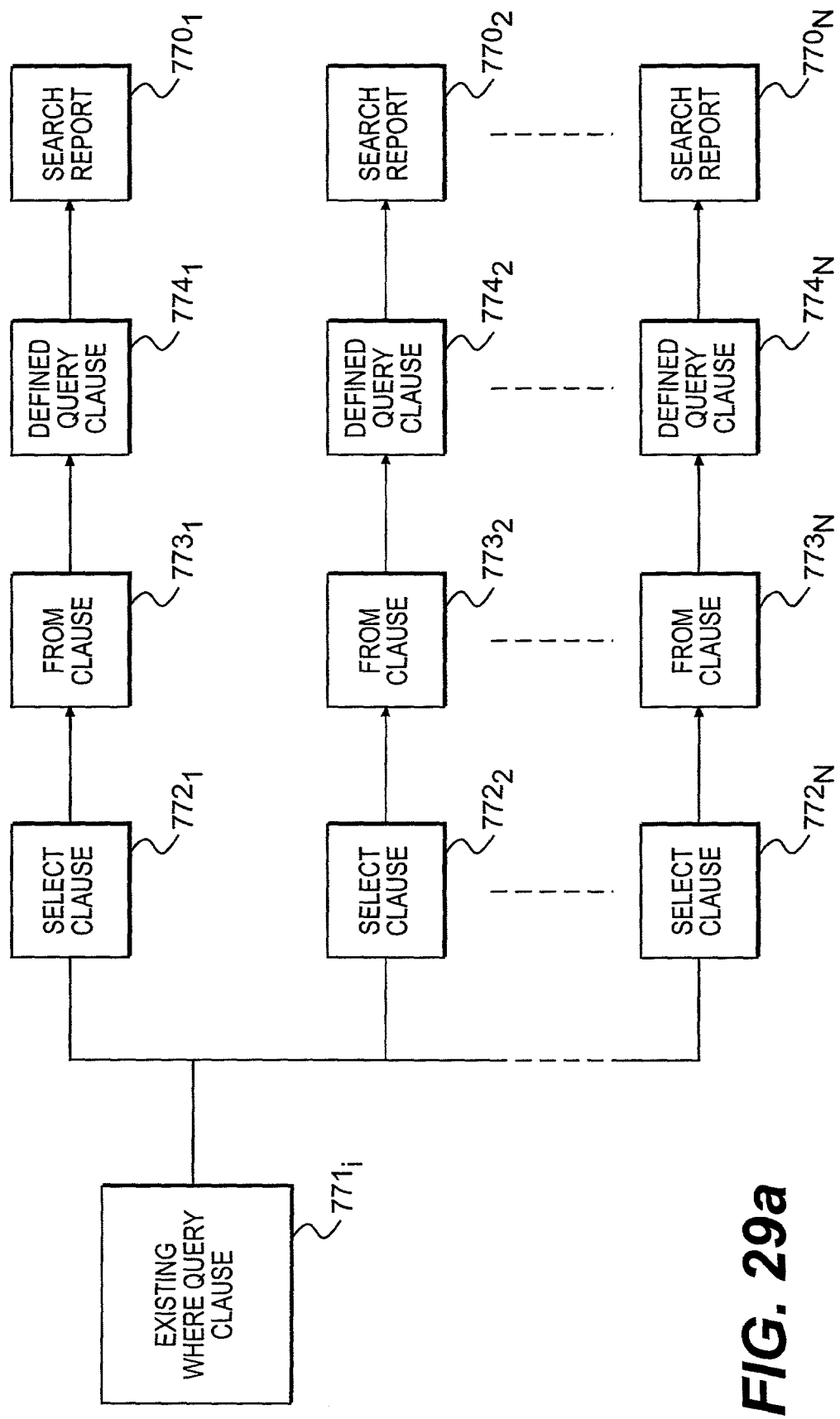
FIG. 29*a* illustrates software modules used to generate the dynamic search report.

When requesting generation of a search report, the user may elect to use the same report format as for a prior search report, or may select other data subsets, tables, fields or elements to be displayed in the search report. FIG. 29a illustrates the concept of generating a search report based on a prior search. A search-on-the-fly search, such as the search shown in FIG. 25 may be executed using one or more WHERE query clauses 771$_i$. Immediately afterward, or a some subsequent time, a user elects to generate a search report, such as the search report 770$_i$. The user may define one or more SELECT clauses, such as the clauses 772$_i$, that define data elements (i.e., requested data elements) to be included with the search report 770$_i$. For example, immediately following the search, the user may define SELECT clause 772$_1$. At a later time, such as one week later, the user may define SELECT clause 772$_2$. Still later, the user may define SELECT clause 772$_n$. The search engine 125, or a component thereof, may define a FROM clause 773$_i$ that establishes a path from the requested data element to its location in the database. That is, the FROM clause 773establishes a database address for requested data elements. The SELECT clauses 772$_i$ and the FROM clauses 773$_i$ are then combined with the WHERE query clause 771$_i$ to produce a defined query 774$_i$. Using the defined query 774$_i$, a report generator may generate search-on-the-fly search reports 770$_i$.

As noted above, the search reports 770$_i$ may be generated into a specific request from a user. In another embodiment, generation of the search reports may be automated, with search reports generated periodically on regular or irregular basis, or in response to discrete, defined events.

As noted above, means for generating the report 770$_i$ may be based on a "WHERE" query clause 771$_i$, which corresponds to the definition of a subset of data being searched. In the preceding example, the "WHERE" query clause 771$_i$ is:

WHERE (SUBSTRING([DVDs].[Genre], 1, 35)='Comedy') AND (SUBSTRING([DVDs].[MPAA Ratings], 1, 10)='G')

Using the report fields menu 765, the user can select which data fields are to be displayed on the report 770$_i$, creating another part of the defined query 774$_i$: the "SELECT" clause 772$_i$:

SELECT [DVDs].[Title] as [Title], [Directors].[Name] as [Director], [Studios].[Name] as [Studio], [DVDs].[Price] as [Price]

The SELECT clause 772$_i$ may be generated by the search engine 125 (see FIG. 3), using the information created by an administrator, or by querying database metadata, to find out which data tables and data fields host data for "DVDs", "DIRECTORS", and "STUDIOS". Using this same information, the search engine 125 creates the "FROM" clause 773$_i$, which specifies how to connect the tables to produce the desirable results: FROM [DVDs] JOIN [Directors] ON ([Directors].[DirectorId] =[DVDs].[DirectorId]) JOIN [Studios] ON ([Studios].[StudioId] =[DVDs].[StudioId])

The result is the following defined query 774$_i$, which can be used at anytime to reproduce and display the DVD Movies with Genre are "COMEDY" and MPAA Ratings are "G":

SELECT [DVDs].[Title] as [Title], [Directors].[Name] as [Director], [Studios].[Name] as [Studio], [DVDs].[Price] as [Price] FROM [DVDs] JOIN [Directors] ON ([Directors].[DirectorId]=[DVDs].[DirectorId]) JOIN [Studios] ON ([Studios].[StudioId]=[DVDs].[StudioId]) WHERE (SUBSTRING([DVDs].[Genre], 1, 35)='Comedy') AND ( SUBSTRING([DVDs].[MPAA Ratings], 1, 10)='G').

In an embodiment, as noted above, when a report 770$_i$ is generated, because "Database Data" may not be saved, the report 770$_i$ may show a "Real-Time Snaphot," or dynamic status, of the data using the defined query 774$_i$. However, because of the ad-hoc nature of the reports 770$_i$, the user can choose to "Save" the report 770$_i$ for future use, and to use on-the-fly technology to search through those saved reports 770$_i$ at a later time.

Figure 29B:
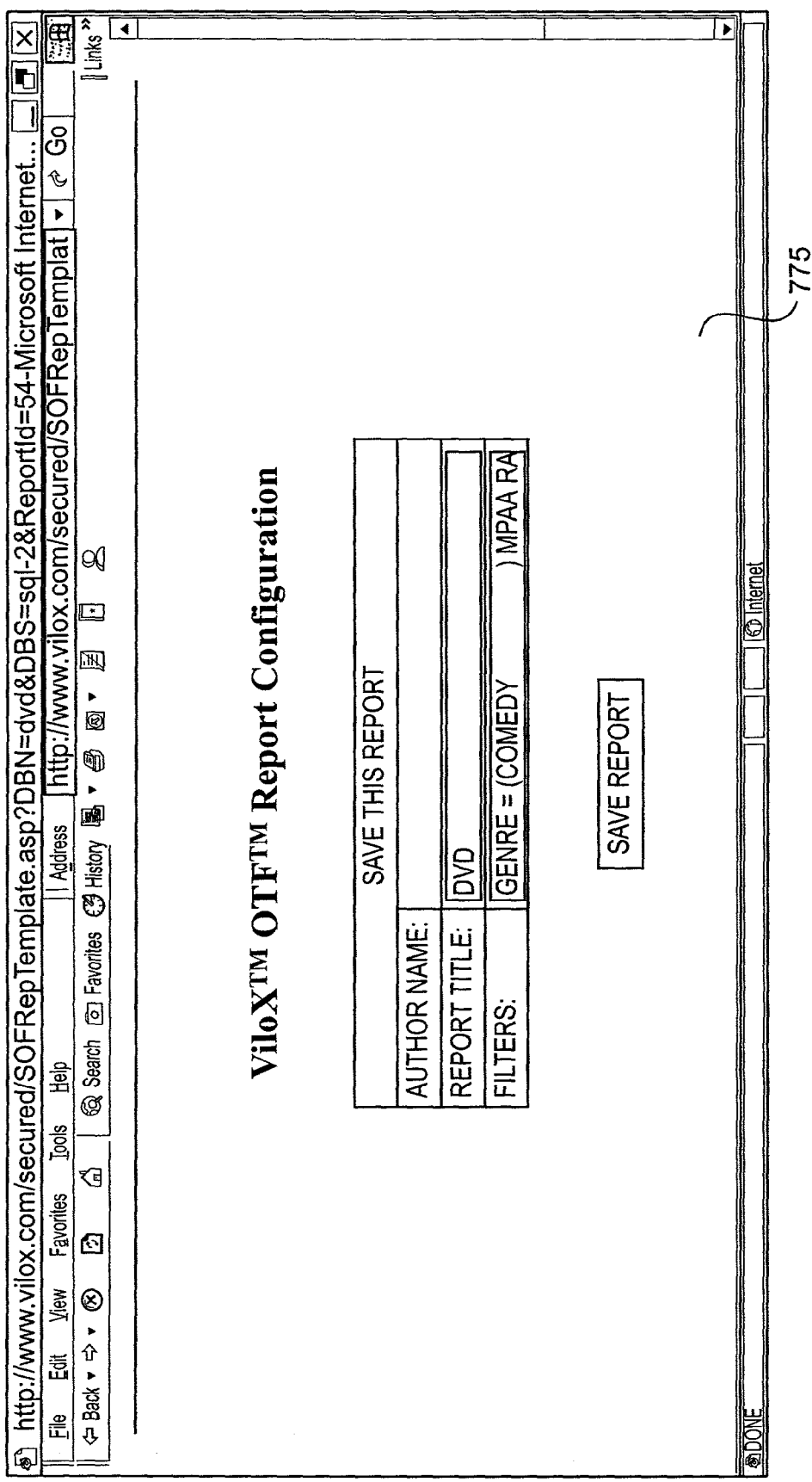
FIG. 29*b* illustrates a save report dialog.

FIG. 29b illustrates an embodiment of a Save Report screen or menu 775 that allows the user to save a report 770$_i$. In an aspect, the report 770$_i$ is created in HTML, XML, or other markup language, allowing the associated report to be bookmarked, or sent by e-mail to another user. In addition the report 770$_i$ may be accessed by another user who follows a link to the reports database, and who then generates a dynamic report based on the defined query 774$_i$. The report 770$_i$ may also be generated as a part of an application program, and also may be saved.

The Save Report screen 775 includes a dialog box that allows the user to specify an author's name and a report title. The dialog box also allows the user to see which search-on-the-fly filters were used for the search. A Save Report button may be operated to save the thus-identified search report 770$_i$.

Figure 29C:
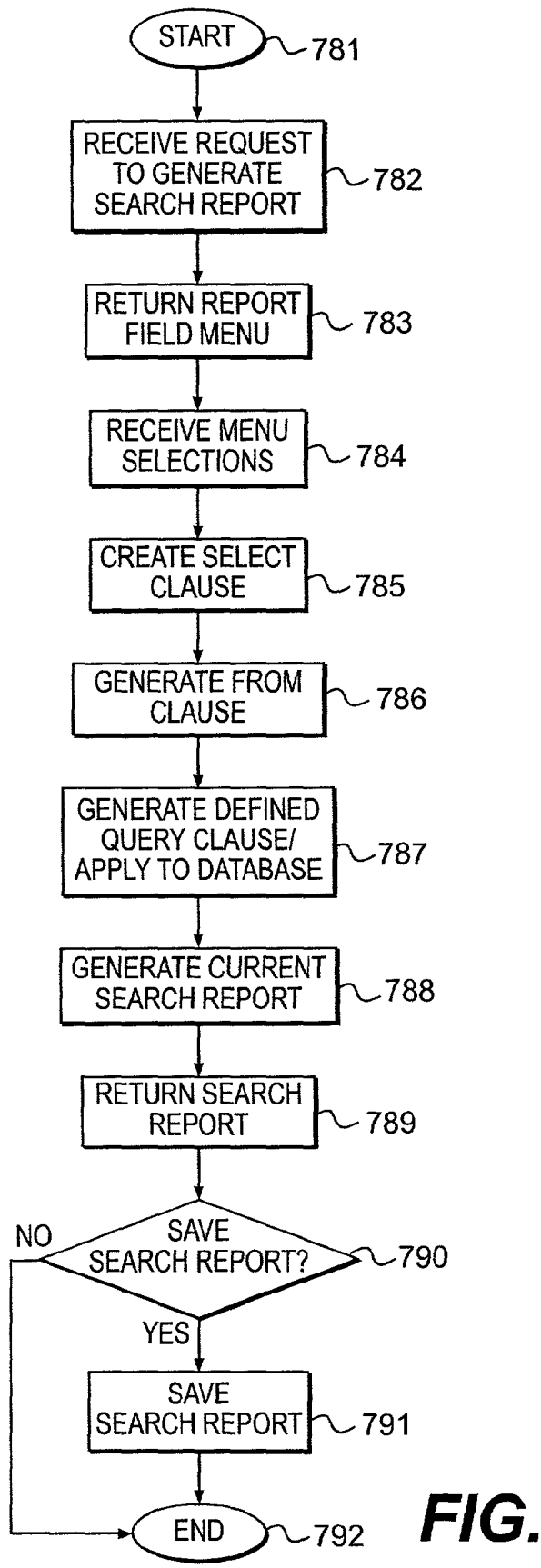
FIG. 29*c* is a flowchart illustrating application of the software modules of FIG. 29*b*.

FIG. 29c is a flowchart illustrating an operation 780 of a report generator for generating a search-on-the-fly search report 770$_i$. The operation 780 begins in start block 781. In block 782, the report generator receives a request to generate a search report. The request may be based on a previous search, and may include means for identifying the previous search results, such as a search identification (ID), for example. Such a request, when received, may result in generation of a WHERE clause 771$_i$ that specifies the search-on-the-fly search process. Also in response to the report generation request, the report generator may return a reports field menu, block 783. In block 784, the report generator receives selections from the reports field menu 765. The selection may result in creation of a SELECT clause $772_i$, block 785. In block 786, the report generator may generate one or more FROM clauses $773_i$ that show the link or path to a data element, or a database address. In block 787, the report generator combines the clauses $771_i$, $772_i$, and $773_i$ to generate a defined query $774_i$, which the report generator then applies to the database. In block 788, the report generator generates a current search report $770_i$ based on contents of the database, and the defined query $774_i$. In block 789, the report generator returns the search report $770_i$. In block 790, the report generator provides the SAVE REPORT menu 775, and in block 791 the report generator receives an instruction to either save or not save the search report $770_i$. If the instruction is to save the search report $770_i$, the report generator initiates action to save the search report at an address specified by the user. The operation 780 then ends, block 792. In block 791, if the instruction is not to save the report $770_1$, the operation 780 proceeds to block 792 and ends.

Figure 30A:
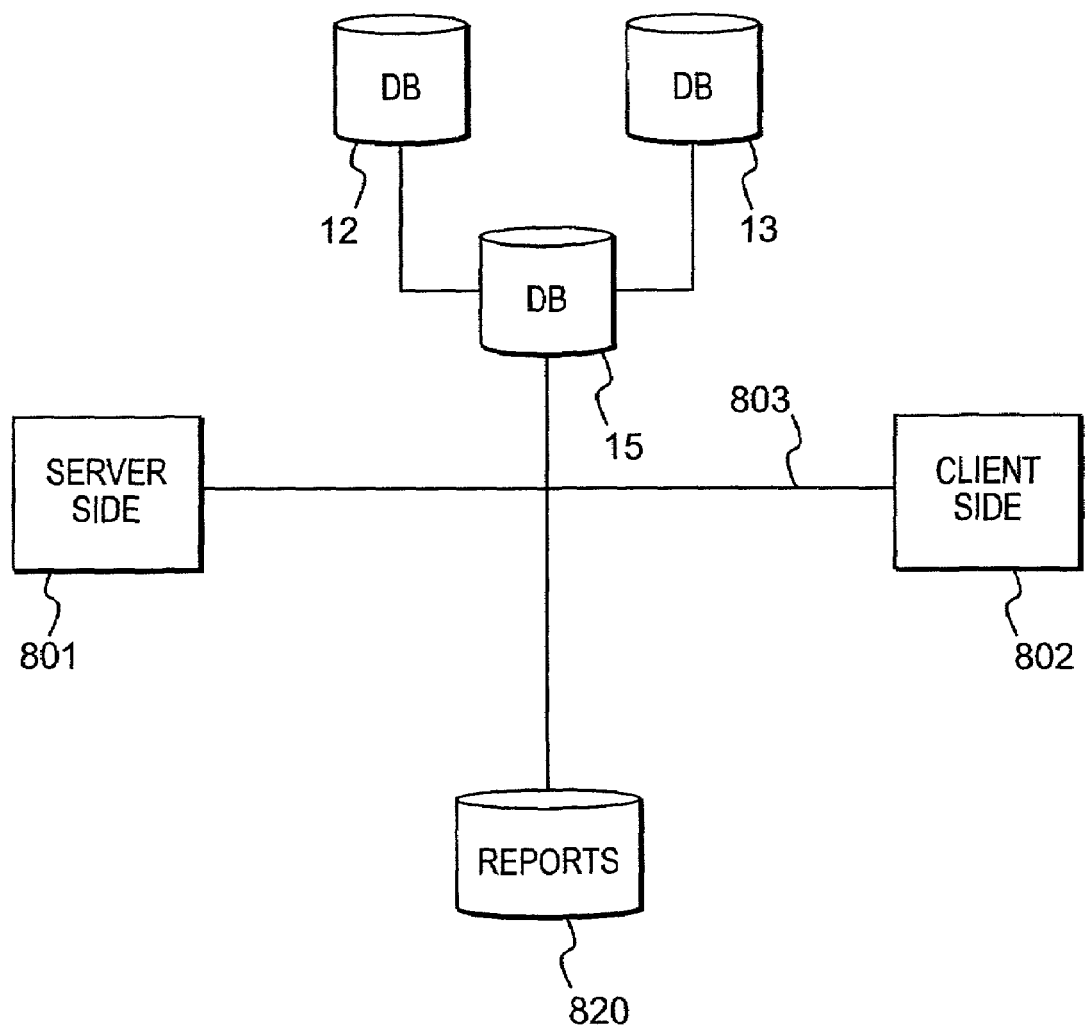
FIG. 30 is an environment for generating dynamic reports based on data from one or more databases.

FIG. 30a illustrates an environment 800 in which search-on-the-fly search reports $770_i$ may be generated. The environment 800 includes server side components 801 that may be located remotely from client side components 802. The server side components 801 and the client side components 802 may be coupled by a network 803. The network 803 may be a local area network (LAN), a wide area network (WAN) or other network, including the Internet. Also coupled to the client side components 802 and the server side components 801 are the databases 12, 13, and 15, and a reports database 820. The databases 12, 13 and 15 may contain data of interest to users at the client side 802 and the server side components 801, and may be searched using the server side components 801, for example. In an embodiment, the client side components 802 may direct or request a search of the databases 12, 13, and 15 using the server side components 801. In another embodiment, the client side components 802 may request generation of a search report, based on a prior search of the databases 12, 13 and 15. Search criteria for such a prior search may be stored in the reports database 820. In an embodiment, the search criteria are stored in a template, with links to specific data fields or tables in the databases 12, 13 and 15. Using the stored templates, a user at either the client side 802 or the server side 801 can request generation of a report. Such a report may represent the dynamic content of the databases 12, 13, and 15.

Figure 30B:
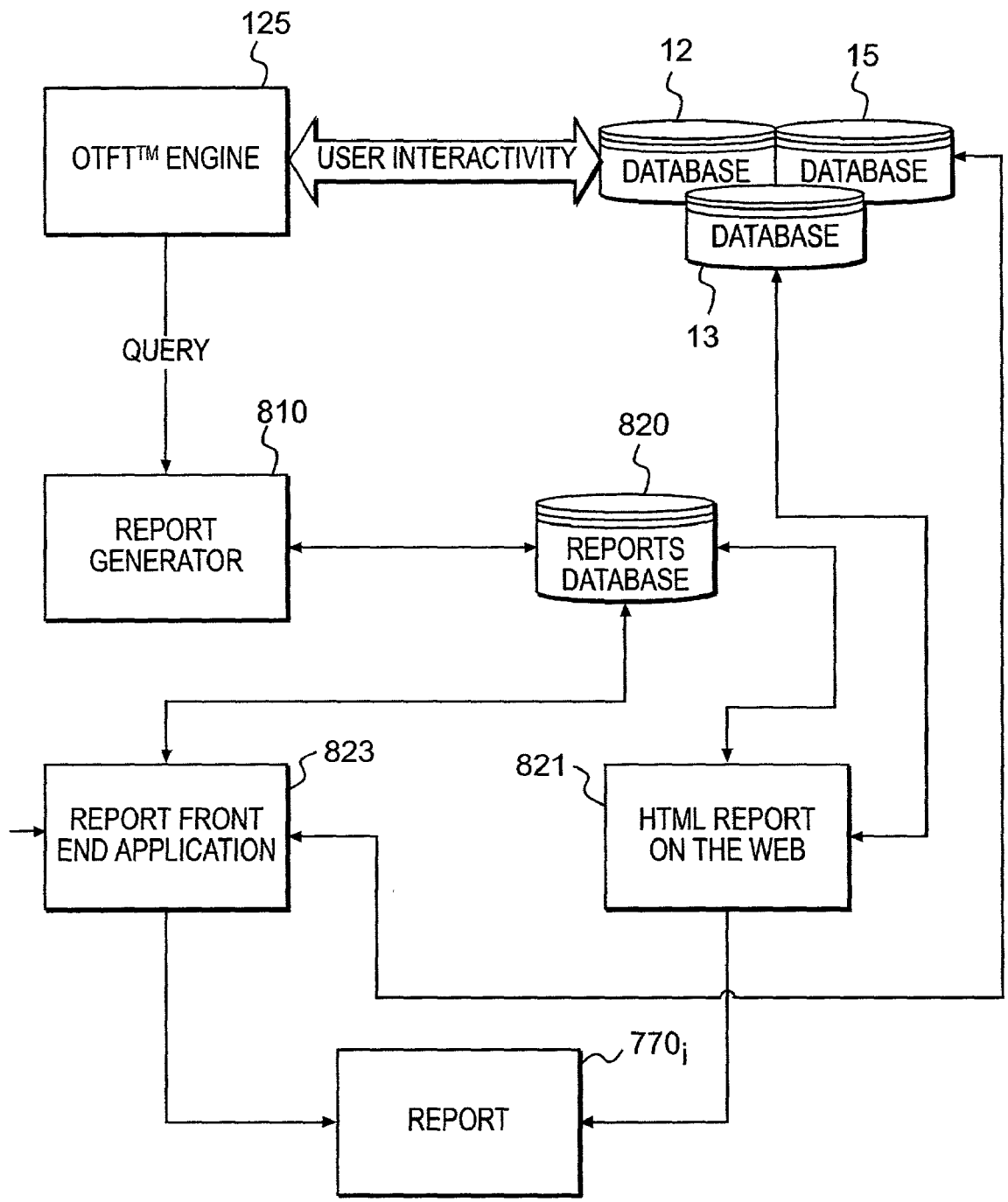

FIG. 30b illustrates the environment 800 in more detail. The environment 800 includes the OTFT search engine 125 coupled to the databases 12, 13, and 15. Included as server side components 801 may be a dynamic report generator 810. Client side components 802 may include an application front end 823 and a HTML front end 821, both coupled to the reports database 820. The front ends 821 and 823 are used to produce a report $770_i$. In an embodiment, the front ends 821 and 823, the report generator 810, and the OTFT search engine 125 may all reside at either the server side or the client side. Both the client side and the server side access the reports database 820 and the databases 12, 13 and 15. The server side components 801 access the databases 12, 13 and 15 to conduct an on-the-fly search and to initially build a report template, which may be subsequently stored in the reports database 820. Because a template is saved, any subsequent reports generated using the template will represent updated (dynamic) data in the databases 12, 13 and 15. The client side components 802 may be used to generate a report $770_i$ based on the template. The template acts as a road map to fields in the databases 12, 13 and 15. Using the template, the front end 821 and/or the front end 823 are able to construct a search report $770_i$ using the latest data saved in the databases 12, 13 and 15. Thus, the process of creating the report template provides for a dynamic report generating mechanism. However, the environment 800 is also capable of storing static reports generated by the front ends 821 and 823. Any such static reports may also be searched using the OTFT search engine 125.

Figure 31:
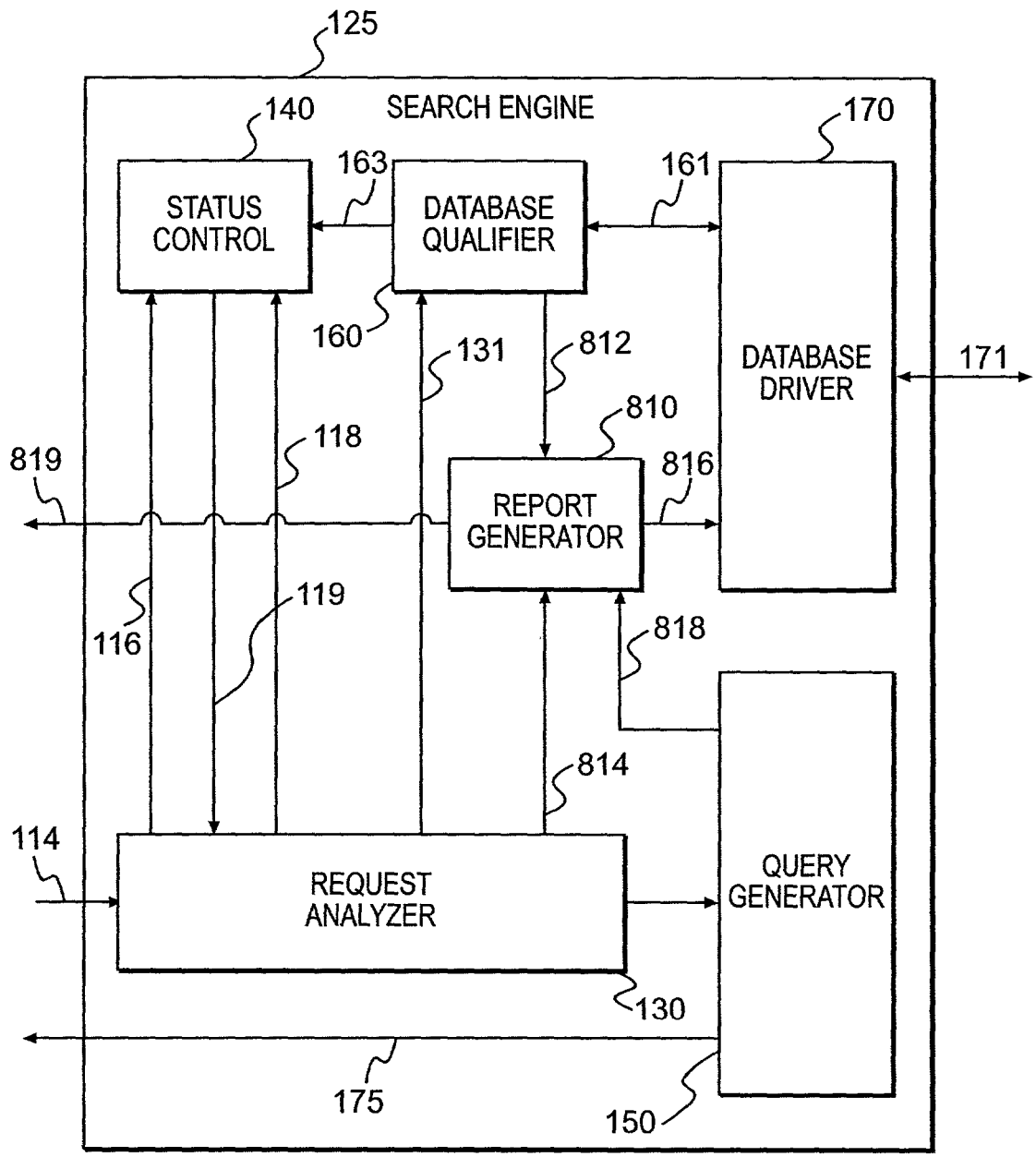
FIG. 31 is a block diagram of a search engine incorporating a report generator.

FIG. 31 shows the OTFT search engine 125 incorporating the report generator 810. The report generator 810 receives different types of requests 814. For example, the report generator 810 may receive a Prepare Report Request (give the field options to the user), or a Do Report Request (show/print the report). When the request 814 is a Prepare Request Report, the report generator 810 receives a list 812 of reportable fields from the database qualifier 160 and send the list 819 back immediately back to the user. In an embodiment, the list 819 could be a pop-up menu with checkboxes, a numbered list in a cell phone, and a dropdown selection box in a program application, for example.

The Do Report Request contains the selected list of fields the user wants to report. The report generator 810 then gets a "RAW" report query 818 (raw because this is a simple query containing all the fields selected, and the filtered condition generated by the search (drill down) using the OTFT search engine 125 includes information about the field data types and metadata) and sends back to the user a command to show the report $770_i$. The command could be in a application to open the program/class/object/form that will actually display the report $770_i$ along with a report identification (ID) as a parameter.

Figure 32:
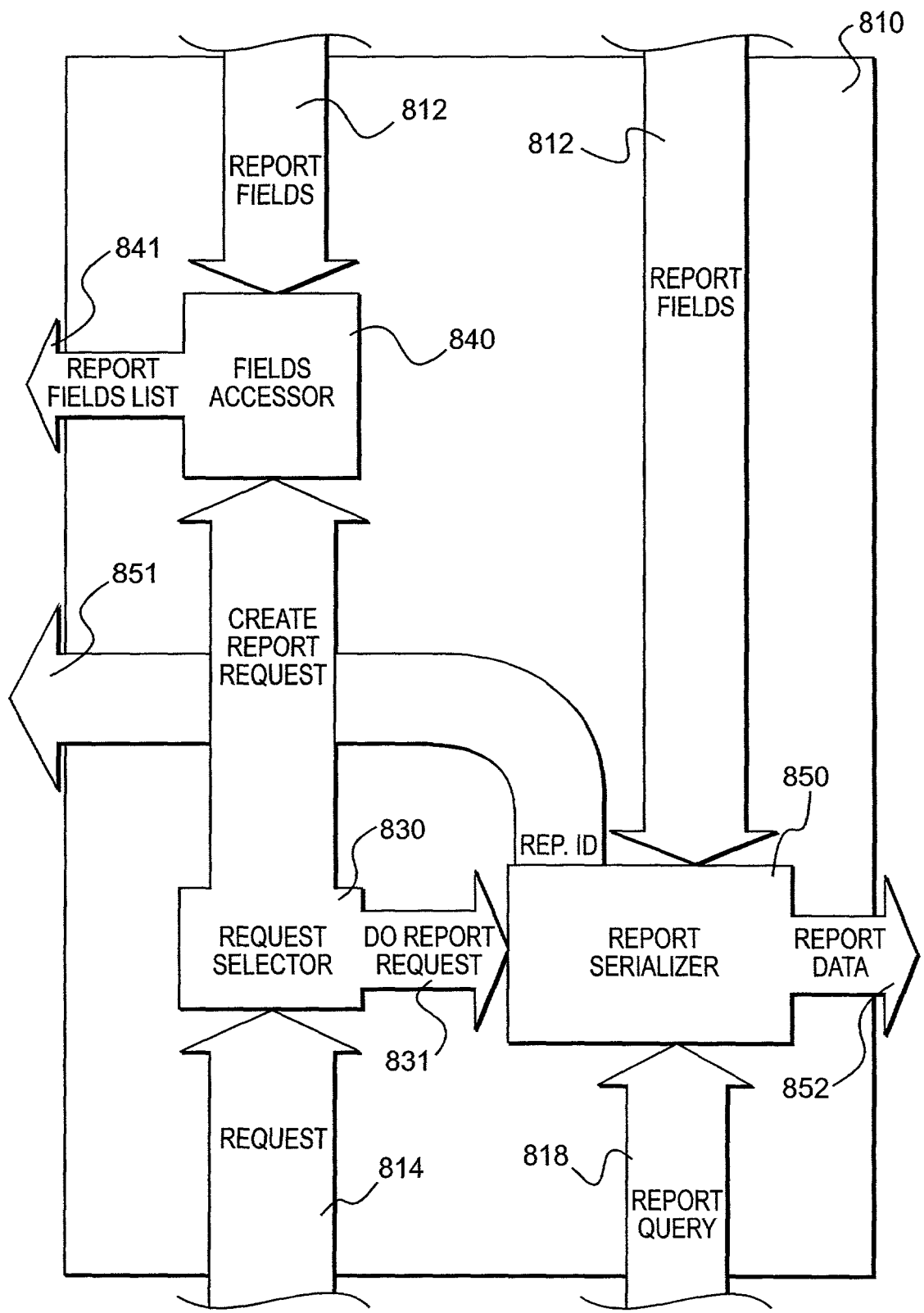
FIG. 32 is a block diagram of the report generator of FIG. 31.

FIG. 32 shows the report generator 810 in detail. The report generator 810 includes a request selector 830 that receives requests 814 and provides a Do Report Request 831 or a Prepare Report Request 832. In particular, the request selector 830 receives the different requests types (e.g., Prepare Report or Do Report) and redirects the request 814 to the appropriate module to be processed and delivered.

Coupled to the request selector 830 is a fields accessor 840 and a report serializer 850. The fields accessor 840 receives the Prepare Report Request 832 and the Report Fields Command 812 and produces a fields list 841 for presentation to the user. If the request is a Prepare Report Request 832, the fields accessor 840 receives the request, and interacting with the external data from the database qualifier 160, creates a list of the reportable fields in the database/database subset. This list is formatted using the same format used for the regular operations of the OTFT search engine 125, which could be a pop-up menu, a WML/WAP page (for cell phones), a HTML page, or different format depending of the situation.

A report serializer 850 receives the report query 818, the Do Report Request 831 and the Report Fields Command 812, and produces a report data message 852 and a report identification 851. That is, when the request is a Do Report Request 831, the request serializer 850 will take the request (which contains the list of selected fields by the user), and request a report query 818 from the query generator 150 (see FIG. 31). The report query 818 is a "RAW" SELECT query, selecting the fields chosen by the user, and filtering (using the WHERE clause), the conditions corresponding to the drill down. The query, and information about the fields to be reported, are also serialized in the reports database 820 as a template, so that when displaying/printing the report, the report generator 810 is capable of re-querying the database 820 looking for the same subset of the data.

The report generator 810 may also format the data or use plug-ins to transform the data into a different form. Transformation of the data may be useful for one-time reports, when searching legacy databases, and at other times. The data transform may occur as part of a query, or may occur after the search results are obtained. A plug-in may specify data fields from which data is to be extracted and may then specify the format for reporting the extracted data. An example of a plug-in is the "Hundred Year Date Plug-In," which transforms the numeric data saved as a date encountered in some legacy databases.

Following is an example of a resulting QUERY using the Year Date Plug-In:
SELECT GIP.RMNOGI as Room_Number, RMP.RMTPRM as Room_Type,
ROOMSTATUSDESC.DESCRIPTION as Room_Status, GIP.CONVGI as Group_Code,
GIP.VIPGI as Vip_Code, GIP.LNAMGI as Last_Name, GIP.FNAMGI as First_Name,
GIP.ARDTGI as Arrival_Date, GIP.DPDTGI as Departure_Date FROM RMP LEFT JOIN GIP ON (RMP.RMNORM=GIP.RMNOGI) LEFT JOIN ROOMSTATUSDESC ON (ROOMSTATUSDESC.STATUS=RMP.CSTARM)
WHERE ({fn SUBSTRING(GIP.VIPGI, 1, 1)}='N' OR {fn SUBSTRING(GIP.VIPGI, 1, 1)}='1' OR {fn SUBSTRING(GIP.VIPGI, 1, 1)}='2' OR {fn SUBSTRING (GIP.VIPGI, 1, 1)}='3') AND (GIP.ARDTGI BETWEEN 37103 AND 37107) ORDER BY Vip_Code. This specific plug-in may be used by a hotel chain to track check-ins of hotel quests and to provide other data for hotel management.

In the above query example, (GIP.ARDTGI BETWEEN 37103 AND 37107) means the dates (Aug. 1, 2001 to Aug. 5, 2001). The results are shown as:

results are packaged by the report package controller 854 in the form of a report template, which is sent to the database updater 856. The database updater 856 stamps the template in the report database 820 (see FIG. 30a). The database updater 856 then obtains a report ID for the report 770$_i$, and returns the report 770$_i$ to the user. The report ID enables the user to recreate the conditions of the report 770$_i$, and to display/print/transmit the report 770$_i$.

Figure 34:
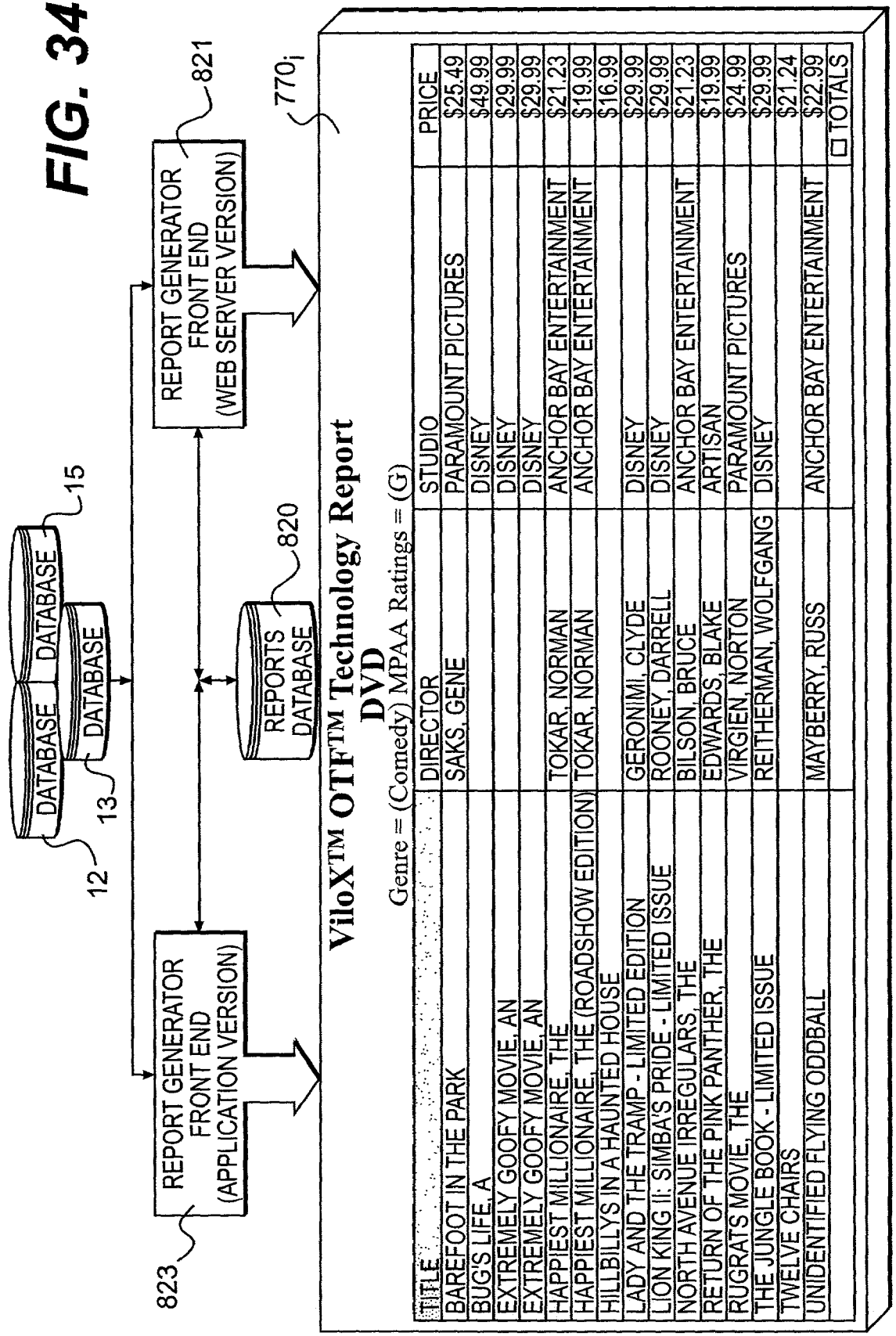
FIG. 34 is a block diagram of an environment for generating a report on a client side.

FIG. 34 illustrates a report generation environment in which the report 770$_i$ (based on the DVD example of FIG. 25) is generated. The databases 12, 13 and 15 may contain DVD data accessible by the OTFT search engine 125 (not shown in FIG. 34). The databases 12, 13 and 15 are also accessible by the client-side report generation means, specifically the front ends 821 and 823. A template for the report 770$_i$, the report 770$_i$ having a unique ID, may be stored in the reports database 820. By referencing a unique report ID, the DVD data accessed from the databases 12, 13 and 15 is transformed using the front ends 821 and 823 to generate the report 770$_i$. The report 770$_i$ may subsequently be stored as a report in the reports database 820, and may be assigned a unique ID.

Figure 35:
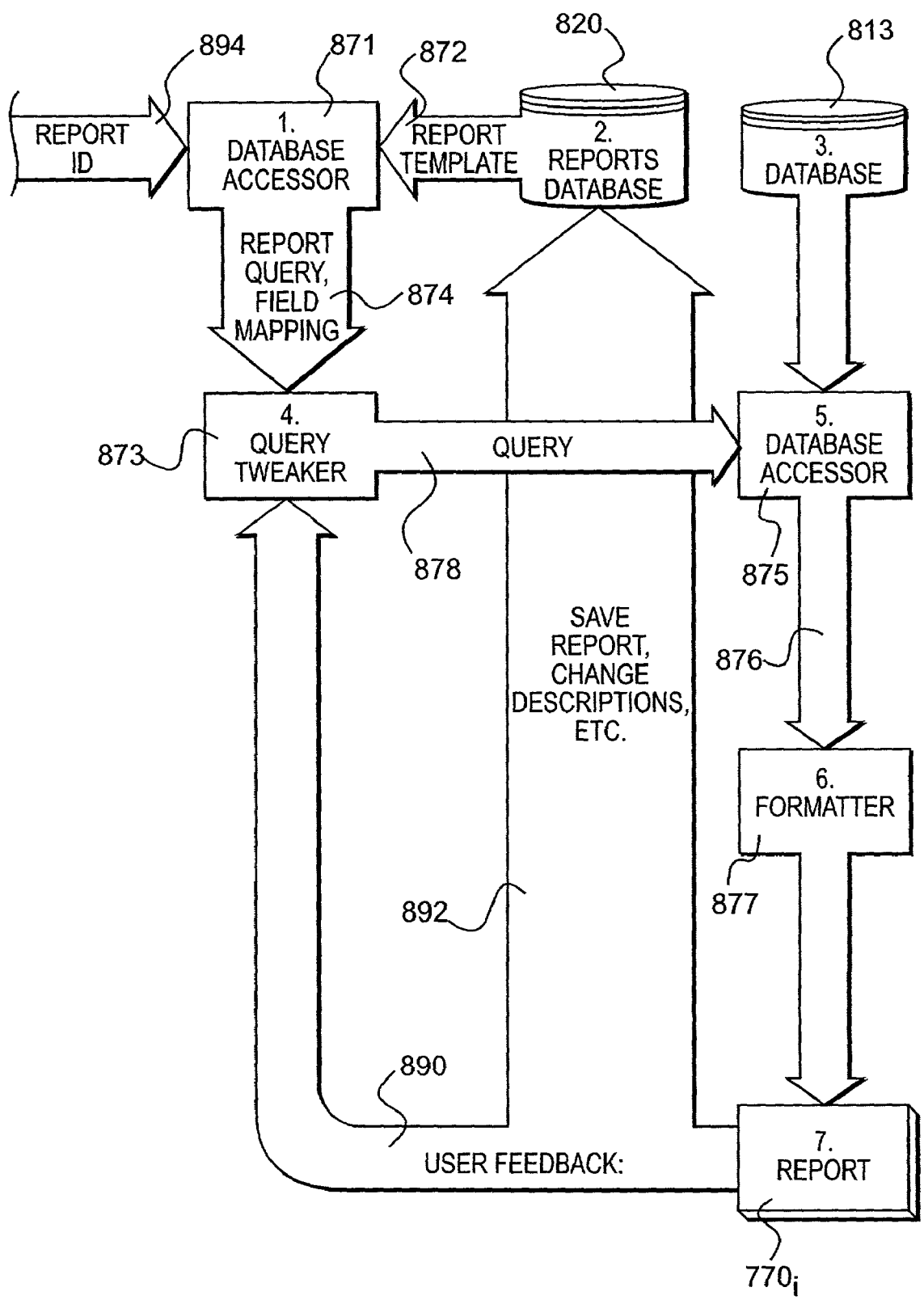
FIG. 35 is a block diagram of components of client-side report generator components.

FIG. 35 illustrates components of the report generator front end 821 of FIG. 34. The components shown in FIG. 35 may be similar to those for the report generator front end 823. The report generator front end 821 includes a reports database accessor 871, a query tweaker 873, a database accessor 875, and a formatter 877. The reports database accessor 871 accesses the reports database 820 to extract a report template 872. The reports database accessor 871 may be provided a report ID 894 to identify a specific report template 872. The database accessor 871 provides information to the query tweaker 873. Such information may include the information based on the report template 872, and other information provided by the user. Information based on the report template 872 may include field mapping or address data contained in, or referenced, by the report template 872.

VIP Arrival Report
(8/1/2001 to 8/5/2001)
Vip_Code = (N, 1, 2, 3)
by Front Desk

| ROOM NUMBER | ROOM TYPE | ROOM STATUS | GROUP CODE | VIP CODE | LAST NAME | FIRST NAME | ARRIVAL DATE | DEPARTURE DATE |
|---|---|---|---|---|---|---|---|---|
| 2217 | NK | Inspected | NMMII01 | 1 | XXXXX | ASARU/1* | 8/2/2001 | 8/3/2001 |
| 2218 | NK | Inspected | SUCBIE | 1 | XXXXX | PAUL* | 8/5/2001 | 8/9/2001 |
| 2418 | NK | Inspected |  | 1 | XXXXX | LESLIE* | 8/2/2001 | 8/5/2001 |
| 1816 | SE | Inspected | SUCBIE | 1 | XXXXX | SALIM* | 8/4/2001 | 8/10/2001 |
| 2310 | ND | Dirty |  | 1 | XXXXX | VESTER* | 8/5/2001 | 8/6/2001 |
| 1705 | SE | Dirty | NDEAN01 | 1 | XXXXX | DEAN* | 8/1/2001 | 8/2/2001 |
| 2122 | SC | Inspected |  | 2 | XXXXX | KOSUKE** | 8/2/2001 | 8/3/2001 |
| 2425 | NK | Dirty |  | 2 | XXXXX | MITSUO** | 8/2/2001 | 8/5/2001 |
| 1922 | SE | Inspected |  | 2 | XXXXX | SHUJI** | 8/3/2001 | 8/4/2001 |

Figure 33:
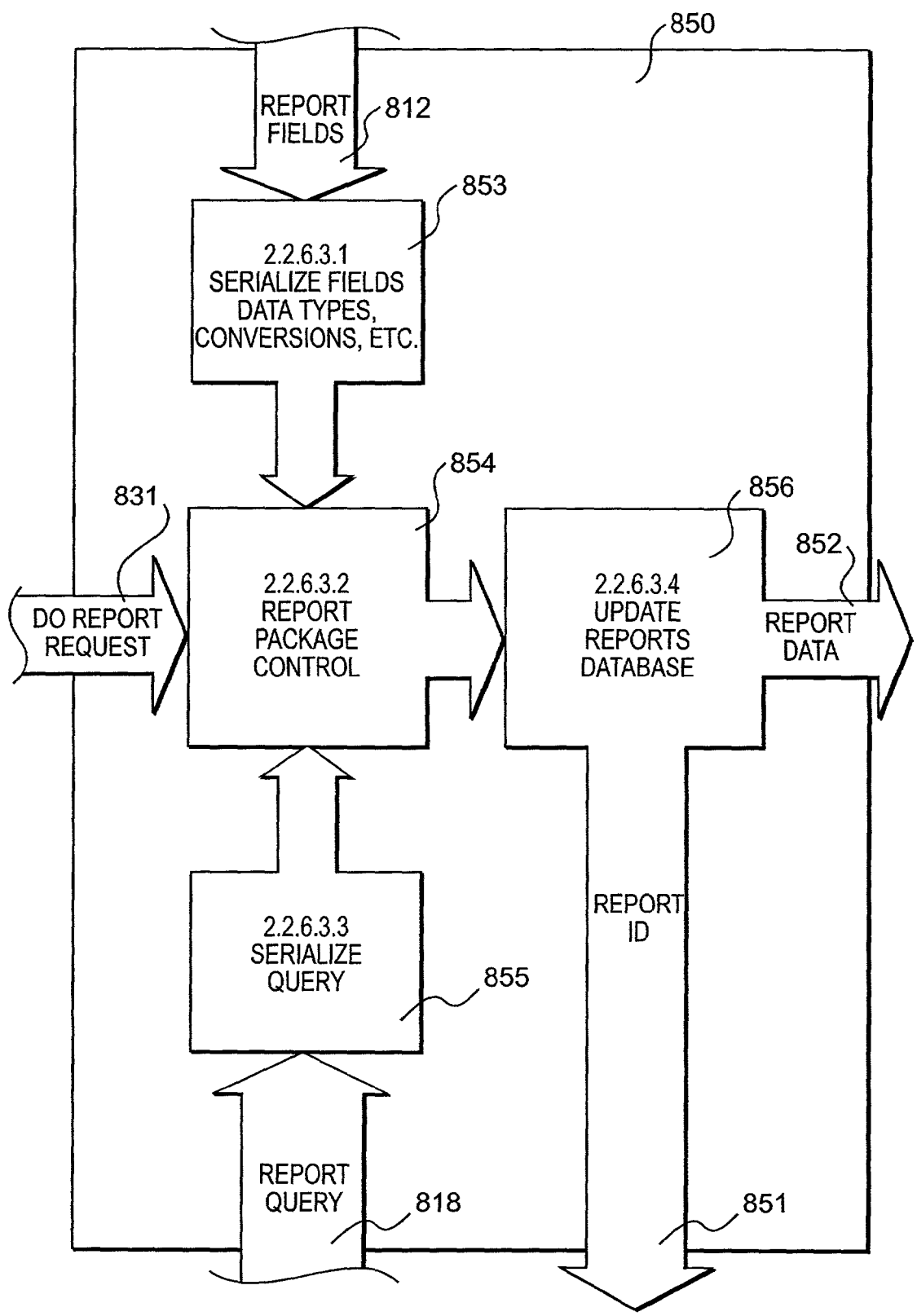
FIG. 33 is a block diagram of a report serializer used with the report generator of FIG. 32.

FIG. 33 shows the report serializer 850 in detail. The report serializer 850 includes a fields serializer 853, a report package controller 854, a query serializer 855 and a database updater 856. The report package controller 854 receives the Do Report Request 831, with the list of fields as designated by the user, the report package controller 854 requests a report query from the query generator 150, and information about the fields (metadata) obtained from the database qualifier 160 (see FIG. 3). The metadata and the report query The query tweaker 873 receives a raw query on the database 13, and generates a specific query 878. In generating the specific query 878, the query tweaker 873 perform special transformations and corrections, including setting up types of JOIN operations based on the database schema; applying filters and plug-ins; and applying GROUP BY clauses. Once the query 878 is ready, the query 878 is sent to the database accessor 875. The database accessor 875 runs the query 878 against the database 13. The result of this search, a recordset object 876, is sent to the formatter 877, which fetches the records, and formats the fetched records according to information obtained from the fields metadata and the plug-ins. The formatter 877 then outputs the report 770$_i$.

Means are also provided for the user to view and edit the report 770$_i$. A user feedback 890 allows the user to view the report, and to edit the report as desired. Means are also provided for saving the report 770$_i$, and to change descriptions and other metadata. A save/change function 892 allows the user to designate the report 770$_i$ for saving. The function 892 also allows the user to change the template 872 associated with the report 770$_i$, and to save the changed template 872 in the reports database 820.

FIG. 36 illustrates an example of raw data saved in a template 872 in the reports database 820. In the example, the raw data relates to sales of electronic equipment. As shown, the raw data includes field descriptors of authors, date and title; the specific query; applied filters; and fields metadata.

FIG. 37 illustrates a report 770$_i$ associated with the raw data and template 872 of FIG. 36. The example report 770$_i$ shown in FIG. 37 relates to retail sales of Sony® brand electronics and related products by a specific sales representative, Deborah. To generate the report, the query tweaker 873 receives a new query on the databases 12, 13, and 15. The query tweaker 873 then performs any desired transformations, including setting up types of JOIN operations according to the architecture of the databases 12, 13, and 15; applying any filters and plug-ins; and applying any GROUP BY clauses. The transformed query is then sent to the database accessor 871, which runs the transformed query against the database. In the process of accessing the databases 12, 13 and 15, the database accessor 871 passes a recorded object to the formatter 877, which filters records from the databases 12, 13, and 15. The formatter 877 formats the records using information from the fields metadata and the plug-ins. The report 770$_i$ can then be displayed and printed.

Figure 38A:
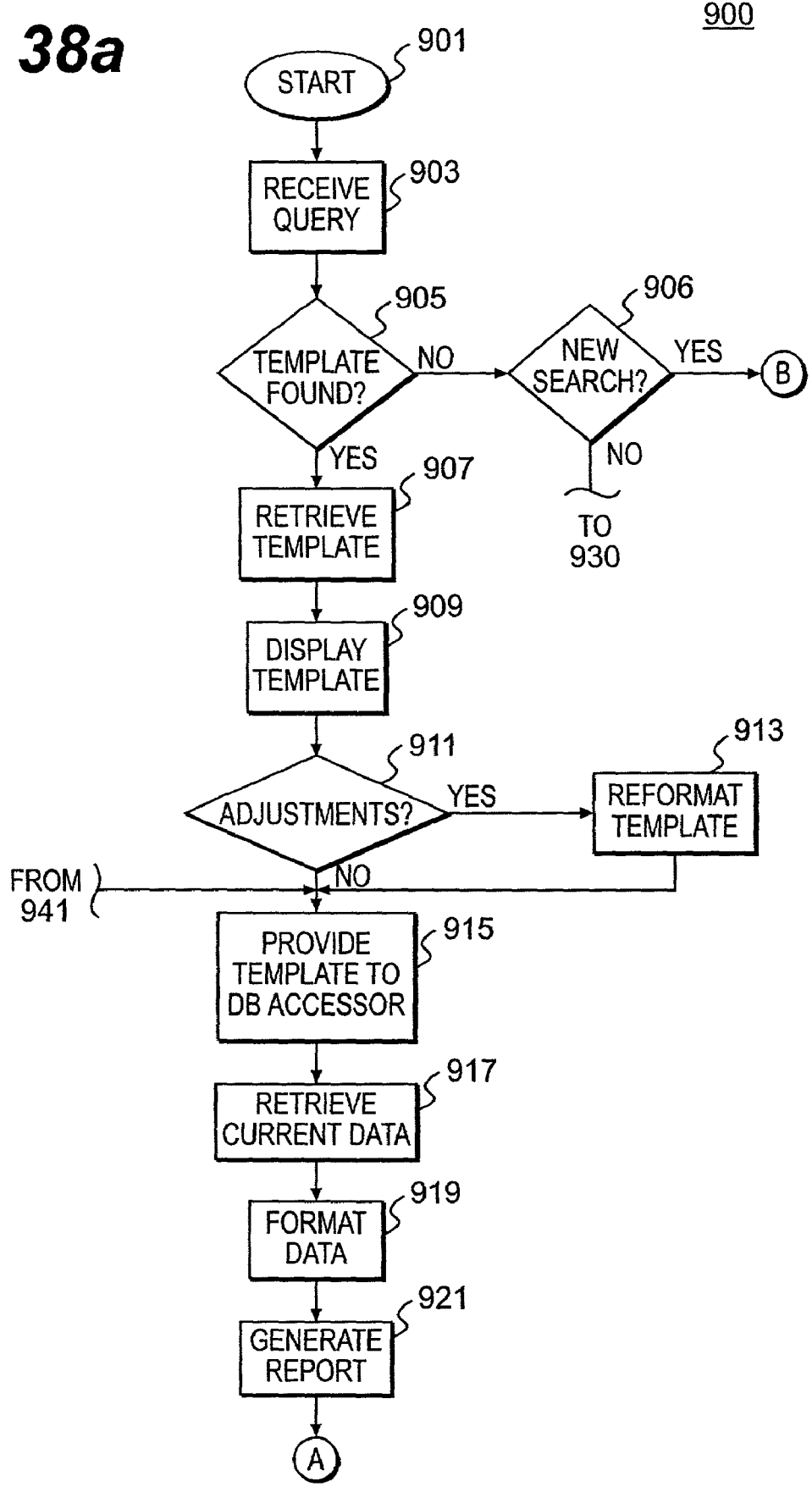
FIGS. 38*a–c* are flowcharts illustrating an operation of the report generator.
Figure 38B:
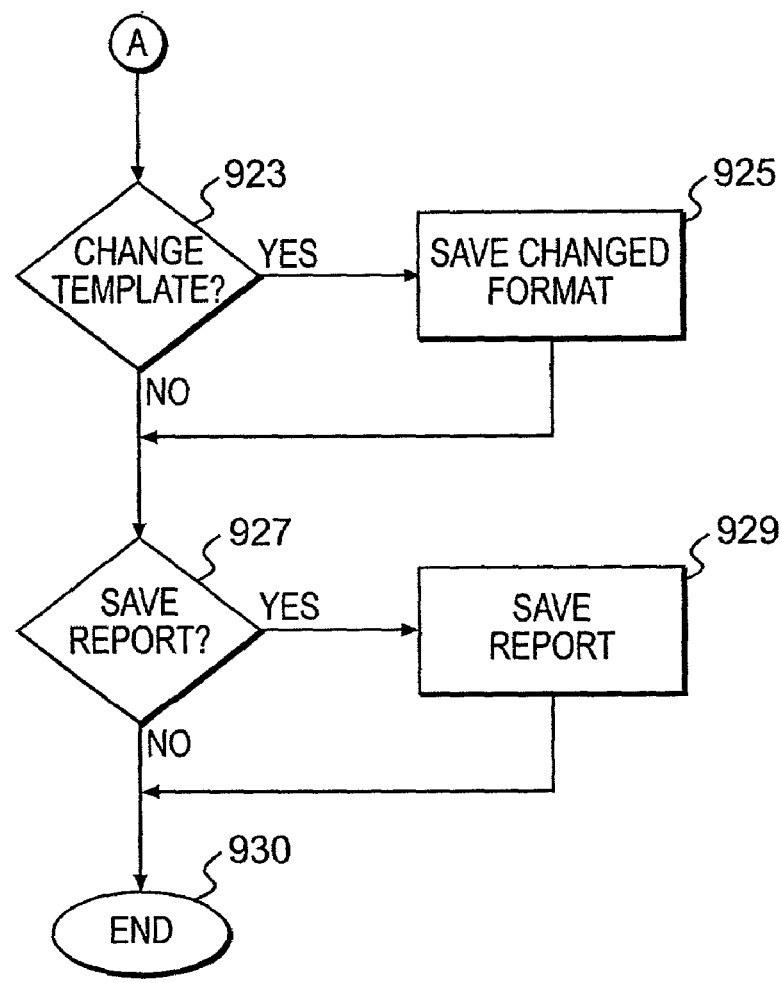
Figure 38C:
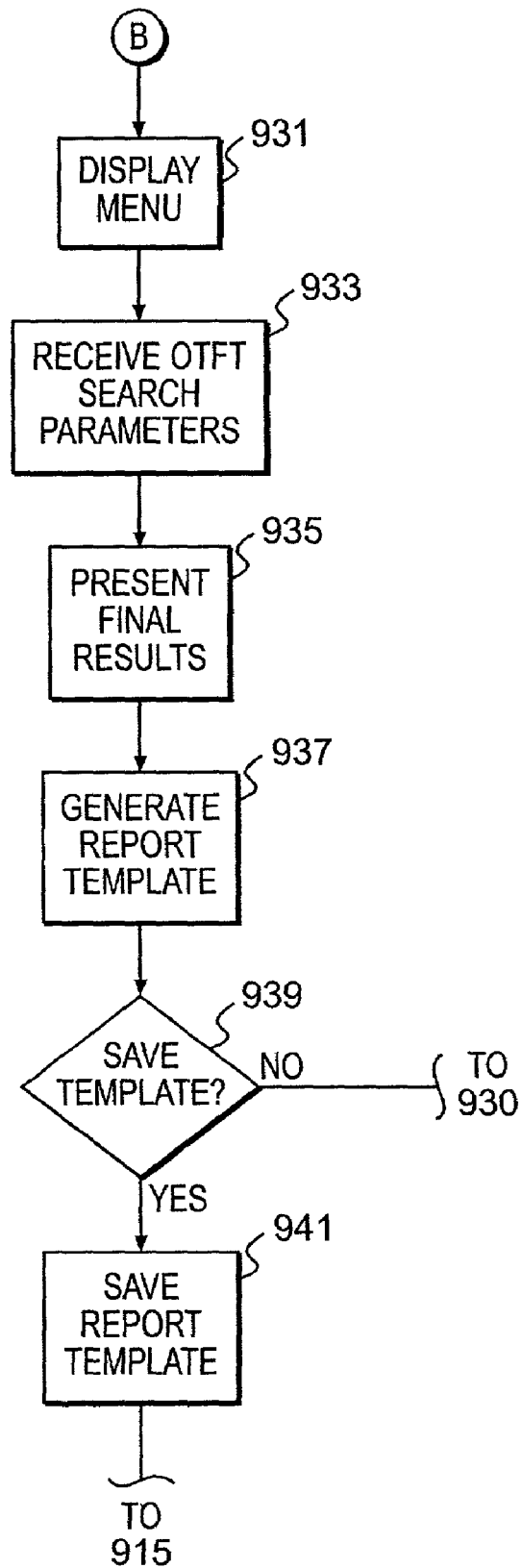

FIGS. 38a–c show a flowchart illustrating an report generation operation 900 using the front ends 821 and/or 823 of FIG. 30b. The operation 900 begins in start block 901. In block 903, the database accessor 871 receives a prepare report request. The request may include a report ID 894 that allows the database accessor 871 to search the reports database 820 for a specific report template 872. The database accessor 871 may also search the reports database 820 using criteria other than the report ID 894. For example, the database accessor 871 may using a keyword or report title to search for a specific report template 872. In block 905, the database accessor 871 determines if a report template 872 exists in the reports database 820. If a report template 872 exists, the database accessor 871 retrieves the report template 872, block 907. The database accessor 871 then provides the report template 872 to the query tweaker 873, and the report template is displayed, block 909. The display of the report template 872 may optionally include a prompt to make changes or adjustment to the report template 872. In block 911, the query tweaker 873 may receive changes to the report template 872. If adjustments are received, the operation 900 moves to block 913, and amends the report template 872, block 913. The operation 900 then moves to block 915. In block 911, if adjustments are not made, the operation 900 moves to block 915.

In block 915, the query tweaker 873 provides the report template 872 to the database accessor 875. Using the report template 872, the database accessor 875 accesses the database 13 to retrieve the latest saved data for the data fields specified in the report template 872, block 917. In block 917, the database accessor may access multiple databases. In block 919, the formatter 877 formats the retrieved data, and in block 921, generates the search report 770$_i$. The search report 770$_i$ may then be displayed to the user, and the user may edit or modify the search report 770$_i$. The user may also choose to save the search report 770$_i$, and to change the report template 872. In an embodiment, the user may be restricted from changing the report template 872, and only authorized personnel may be allowed to create and change report templates 872.

In block 923, the query tweaker 873 may prompt the user to change the report template 872. The prompt may be provided as a pop-up screen, window, or dialog box, for example. If the query tweaker 873 receives a YES to the change report template 872 prompt, the operation 900 moves to block 925, and the changed report template 872 is saved in the reports database 820. If the query tweaker 873 receives a NO to the change report template 872 prompt, the operation 900 moves to block 927, and the query tweaker 873 prompts the user to save the search report 770$_i$. If, in response to the save search report 770$_i$ prompt, the query tweaker 873 receives a YES, the operation 900 moves to block 929 and saves the report. As part of block 929, the query tweaker 873 may prompt the user to enter a destination address for storing the search report 770$_i$. Alternatively, the query tweaker 873 may provide a default address for storing the search report 770$_i$. The operation 900 then moves to block 930 and ends. In block 927, the query tweaker 873 receives a NO in response to the save search report 770$_i$, prompt, the operation moves to block 930 and ends.

In block 905, if the report template 872 is not found, the operation 900 moves to block 906, and the query tweaker 873 prompts the user to elect a new search. If the user does not elect a new search, the operation 900 moves to block 930 and ends. Otherwise, the operation 900 moves to block 931, and the search engine 125 initiates a database search (drill down) using a series of search menus (see, for example, FIG. 25). The operation moves to block 933, the search engine 125 receives search-on-the-fly search parameters, and the search engine 125 performs the requested search-on-the-fly search. In block 935, the search engine 125 presents the final results of the search. In block 937, the report generator 810 generates the report template 872. In block 939, the report generator 810 prompts the user to save the generated report template 872. If the report generator 810 receives a NO in response to the save report template 872 prompt, the operation 900 moves to block 930 and ends. If the report generator 810 receives a YES in response to the save report template 872 prompt, the operation 900 moves to block 941, and the report template 872 is saved in the reports database 820. The operation 915 then returns to block 915.

The database accessor 875 runs the query against the database 13, block 917, yielding a recordset object 876. In block 919, the recordset object 876 is sent to the formatter 877, which then formats the search results according to the fields metadata and any plug-ins. In block 921, the formatter 877 generates the report 770$_i$.

Following report generation, the user may charge and/or save the report template as shown in FIG. 38b. In block 923, the user may be prompted, by way of a graphical user interface, for example, to change the search template 872. If the user chooses to change the search template 872, the user may save the changed template format, block 925. The changed template format may be saved in the reports database 820. In block 927, the user may be prompted to save the generated search report. If the user chooses to save the report, block 929, the report may be saved in the reports database 820. The operation 900 then ends.

In block 906, if the user elects to conduct a new search, the operation 900 moves to block 931, as shown in FIG. 38c, and a search menu is displayed (see FIG. 25, for example). In block 933, the query generator 160 receives on-the-fly search parameters, and a search of the databases 12, 13, and 15 is completed. In block 935, the search results are displayed. In block 937, a report template 872 is generated. In block 939, the user is prompted to save the template 872. If the user chooses not to save the template 872, the operation 900 returns to block 930. If the user chooses to save the report template 872, the operation 900 moves to block 941, the report template 872 is saved in the reports database 820, and the operation 900 then returns to block 915.

Figure 39:
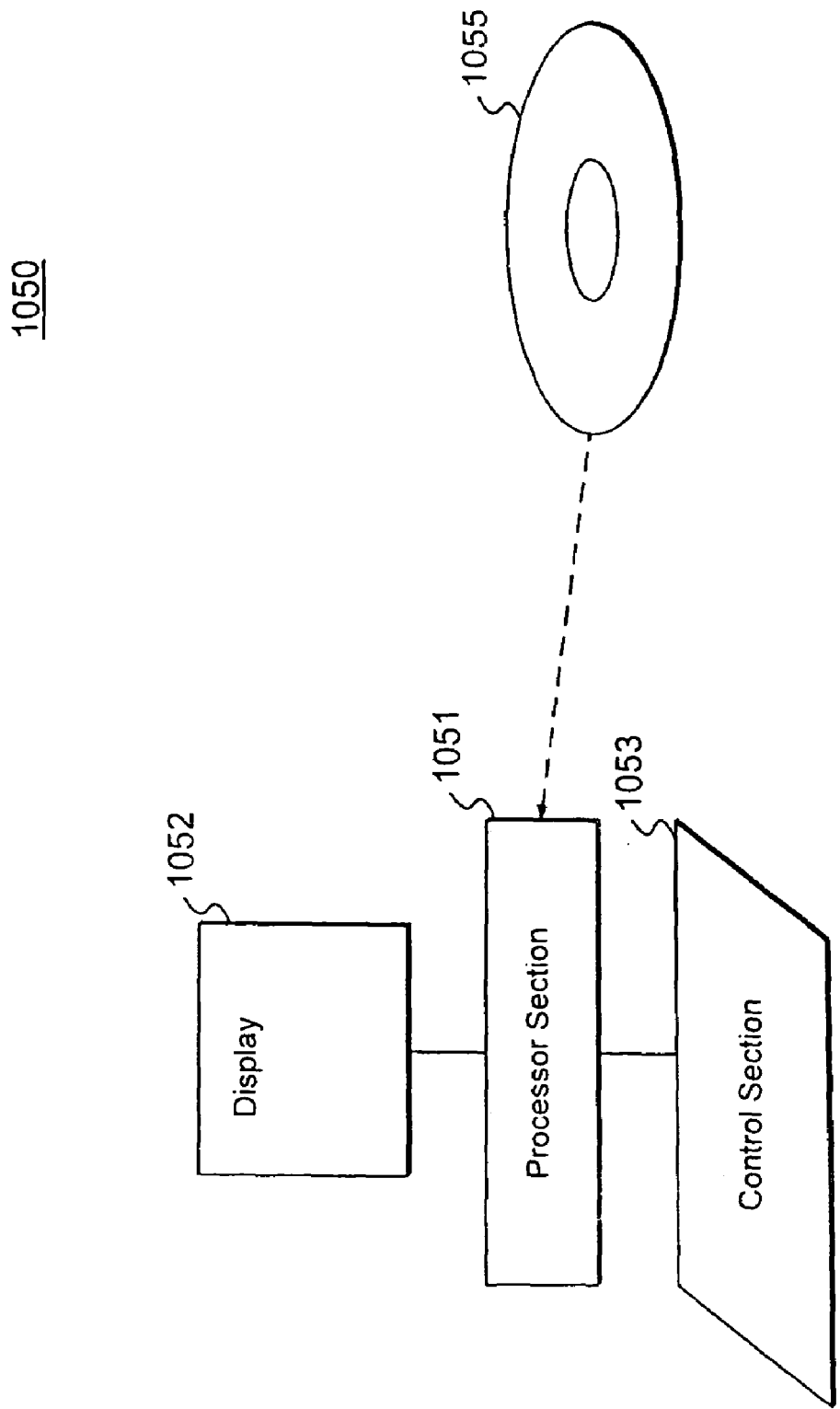
FIG. 39 illustrates a computer-readable medium having the search-on-the-fly with merge function and search report generator loaded thereon.

FIG. 39 illustrates a general purpose personal computer system 1050 that may be used for search-on-the-fly of a plurality of databases. The system 1050 includes a processor section 1051, a display 1052 and a control section 1053 coupled to the processor section 1051, and a computer readable medium 1055, which may be read by components of the processor section 1051. The computer readable medium 1055 may include the software routine required to implement the search-on-the-fly with merge function method and the report generator method.

In specific embodiments, the search engine 125 is implemented as a program executed on a general purpose computer, such as a personal computer. The search engine may also be implemented as a routine attached to a database structure. In addition, the search engine may be implemented on any processor capable of executing the routines of the program. In alternative embodiments, the search engine 125 may be implemented as a single special purpose integrated circuit (e.g., ASIC) having a main or central processor section for overall, system level control, and separate circuits dedicated to performing various different specific functions, computations and other processes under control of the central processor section. Those of ordinary skill in the art will appreciate that the search engine 125 may also be implemented using a plurality of separated dedicated or programmable integrated circuits, or other electronic circuits or devices (e.g., hardwired electronic or logic circuits such as discrete elements circuits, or programmable logic devices, such as PLDs, PLAs, or PALs). In general, any device or assembly of devices on which a finite state machine capable of implementing flowcharts similar to the flowcharts of FIGS. 16–22 and 38a–38c can be used to implement the search engine 125.

While using search-on-the-fly method and apparatus has been described in detail for an end result of printing, viewing or displaying data, search on the fly can be useful for other purposes. Search on the fly does not require obtaining the underlying data in the database or the display of the underlying data to be useful. Search on the fly can be used for gathering information or characteristics about data in a database with or without downloading the data itself. This gathered information about the data can be used to analyze the data, sorting, correct or clean data, verifications and confirmations. For example, search on the fly can be used to determine whether there is existing data in a database within certain ranges or parameters (date ranges, numerical, alphanumerical and other characteristics). If there is data within certain parameters, the number of datapoints within those parameters can also be determined. This information about the data can be gathered using search on the fly with queries to the database manager (which may simply need to query its index and not access the data itself). Another example is correcting data. Data may need to be corrected or cleaned for various reasons including spelling errors. Search-on-the-fly can locate these errors without necessarily accessing and downloading the data itself. Certain combinations of characters or truncations will be obvious spelling errors. Also, data that is out of range can be located and corrected or eliminated from the database using search-on-the-fly. Another example is data from one database can be confirmed or verified against data in a second database using search-on-the-fly. Those skilled in the art will find many uses and specific applications for search-on-the-fly.

The terms and descriptions used herein are set forth by way of illustration only and are not meant as limitations. Those skilled in the art will recognize that many variations are possible within the spirit and scope of the invention as defined in the following claims, and there equivalents, in which all terms are to be understood in their broadest possible sense unless otherwise indicated.

The invention claimed is:

1. A computer-based method for creating a data report, comprising:
   receiving a query, whereby the query comprises a database search request, and wherein the database is searched using an on-the-fly search;
   a query tweaker generating a defined query of the database from the received query, wherein generating the defined query includes the query tweaker performing transformations and corrections on the received query;
   accessing one or more databases, using a search engine, per the defined query;
   generating a search result based on the database access, wherein the search result includes one or more descriptors indicating corresponding data categories; and
   creating a template of the search result, wherein the template comprises links to the data categories described by the one or more descriptors.

2. The method of claim 1, wherein the one or more databases comprise more than one database schema, the method further comprising translating the more than one database schema into a consistent database schema.

3. The method of claim 1, further comprising:
   generating a list of database fields;
   receiving one or more selections from the list of database fields; and
   integrating the one or more selections to create the template.

4. The method of claim 1, wherein the template is generated based on a default selection of database fields.

5. The method of claim 1, further comprising:
   receiving a request to create the data report;
   returning a report field menu;
   receiving one or more menu selections based on the report field menu;
   generating a defined query; and
   searching the one or more databases using the defined query, whereby the search result is generated.

6. The method of claim 5, wherein generating the defined query, comprises:
   generating a select clause based on the received one or more menu selections;
   generating a from clause based on the select clause; and
   combining the select clause and the from clause to generate the defined query.

7. The method of claim 1, further comprising:
   sending a prompt to save the search result;
   receiving a response to the save prompt; and
   saving the search result based on the received response.

8. The method of claim 1, further comprising:
performing a subsequent database access using the template, whereby a subsequent search result is generated; and
saving the subsequent search result.

9. The method of claim 8, further comprising searching the search result and the subsequent search result using an alternate template.

10. The method of claim 1, further comprising receiving one or more changes to the template.

11. The method of claim 1, further comprising receiving user feedback based on the returned search result.

12. The method of claim 1, wherein the step of creating the search result comprises:
generating a list of data fields;
receiving a first data field selection from the list of data fields;
receiving a first constraint, wherein the first constraint is related to a data element in a data field; and
receiving one or more subsequent constraints, wherein search results are generated based on a combination of the first and the one or more subsequent constraints.

13. The method of claim 12, further comprising:
determining a first quantity indicative of a number of entries of the selected data field;
if the first quantity exceeds a specified limit, reducing a size of data to be displayed from the selected data field; and
displaying data from the selected data field.

14. The method of claim 13, wherein the specified limit is fixed.

15. The method of claim 13, wherein the specified limit is variable.

16. The method of claim 13, wherein the data are displayed on a terminal, and wherein the specified limit is determined dynamically, based on a characteristic of the terminal.

17. The method of claim 13, wherein the specified limit is a user-determined limit.

18. The method of claim 13, wherein the method for reducing the size of the data to be displayed from the selected data field comprises:
performing a truncation that reduces the size of the data to be displayed from the selected data field;
comparing the reduced size to the specified limit; and
if the reduced size exceeds the specified limit, repeating the truncation and comparing steps until the size of the data to be displayed from the selected data field is less than or equal to the specified limit.

19. The method of claim 18, wherein a parameter is related to the size of the data to be displayed from the selected data field, and wherein the truncation comprises decrementing or incrementing the parameter.

20. The method of claim 19, wherein the parameter is decremented or incremented by a value of one.

21. The method of claim 19, wherein a parameter is related to the size of the data to be displayed from the selected data field, and wherein the truncation comprises dividing the parameter by a value.

22. The method of claim 21, wherein the value is two.

23. The method of claim 18, wherein a parameter is related to the size of the data to be displayed from the selected data field, and wherein the truncation comprises multiplying the parameter by a value.

24. The method of claim 1, wherein performing transformations and corrections on the received query includes setting up JOIN operations based on a database schema, applying filters and plug-ins, and applying GROUP BY clauses.

25. A computer-based method for generating search result reports, comprising:
receiving a query, whereby the query comprises a database search request, and wherein the database is searched using an on-the-fly search;
a query tweaker generating a defined query of the database from the received query, wherein generating the defined query includes the query tweaker performing transformations and corrections on the received query;
searching a reports database for existence of a search template corresponding to the defined query;
if the search template is found:
retrieving the search template,
searching the database, whereby search-on-the-fly search results are generated, and
formatting the search results according to the search template; and
if the search template is not found, completing a new search, comprising:
displaying a search-on-the-fly search menu,
receiving search parameters, wherein the search parameters define a scope of the search, and
returning search-on-the fly search results, and
generating a second search template based on the returned search-on-the fly search results.

26. The method of claim 25, further comprising generating the query, comprising:
retrieving an existing where query clause;
generating a select clause;
generating a from clause; and
combining the select clause and the from clause to generate the query.

27. The method of claim 26, further comprising:
generating a reports fields menu based on the search results;
returning the reports field menu; and
receiving one or more selections from the reports field menu, whereby the select clause is generated.

28. The method of claim 25, further comprising reformatting the search template based on a user feedback.

29. The method of claim 28, further comprising saving a reformatted search template, whereby a prior search template is overwritten.

30. The method of claim 25, further comprising saving the search results.

31. The method of claim 25, wherein performing transformations and corrections on the received query includes setting up JOIN operations based on a database schema, applying filters and plug-ins, and applying GROUP BY clauses.

32. An apparatus for generating search-on-the-fly search reports, wherein search results are provided by a search-on-the-fly search engine, the apparatus comprising:
a search-on-the-fly report generator that receives raw queries from the search-on-the-fly search engine and generates a search report and a search report template, wherein the search-on-the-fly report generator includes:
a query tweaker that receives the raw queries of a database from the search-on-the-fly search engine and generates defined queries of the database, wherein the query tweaker generates defined queries by performing transformations and corrections on the raw queries; and a search database accessor that runs the defined query against one or more databases and produces a dataset object; and a reports database coupled to the report generator, wherein the reports database comprises one or more search report templates, each search report template corresponding to a search result and identified by a unique identification.

33. The apparatus of claim 32, wherein the report generator, comprises:

a request selector that receives a report generation request;

a fields accessor, coupled to the request selector, that receives a create report request, and accesses the reports database to locate a search template corresponding to the requested create report request; and a report serializer, coupled to the request selector, that receives a do report request, and initiates presentation of a corresponding search report, wherein the report generation request comprises the report generation request and the create report request.

34. The apparatus of claim 33, wherein the report serializer, comprises:

a fields serializer that obtains information related to fields in the databases to be searched;

a query serializer that receives the do report request;

a report package controller that receives the do report request from the query serializer, wherein the do report request includes a list of database fields, and that requests a report query and metadata related to the list of database fields, wherein the report package controller packages the report query and the metadata to create the search report template; and a database updater that receives the search report template that saves the search report template in the reports database and obtains the unique report identification for the search report.

35. The apparatus of claim 34, wherein the report generator further comprises a report generator front end, comprising:

a search database accessor that runs the defined query against one or more databases and produces a dataset object; and a formatter that fetches records from the one or more databases according to the dataset object and formats the search report according to the information obtained by the fields serializer.

36. The apparatus of claim 35, further comprising a user feedback module, whereby the search report is modifiable by a user.

37. The apparatus of claim 36, wherein the user feedback module is operable to modify the search report template.

38. The apparatus of claim 32, wherein the transformations and corrections performed by the query tweaker on the received query includes setting up JOIN operations based on a database schema, applying filters and plug-ins, and applying GROUP BY clauses.

* * * * *